US008694449B2

(12) United States Patent
Weng et al.

(10) Patent No.: US 8,694,449 B2
(45) Date of Patent: Apr. 8, 2014

(54) NEUROMORPHIC SPATIOTEMPORAL WHERE-WHAT MACHINES

(75) Inventors: Juyang Weng, Okemos, MI (US); Zhengping Ji, Lansing, MI (US); Matthew Luciw, Waterford, MI (US); Mojtaba Solgi, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 754 days.

(21) Appl. No.: 12/790,735

(22) Filed: May 28, 2010

(65) Prior Publication Data

US 2010/0312730 A1    Dec. 9, 2010

Related U.S. Application Data

(60) Provisional application No. 61/182,670, filed on May 29, 2009.

(51) Int. Cl.
*G06F 15/18* (2006.01)
(52) U.S. Cl.
USPC .......................................................... 706/15
(58) Field of Classification Search
USPC .......................................................... 706/15
See application file for complete search history.

(56) References Cited

U.S. PATENT DOCUMENTS

| | | | |
|---|---|---|---|
| 6,353,814 B1 | 3/2002 | Weng | |
| 7,711,663 B2 | 5/2010 | Weng | |

FOREIGN PATENT DOCUMENTS

CA           2246637     4/1999

OTHER PUBLICATIONS

Ji et al (Where-what network 1: "Where" and "what" assist each other through top-down connections ICDL 2008, Aug. 9-12, 2008).*
Yu et al ("Efficient and Reliable Training of Neural Networks" May 21-23, 2009).*
Weng et al ("Multilayer in-place learning networks for modeling functional layers in the laminar cortex" 2008).*
Weng et al ("Dually Optimal Neuronal Layers: Lobe Component Analysis" first published Apr. 28, 2009).*
Weng, J., "Multi-Layer Learning Network", U.S. Appl. No. 60/786,257, filed May 27, 2006, 30 pgs.
Ji, Z., et al., "Where-What Network 1:" "Where" and "What" Assist Each Other Through Top-down Connections, *Proceedings, 7th IEEE International Conference on Development and Learning (ICDL 2008)*, (2008), 61-66.
Solgi, M., et al., "Developmental Stereo: Emergence of Disparity Preference in Models of the Visual Cortex", *IEEE Transactions on Autonomous Mental Development*, 1(4), (Dec. 2009), 238-252.
Solgi, M., et al., "Temporal information as top-down context in binocular disparity detection", *Proceedings of the 2009 IEEE 8th International Conference on Development and Learning*,(Abstract Only), (2009), 2 pgs.
Weng, J., et al., "A 5-Chunk Developmental Brain-Mind Network Model of Multiple Events in Complex Backgrounds", *International Joint Conference on Neural Networks*, (Jul. 18-23, 2010, Barcelona, Spain), (2010), 8 pgs.

(Continued)

*Primary Examiner* — Lut Wong
(74) *Attorney, Agent, or Firm* — Harness, Dickey & Pierce, P.L.C.

(57) ABSTRACT

In various embodiments, electronic apparatus, systems, and methods include a unified compact spatiotemporal method that provides a process for machines to deal with space and time and to deal with sensors and effectors. Additional apparatus, systems, and methods are disclosed.

24 Claims, 25 Drawing Sheets

(13 of 25 Drawing Sheet(s) Filed in Color)

(56) References Cited

OTHER PUBLICATIONS

Weng, J., et al., "A General-Purpose Developmental Model of the Brain for Spatiotemporal Events in Complex Backgrounds", *Tech Report MSU-CSE-10-15*, (Abstract Only), [online]. Retrieved from the Internet: <URL: http://www.cse.msu.edu/cgi-user/web/tech/document?ID=967>, (Apr. 2010), 2 pgs.

Weng, J., et al., "Complex Text Processing by the Temporal Context Machines", *Proceedings, 2009 8th International Conference on Development and Learning*, (2009), 1-8.

Weng, J., et al., "Computational Automomous Mental Development: A White Paper for Suggesting a New Initiative", *Technical Report*, (Abstract Only), (Oct. 3, 2000), 2 pgs.

Weng, J., "Developmental Robotics: Theory and Experiments", *International Journal of Humanoid Robotics, 1*(2), (2004), 199-236.

Weng, J., "Multi-Layer Developmental Network Having In-Place Learning", File History for U.S. Appl. No. 11/728,711, filed Mar. 27, 2007, (issued as US 7,711,663), 119 pgs.

Weng, J., et al., "Neuromorphic Spatiotemporal Processing", *Tech Report MSU-CSE-08-34*, (Abstract Only), [online]. Retrieved from the Internet: <URL: http://www.cse.msu.edu/cgi-user/web/tech/document?ID=921>, (Dec. 2008), 2 pgs.

* cited by examiner

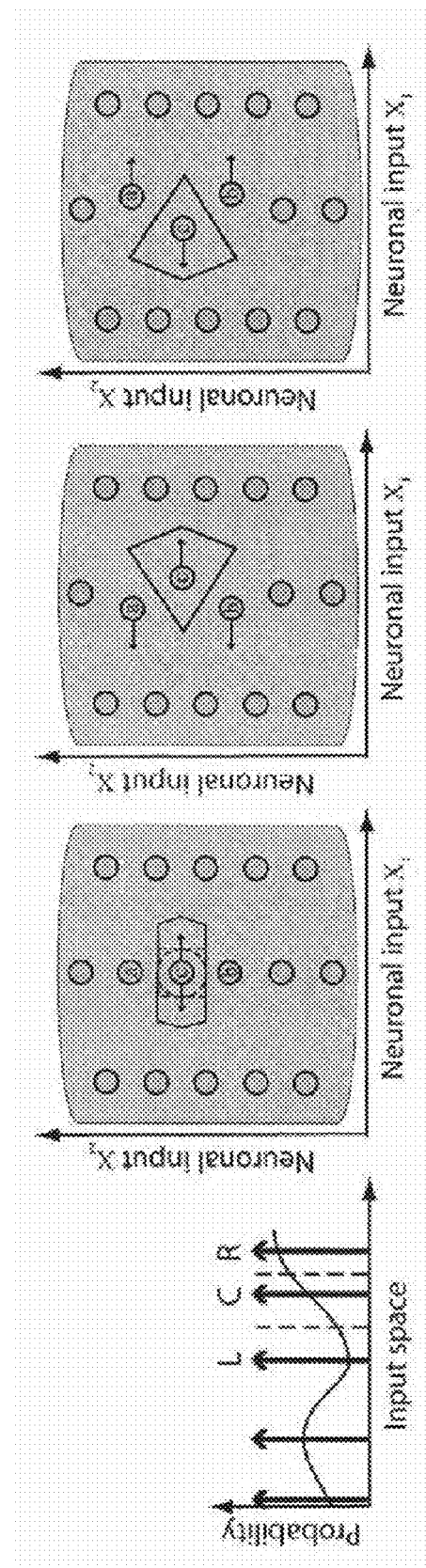

NEUROMORPHIC SPATIOTEMPORAL WHERE-WHAT MACHINES

PRIORITY CLAIM

The present application claims the benefit of priority under 35 USC 119(e) of U.S. Provisional Patent Application Ser. No. 61/182,670, entitled, "Neuromorphic Spatiotemporal Where-What Machines," filed May 29, 2009, which is incorporated herein by reference in its entirety.

BACKGROUND

Psychological experiments have provided convincing evidence that the functional development of the brain requires rich experience from infancy to adulthood. Neuroscientific studies have revealed rich biological detail about the brain, from mitosis, to cell migration and differentiation, to cortical wiring and patterning, to cortical responses and adaptation, and to the emergence of cell and cortical functions. Knowledge in computer science and artificial intelligence are necessary for understanding aspects of such systems in processing large scale, high dimensional sensory and motor data, including developmental paradigms, agent architectures, computational complexities, and the necessity of near optimality. Robotic investigations are amenable to understanding the necessity and problems of real sensors and effectors in dealing with the real physical world, through high-dimensional raw signals like pixel values and motor voltage.

Despite a promising beginning, pattern recognition software (e.g. object recognition, text understanding, and so on) using a "neural network" approach (inspired by the human brain) in general has encountered serious roadblocks limiting the rate of progress. Traditional methods cannot "attend" and "recognize" using the same network structure. For example, a system can find interesting regions, but cannot recognize objects. A system can only recognize objects that have already been segmented and separated from their natural background.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee. Embodiments of the invention are illustrated by way of example and not limited to the figures of the accompanying drawings in which:

FIGS. 5A, 5B, 5C and 5D illustrate isotropic pulling and square-like tiling, in accordance with various examples.

DETAILED DESCRIPTION

Figure 1:
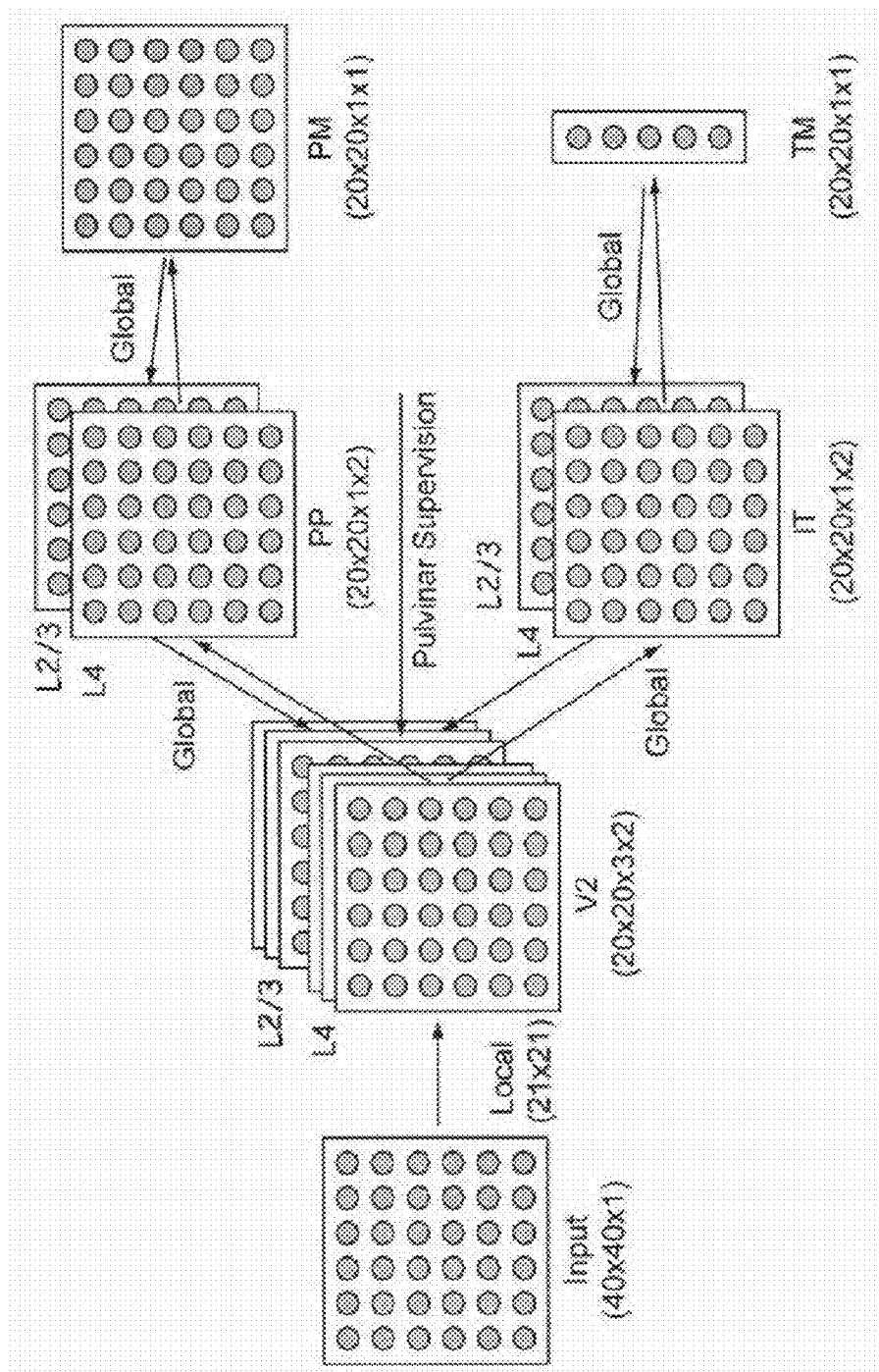
FIG. 1 illustrates an example of a Spatiotemporal Where-What (SWW) network, in accordance with various examples.

The following detailed description refers to the accompanying drawings that show, by way of illustration, details and embodiments in which the invention may be practiced. These embodiments are described in sufficient detail to enable those skilled in the art to practice embodiments of the invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various examples, a unified compact spatiotemporal method provides a process for machines to deal with space and time and to deal with sensors and effectors. Using this method, machines are able to perceive (monocular and binocular vision, audition and touch), attend objects from complex backgrounds and recognize objects independent of the backgrounds, and are able to conduct reasoning based on external context (sensors and motors), internal context (attention), or a mixture of both. Such examples provide for realization of machines having characteristics substantially not attainable by traditional methods. Traditional methods cannot deal with temporal warping effectively. Some use probability, leading to a poor recognition rate for usual utterances. Some use "a bag of words" or "a bag of features" and lose the information about the relative position of words or features. Traditional methods typically can do bottom-up attention, but not bottom-up attention and top-down attention concurrently. For example, it can attend to a red flower in a green field, but cannot be directed to find a car in the street if something else is more salient. Traditional methods hand-design bottom-up saliency, but the bottom-up saliency in the invention is learned from experience. The more one attends an object in various background contexts, the more likely the attended object will pop up from similar background contexts in the future. Traditional methods can not attend and recognize using the same network structure. For example, a system can find interesting regions, but cannot recognize objects. A conventional system can only recognize an object that has been segmented from natural background. Traditional stereo systems use only binocular disparity, that is, the positional difference between the matched patches in the image plane. These types of methods fail in case of weak texture (e.g., almost uniform region) or smoothly changing intensity (e.g., a smooth ball). In various examples of the invention, these problems in traditional methods are addressed, applying a spatiotemporal method using a single network. Various examples provide features for seeing machines and thinking machines.

How the brain deals with the spatial figure-ground and the temporal context problem is elusive. For example, how does a biological network develop its skills of attending a foreground figure (e.g., a car) at any retinal position in a complex background (e.g., a street scene), recognizing the figure, and interpreting its retinal position? How does it treat different consecutive views of an object as the same object instead of a series of irrelevant snapshots? Bottom-up saliency has been computationally modeled, extensively. However, top-down position based attention and top-down object based attention have resisted engineering-grade computational modeling and understanding. The model herein also suggests a new prediction—biological bottom-up attention may significantly depend on experience. Furthermore, it is mysterious how the brain deals with temporal context. While different views of a moving object fall onto the retina consecutively, how does a network develop to treat the views as from the same object instead of uncorrelated snapshots? Simulating the cell-centered Hebbian learning mechanism and a firing-age dependent plasticity, an example of a developmental program within a Spatiotemporal Where-What (SWW) machine or network enables the machine or network to wire itself and update "on the fly" from real-time "seeing" and supervised "acting" experience. These simple, yet dually optimal cell mechanisms are sufficient to regulate the development of SWW machines or networks, which demonstrates small-scale, but engineering grade performance for the spatial figure-ground problem that did not have a practical engineering solution and the temporal context problem for a variety of tasks.

Toward the goals of scientific understanding and engineering applications, it is important to put together pieces of knowledge from these diverse disciplines to show a computational picture about cortical information processing. However, knowledge from a single discipline is insufficient, not only in putting together such a picture, but also in the evaluation of such a picture, since expert knowledge of a subset of related disciplines only enables one expert to "see and recognize" some pieces of the puzzle but not many other ones. Unfortunately, humans have built disciplinary "walls" that limit understanding nature. Thus, one must go beyond the "walls".

Mechanisms of brain development are useful for understanding the emergence of brain functions. When a biological or computer program has incorporated sufficient mechanisms to regulate the autonomous development of an information processing network, this program is called a developmental program (DP). For computers, it is a much simplified, human understandable version implementing the brain-developing functions of the genome of a species (not including bodily development). It has been argued that a DP is species specific (e.g., sensor-, effector-, computational resource specific) but not task-specific, since, for example, a human newborn can potentially take any professional career and may also switch his career path at later life times. This task-nonspecific nature of development has posed great challenges in understanding brain-like information processing networks, mainly because the network's internal representations, for example circuits, synapses, responses, that are required for the generation of desired behaviors cannot be rigidly hand designed. Instead they must be autonomously generated, that is, be emergent, through a network's interactions with the environments in which it operates (which may include interactions with teachers). For example, various examples of a SWW network do not use hand-designed feature detectors, as it is not known what objects the network will end up seeing.

Self-Organizing Maps (SOM) with many later insightful extensions was the first computational model to explain computationally how artificial neurons in a 2-D or 3-D space can self-organize into ordered maps of feature detectors from experience. Cresceptron, a self-organizing neural network which uses a hierarchical framework to grow neural networks automatically, adaptively, and incrementally through learning, was arguably the first self-growing network for recognizing and segmenting objects from natural images. The general "where" and "what" robot vision problem has been computationally modeled. In 17 years since Cresceptron, research on Self-organizing Hierarchical Optimal Subspace Learning and Inference Framework (SHOSLIF), Incremental Hierarchical Discriminant Regression (IHDR), Self-organizing Autonomous Incremental Learner (SAIL), and Multiple-layer In-place Learning Network (MILN) has evolved.

In various examples, a system is configured as a brain-inspired system that learns to solve a wide variety of vision, speech recognition, and text processing problems. The system is able to learn to attend to spatiotemporal context and use it for perception, cognition, and decisions. A set of discriminant features can be extracted from sensory inputs using top-down connections. The features are discriminants, as they are most relevant to the motor actions of the system. Distractors that are irrelevant to actions are automatically disregarded. The features are sufficient in the sense that a sufficient number of discriminant features for the task are always available, subject to the available resource (the number of processing elements or neurons). With this sufficient set of discriminant features, the multilayer system learns many kinds of invariance, such as position invariance, size information, orientation invariance, and type invariance. Applications can include, but are not limited to, Internet search, advanced search engines, text processing in which the software "understands" what the text is "saying," visual recognition system for scenes with complex backgrounds, camera-based range detectors for driver safety devices in automobiles, object recognition and situation recognition/assessment, pattern recognition for automated control of automobiles (e.g., collision avoidance, steering and braking, etc.), and a very wide variety of defense applications involving pattern recognition.

In various examples, spatiotemporal methods address a crucial challenge: to handling both the demands for bottom-up "attention" (to the presence of given objects in a particular class), and efficiently coupling that with a top-down attention in terms of object/feature type and image location, where the result is provided as an efficient object detection and pattern recognition. Such a combined top-down and bottom-up architecture provides the kind of information processing that rapidly distinguishes "friend from foe," rapidly spots a looming pothole in the road while ignoring other information while driving, or "sees" words in text not as a "bag of words" or a "bag of features" but keeps and analyzes the information relating to the relative position of words and features.

In various examples, a software algorithm, of the neural network variety, is applied that uses no error-back-propagation. Error back-propagation is a common feature of a large class of conventional neural net architectures. The software can be massively parallel, use a Hebbian-learning method, and mimic the modularity of the brain, including the compartmentalization (in space and function) of various cognitive functions (e.g., what and where pathways). The algorithm incorporates a model of how the human brain focuses attention on designated objects in space and time, allowing the algorithm to zero in on subjects of interest (e.g., a human running in front of the car being driven or a looming pothole) and effectively "ignoring" all background information (e.g., houses, shadows, etc.). The algorithm also incorporates a combination of a "top down" and "bottom up" architecture loosely mimicking how the brain handles information processing in the cerebral cortex. This approach provides a system for automatically putting modular pieces together (i.e. developing). Distinguishing "food from foe" is an example of such information processing. The software is also applicable for general pattern recognition tasks.

In various examples, machines can be realized that include software architecture configured to be compatible with, and run effectively with massively parallel chips. This provides the software with the kind of flexibility and speed required for ever more exacting commercial and military needs. The software incorporates a generalized information processing architecture loosely modeled on the modular architecture and hierarchical information processing of the human brain.

An example for SWW networks presented here shows how experience enables dynamic wiring of the networks, leading to emergent representation, internal attention, and external actions. The representation and information processing in a developed SWW network is extremely complex—generally too complex and dynamic to be designed by hand. In contrast, the genomic mechanisms simulated by the DP, for example the Lobe Component Analysis (LCA) mechanisms, are much simpler, more systematic, more insightful to understand. These genomic mechanisms simulated by the DP address not only how a developed SWW network processes information, but more deeply, how a SWW network develops its way of information processing. Furthermore, they are more tractable to develop highly complex intelligent machines.

What is referred to as a visual figure-ground problem provides a sample problem for the SWW network. In a visual figure-ground problem, there are n objects to be recognized whose views have a fixed image size. However, each object view may appear at any image position against one of many complex, unknown natural backgrounds. Given any such a composite image, the problem is to determine the object's identity and its image position. Currently, there have been many special-purpose engineered systems for detecting human faces. An engineering-grade solution to the general figure-ground problem did not exist until the emergence of an example of the SWW network.

In experiments, the software provided results for the figure-ground problem: correctly identifying one of learned objects in a natural, unknown, complex background (about 95% in recognition rate and about 1.5 pixels in position error). In addition, the DP can provide (develop) networks to recognize 3-D objects viewed from any of 360° viewing angles, where each object is roughly at the center of the image, simulating the situation where overt attention has already brought the object to the center of the field of view in the figure-ground problem. Such networks may be of limited size. Furthermore, the DP can also provide stereoscopic networks, which map two stereo image rows to the corresponding stereo disparity output, without using explicit stereo matching. The DP can provide (develop) networks for some complex natural language processing tasks.

Figure 2:
FIG. 2 shows sample image inputs tested with the architecture of FIG. 1 in accordance with various examples.

FIG. 1 shows an example of a Spatiotemporal Where-What network, in accordance with various examples. DP mechanisms develop highly complex SWW networks, tested for the figure-ground problem. The illustrated example configuration of the SWW network shown has a Dorsal pathway: V2-PP-PM and a Ventral pathway: V2-It-TM. V2 has two levels, corresponding to L4 and L2/3 respectively. Each level has a thickness 3 so that different features can be developed at the same pixel location. FIG. 2 shows sample image inputs tested with the architecture of FIG. 1. Five object views "car," "table," "penguin," "person," and "horse" of size 21×21 are pasted at any position on a randomly chosen natural background image. 75% pixels were from unknown natural backgrounds. With respect to these sample image inputs, the training and testing phases used different backgrounds.

The SWW network illustrated in FIG. 1 gives an outline of the network architecture. It is not meant to duplicate all biological detail. This is a real time network with an updating frequency $f$. An example updating frequency is 10 frames per second. The updating frequency is not limited to 10 frames per second. The time period between updates is then $\tau=1/f$. The network learns incrementally while taking inputs from sensors and effectors, computing responses of all neurons, and producing internal actions (e.g., attention) and external actions, which take effect in the external world. The two-way pathway through areas V2 (Visual 2), PP (Posterior Parietal), which may represent premotor areas, and PM (Position Motor), which may represent motor areas, represents the dorsal pathway. The two-way pathway through areas V2, IT (Inferior Temporal), and TM (Type Motor), which may represent frontal cortex, represents the ventral pathway. All connection weights (synapses) are learned through experience. The network has two external motor ends, position motor (PM) and type motor (TM), representing, respectively, the position and the type of the attended object in the input image. In principle, they can be taught to represent a wide range of concepts about the attended object, e.g., distance and size at PM and hostile or friendly at TM, depending on what is taught. Adding more areas, for example, LGN (Lateral Geniculate Nucleus) and V1 (Visual 1), is needed to effectively deal with a large range of sizes. The external motor ports are used as both input and output. In other words, they are compliant—the external teacher can impose a desired vector value at any time to override the internally generated value. The biological pulvinar connects to all cortical regions, but the pulvinar in the illustrated example of a SWW network is only an input port for supervising attention at V2.

For temporal context, the entire spatial network is linked in time—the values generated in the network at the time t are used for the next network update that finishes the computations for all the neuronal responses by time t+τ. Surprisingly, this simple mechanism is effective for the network to deal with adaptive temporal contexts of various lengths, mainly due to the spatial embedding power of the network, discussed later.

A teacher is a part of the network's external environment. The teacher can only directly interact with the network through its sensors (the image and the hypothetical pulvinar port) and effectors (PM and TM). Note that a biological pulvinar is not directly accessible from the external environment. Thus, attention is learned from trial and error in the newborn before basic attention behaviors are developed so that the parents can use external cues (e.g., voice and motion) to get the desired attention from the baby. If the teacher chooses to impose supervised values at the two motor ends and at the pulvinar port, the teacher applies the values by the correct time so that it is ready to be used for the next round of network update. Otherwise, the self-generated values at the two motors are used for the next network update. The vector value at the motor end represents top-down context, either self-generated or externally imposed by a teacher or the real world. The SWW network is also suited for other sensing modalities, such as audition and touch.

Internally, the network has two types of information flows, bottom-up and top-down. The bottom-up flow starts from an input image, going through V1 and V2, branching to ventral and dorsal pathways, and finally reaching the position motor output and the type motor output, respectively. The top-down information flow takes inputs from one of the two motors, generated by a teacher or self-generated, affecting every network areas through the network for attention and finally reaching the early processing area.

A DP of SWW networks is highly general and task nonspecific, it is beneficial to consider how such a network deals with space and time, instead of concepts of a particular task. The brain deals with space and time using its inter-connected cortical areas. Therefore, it appears that three large entities, herein referred to as chunks, "area", "space", and "time", need to fit together in a DP of brain-like networks. These chunks address (1) how a cortical area develops to connect and to work, (2) how a cortical network develops to deal with the spatial characteristics of the input, and (3) how a cortical network develops to deal with temporal characteristics of the input. There are many details inside each chunk, such as learning modes, and methods for teaching the network. However, these three chunks appear to be the most fundamental.

Although a SWW network may develop to conduct very complex behaviors of information processing, its DP can be centered at a very low level unit, neurons. Dramatically demonstrated by animal cloning, the well known principle of genomic equivalence implies that the information represented by the genome in the nucleus of any cell (other than cells that have lost their nuclei such as blood cells) is sufficient for developing the single cell into a functional adult body consisting of around 100 trillion cells. In other words, there is no genome that is dedicated to more than one cell. Thus, the human DP (genome) is cell centered, whereby each cell is a fully autonomous machine that runs in its cell environment. Consequently, in various examples, the DP of the SWW networks is also cell centered—the DP inside each cell plus the cell's environment is sufficient to develop a highly sophisticated SWW network from experience. This cell-centered principle of DP has the inventors to avoid misleading side-tracks in the realization of examples of SWW networks.

In simulating mitosis and cell migration, the DP assigns available computational resources—neurons—to each corresponding layer in each cortical area of the network in FIG. 1 and distributes them in 3-D space. The same DP can run a LCA algorithm on each neuron. While these autonomous neurons interact regulated by the DP, the process of interactions explains how the three chunks of the network emerge.

Neuronal layers can be viewed as chunk 1. This chunk relates to how a cortical area in SWW connects and learns in a dually optimal way. Consider the arrival of a neuron at a cortical layer, specified by its DP and the cell environment. How does it automatically determine where to connect, what to learn, and what functional role it plays? This dual optimality is a necessity instead of luxury—some examples demonstrate that an absence of such a dual optimality led to results ranging from doubling the error to non-convergence for moderately challenging problems, but a sheer failure for the challenging figure-ground problem (near chance performance).

Figures 3, 4:
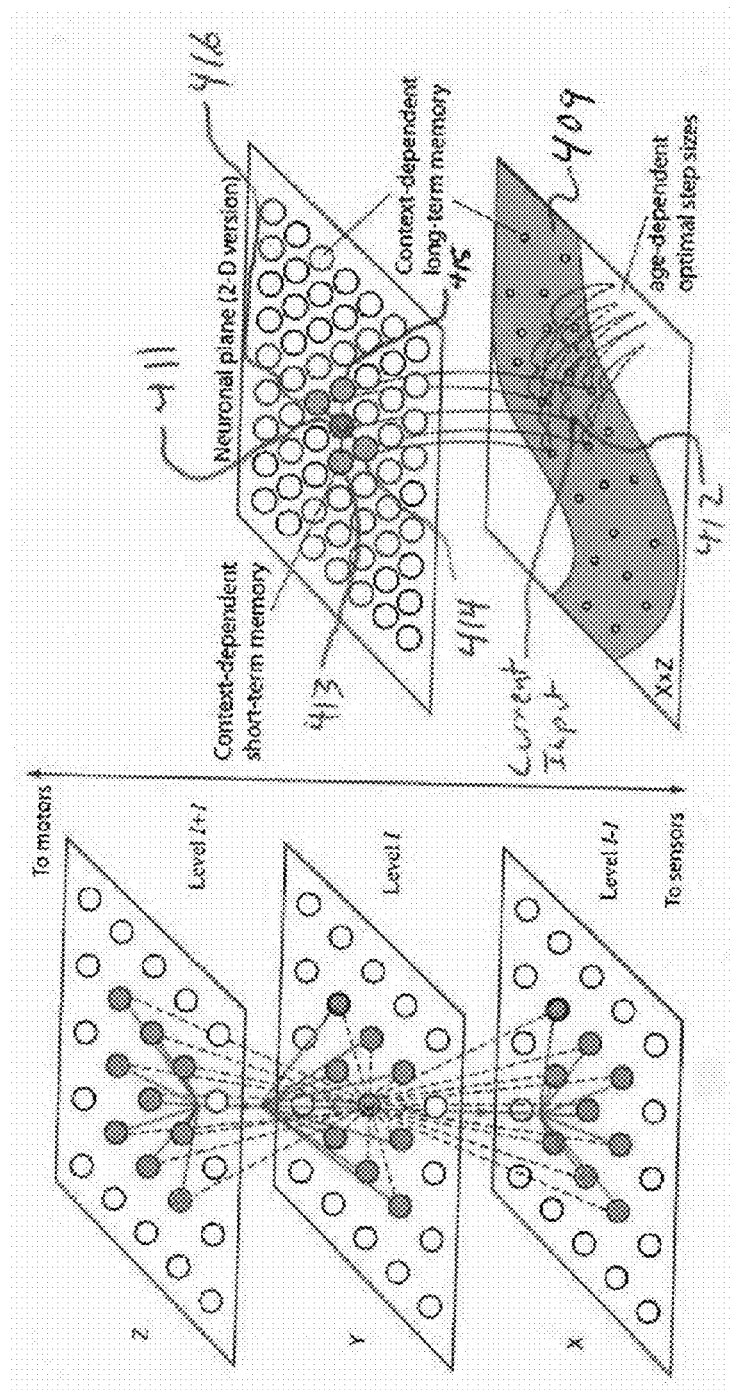
FIG. 3 illustrates the target-also-source scheme, in which each target neuron is also a source neuron for input, in accordance with various examples.
FIG. 4 illustrates the dually optimal LCA tiling which demonstrates how Lobe Component Analysis (LCA) regulates how a neuron learns, in accordance with various examples.

FIGS. 3 and 4 illustrate the target-also source scheme and the dually optimal LCA tiling. LCA in each neuronal layer regulates the self-generation of a bridge representation, which embeds the observed joint probability density of bottom-up X and top-down Z spaces. Its dual optimality is a necessity for the where-what problem and has implications to the brain size. FIG. 3 shows the target-also-source scheme—each target neuron is also a source neuron for input. Neurons autonomously growing their dendrites (for input) and axons (for output) to nearby neurons in the same and neighboring layers. Every neuron in layer l grows dendrites (for inputs, dashed lines) and axons (for outputs, solid lines) to nearby regions. Each layer l has two sources (spaces) of inputs, bottom-up X and top-down Z. Its response values form the space Y. As illustrated in FIG. 3, each neuron autonomously grows its dendrites and axons to nearby neurons in the same and neighboring layers. All such connections are excitatory. Within the same layer, each neuron also connects to other nearby neurons through inhibitory connections (assisted by inhibitory inter-neurons). The response values at any time instant t from all neurons in layer l form a response vector y. All such vectors y through different times form the output space Y. Thus, in FIG. 3, layers l−1, l, and l+1 have their response spaces X, Y, and Z, respectively. Layer l has X and Z as its immediate bottom-up input and its immediate top-down input, respectively. Thus, the input space of the neurons in layer l is denoted as X×Z if all the neurons are fully connected. X×Z is the Cartesian product of X and Z, defined as X×Z={(x, z)|x∈X, z∈Z}. "Bottom-up" means the input source is closer to sensors than the layer l. "Top-down" means that the input source is relatively closer to a motor area in the processing pathway.

FIG. 4 illustrates dually optimal LCA tiling. The neurons reside in the 3-D space of a neuronal layer. Lateral inhibition among neurons in the same layer enables different neurons to detect different features after development, using input stimuli—to understand this more visually, observe how the manifold 409 of input is titled. Neurons are in layer 1 with their adapting synaptic vectors in the input space X×Z and their responses in Y. All the responses from level 1 are denoted as space Y and the neuronal input takes from the input space X×Z. Given a limited number of neurons, the spatial optimality of LCA is to ultimately tile the manifold 409 so that the expected distance between any input point ("+" sign) and its nearest neighbor neuron 412 (the quantizer) is minimized. In various embodiments, the manifold 409 is the input space of the neuronal level. The temporal optimality can be understood as follows. From the limited amount of experience up to every time instant t, move the neurons in such a way so that the expected distance between the synaptic vector at time t and its ultimate destination is minimized. Impressively, the learning rule is cell-centered for this highly nonlinear dual optimization problem: When the current input "+" arrives, its nearest neighbor, synaptic vector 412 in manifold 409 wins and its associated neuron 411 fires. The firing neuron 411 excites its neighbors 413-416 in layer 1 to facilitate them to fire too. Every firing neuron updates its synaptic weight vector toward "+" using the best step size that depends on cell's current firing age.

LCA enables the neurons in each layer 1 to form a dually optimal bridge representation of X and Z, to embed the observed density of X×Z into its synaptic vectors. The bridge representation of level 1 at any time t includes all of its level memory L and its response y. Graphically it includes the quantization grid (synaptic vectors) for the manifold of input space X×Y illustrated as FIG. 4, the firing ages of all the neurons of level 1, and the response vector y∈Y.

Compared with the existing error back-propagation networks, this LCA-based network does not use error signals for back-propagation, since error signals are not directly available in autonomous animal learning and gradient-based back-propagation does not have a long-term memory mechanism which causes the well known loss-of-memory problem. The network uses biologically plausible in-place learning—each neuron uses only information that is physically available to the cell regulated by biological plausible cell-centered developmental mechanisms. With LCA, only pre-synaptic activities, post-synaptic activities and a scalar cellular plasticity are used in cell centered learning and computation. Compared with many Bayesian models (which used temporal equivalent classes) and EM methods, no explicit search in high-dimensional model parameter space is needed. In particular, no second order statistics is computed or stored. As each neuron in the brain connects to an order of 1000 other neurons on average, the storage for storing the second order statistics requires 1000×1000=1 M additional storage units, or the brain network needs to be 1000 times larger. While many networks are feed-forward, some networks used top-down connections. However, analysis of top-down connections is severely lacking. The analysis presented next clarifies the top-down effect, meaning that top-down connections enable the layer to recruit limited neuronal resources for unknown bottom-up components that are relevant to motor outputs (e.g., attended object or attended features) so that they win in competition with irrelevant bottom-up input components (e.g., unattended objects or backgrounds).

Further, the LCA model indicates that working memory (fast learning) and long-term memory (stable memory) in a layer are two dynamic aspects of the same layer. As shown in FIG. 4, the role of working memory and long-term memory of each neuron is dynamic, dependent on the current input: a best matched neuron 411 and its neighboring neurons 413-416 correspond to the working memory while all other neurons correspond to the long term memory for the current context.

A dually-optimal cortex learning model maximizes the utilization of both the limited computational resources (spatial) and the limited learning experience at any time (temporal). Biologically, the LCA model predicts that the direction of synaptic update determined by the Hebbian mechanism is an optimal direction, for the spatial optimality, in the sense that the final features from an arbitrary amount of experience will best use the neuronal resources. But without optimal step sizes, the neural layer is not optimal at any finite time. To be both spatially and temporally optimal, each cell should keep a firing-age dependent plasticity to use for its optimal update in terms of direction as well as step size. This simple, yet dually optimal LCA neuronal layer model provides the building blocks for a large scale, highly nonlinear cortical networks that learn to deal with space and time. Its dual optimality might have implications for total brain size, competitiveness in age groups, and may have implications to the size of "brain" chips constructed for implementation. The LCA model has also implications to nonlinear optimization and control, such as freedom of local extrema, high-dimensional probability approximation, and freedom of the curse of dimensionality.

The following discussion provides an illustration of an example of a dually optimal LCA neuronal layer algorithm. A Candid Covariance-free Incremental (CCI) LCA algorithm incrementally updates c neurons in each 3-D layer (cortical sheet with thickness) represented by their synaptic vectors $v_1$, $v_2, \ldots, v_c$ and firing ages $n_1, n_2, \ldots, n_c$. Each input sample is in the form $p=(x, z)$, where $p \in X \times Z$, x is from the bottom-up input space X, and z is from the top-down input space Z. The x and z are normalized, to be discussed later. In some cases, network areas X and Z may have multiple parallel input subspaces. For example, V2 area of the SWW network of FIG. 1 has two top-down input subspaces from PP and IT, respectively. A motor area does not have its top-down input space. In terms of mathematic notation, each update of the LCA algorithm is denoted by a function $f_{LCA}$:

$$(y, L) \leftarrow f_{LCA}(p|L)$$

The algorithm has a "prenatal" initialization. This initialization process initializes the ages to zero and synaptic vector $v_i$ using c Gaussian functions, with each Gaussian having a different mean vector, and firing age $n_i=0$, $i=1, 2, \ldots, c$.

The algorithm has a "live, prenatally then postnatally" (run an arbitrarily large amount of time) phase. This phase updates every neuron once in parallel, within time period τ, through steps 1 through 5 below. The update is cell-autonomous, meaning that when each neuron updates, it simply uses the currently available response values of other neurons and does not wait using any global clock. This procedure is critical for the temporal chunk that was discussed earlier.

1. Neurons Compute.

Depending on the layer's position in the network, take external or internal input $p=(x, z)$, where z may be over-ridden by a teacher if z is an external terminal. Compute the pre-competition response:

$$y_i = \frac{v_i \cdot p}{\|v_i\|}, i = 1, 2, \ldots, c. \quad (1)$$

Using a sigmoidal function provides a robust version that can be used to suppress outlier responses. In an example, Eq. (1) does not use a sigmoid. During the training of the where-what problem, "pulvinar" supervision does not allow the neuron i to fire $y_i=0$ when it falls outside the attended area

2. Neurons Mutually Inhibit for Sparse Coding.

For computational efficiency with a relatively lower update frequency, use the following non-iterative ranking-and-scaling mechanism. This mechanism of ranking-and-scaling is an approximation of biological in-place inhibition. It is not in-place, as it requires extra-cellular sorting. However, it is very effective computationally by eliminating iterations within an LCA layer. Rank k+1 top winners so that after ranking, $y_1 \geq y_2 \ldots \geq y_c$, as ranked responses. Use a piecewise linear but globally nonlinear function to scale the responses:

$$y_i \leftarrow \frac{y_i - y_{k+1}}{y_1 - y_{k+1}} \quad (2)$$

for i=1, 2, . . . , k. All other neurons do not fire $y_i$=0 for i=k+1, k+2, . . . , c. In experiments conducted, k=1, except for temporal object recognition where k=16. This ranking-and-scaling mechanism replaces repeated iterations that take place among two-way connected neurons in the same layer. (In the laminar cortex, L5 assists L2/3 for inhibition and L6 assists L4 for inhibition.)

3. Optimal Hebbian Learning.

Update only the top k winner neurons $v_j$, j=1, 2, . . . , k, using the pre-synaptic activity p, the post-synaptic activity $y_j$, and its firing-age dependent plasticity $w_2$:

$$v_j \leftarrow w_1 v_j + w_2 y_j p, \quad (3)$$

where the learning rate and the retention rate, respectively, are determined by:

$$w_2 = \frac{1 + \mu(n_j)}{n_j}, w_1 = 1 - w_2 \quad (4)$$

where $\mu(n)$ is a non-negative amnesic function. $\mu(t)$ is designed to approximate biologically motivated nonlinear learning rate $w_2(n)$. $\mu(t)$=0 when $t \leq t_1$, so that $w_2(n)$=1/n; $\mu(t)$=2(t-$t_1$)/($t_2$-$t_1$) when $t_1 < t \leq t_2$ so that $w_2(n)$ linearly changes from 0 to 2. $\mu(t)$=2+(t-$t_2$)/r when $t_2 < t$ so that $w_2(n)$ approaches 1/r when n grows without bound. Various examples include $t_1$=20; $t_2$=200 and r=2000 in various examples. These numbers were selected based on the need for stability and fast adaptation. Note $y_1$=1 for the top winner. Update the real-valued neuron "firing age" $n_j$ only for the winners: $n_j \leftarrow n_j + y_j$, j=1, 2, . . . , k. Normalization of the synaptic vector $v_j$ after each update should not be done, as it can drastically reduce the overall performance.

4. Lateral Excitation for Cortical Smoothness.

Mutual excitatory connections among neurons in the same layer are useful for developing neurons whose synaptic vectors are smooth across the 3-D layer. Graphically shown in FIG. 4, this means that the nearby neurons detect similar features. In the computer simulation of lateral excitation, there is a sphere of excitation with radius r from each neuron. Not only the top-k winners update, but also the neurons within the sphere of excitation. The scope radius r starts from the half size of the neuronal layer during initialization. It slowly decreases to r=0 when the network matures.

5. Long-Term Memory.

All other neurons that do update keep their update age and synapses unchanged. They are long term memory for this context of p. Other updated neurons are working memory for this context.

LCA dually optimally "tiles" the input space. The set of all the synaptic vectors $v_1, v_2, \ldots, v_c$ corresponding to quantization of the signal manifold of the input space P into a finite of c feature vectors. If k=1, only the best matched neuron j fires, where the best matched neuron is:

$$j = \arg\max_{i=1,2,\ldots,c} y_i = \arg\max_{i=1,2,\ldots,c} \frac{v_i \cdot p}{\|v_i\|}.$$

Let region $R_j$ includes all points in P that have neuron j as the winner:

$R_j = \{p \in P | \text{neuron } j \text{ is the winner among } c \text{ neurons.}\}$ Then, conceptually, the synaptic vectors $v_1, v_2, \ldots, v_c$ from LCA partition the input space P=X×Z into c disjoint regions, $R_1, R_2, R_c$, called lobe regions. It can be proved from spatial optimality that the lobe component $v_i \in R_i$ is the (local) first principal component vector of $R_i$. Further, the length of $v_i$ is the variance of projections of the vectors in $R_i$ onto $v_i$.

When k=1, all the input vectors p in $R_i$ are approximated by a single firing neuron i. When k>1, multiple firing neurons can provide additional information about the input p, but k>1 improves the performance only when c is sufficiently large so that other firing neurons are not too far away in P. As the winner is determined by the inner product above, the winner is the best match of p measured in terms of inner product. Inner product is useful to disregard the absolute length of the input vector p so that the network automatically adjusts its sensitivity to input volume.

For the simplicity of illustration and without loss of generality, consider Euclidean distance as match distance in FIGS. 5A-D, instead of an inner product distance. Suppose k=1. A point belongs to the region of a neuron if the point has the neuron as its nearest neighbor. The entire space is then partitioned by the corresponding Voronoi diagram, although no diagram needs to be computed. At early age of the network, the Voronoi diagram changes quickly because of the higher learning rate. Later the Voronoi diagram becomes stable when the learning rates of neurons are reduced. However, to keep a moderate network plasticity over the entire life span of the network, no learning rates will go to zero. Herein, a lobe region is called stable if any pulling from arriving sample p will not cause a region boundary change that accelerates future pulling in the same direction.

FIGS. 5A-D illustrate an isotropic pulling and square-like tiling. LCA enables neurons to self-organize toward the status of isotropic pulling, which corresponds to square-like tiling for a uniform input probability density. The neuronal density adapts to the probability density in the neuronal input space. The nearest neuron is dynamically pulled incrementally by arriving samples, one at a time. FIG. 5A shows a 1-D density case. Lobe regions with higher probability density (higher section of the probability curve in FIG. 5A) recruit denser neurons (indicated by vertical arrows). FIGS. 5B-D show a 2-D density case. For simplicity, assume that the 2-D input density is constant in the shaded region. Then, neuronal density adapts toward a uniform distribution. FIG. 5B shows an unstable situation for neuron c as the Voronoi region is elongated: The forces that pull horizontally are statistically stronger than those that pull vertically. FIG. 5C shows neuron c pulled toward the right by chance. Such pulling will continue in the same direction until pulling forces are statistically balanced (i.e. isotropic) in all directions, resulting in a stable Voronoi region. Likewise, FIG. 5D shows neuron c is pulled toward the left by chance, causing the neuron c to be continuously pulled to the left.

For example, consider a uniform distribution in P. A neuron in an elongated region in FIG. 5B is not stable, as analyzed in FIGS. 5A-D. All the neurons become stable when all the regions become regular hexagons of equal size, which is called square-like. For visualization purpose, a "square" can be considered stable but a rectangular region is not.

The LCA dually optimally best "tiles" the input space P=X×Z dynamically using its limited resource of space (neurons) and time (learning experience): it moves the limited neuronal resource according to the high probability regions of input space so that the final target locations minimize the expected quantization error. Furthermore, the step size of each update is optimal in that it best uses the limited experience up to every time t. In particular, a part of the input space where no samples appear will not be covered by neurons, and those regions that have few samples are only covered by few neurons. In other words, LCA dually optimally "tiles" the input space P=X×Z. For a uniform probability density, the "tiles" have a square-like shape (regular hexagons for example), but not any elongated shape (e.g., rectangular). This is called LCA square-like tiling.

The bottom-up input space X of any neuron typically contains two subspaces, irrelevant subspace $X_i$ whose values are irrelevant to the layer's output z∈Z, and the relevant subspace $X_r$. In the figure ground problem, the foreground input is in $X_r$ and the background input is in $X_i$. Along the ventral pathway whose end motor responds to object types, the information about object position in the foreground corresponds to $X_i$. Likewise, along the dorsal pathway, the information about object type corresponds to $X_i$.

Figures 6A, 6B, 6C:
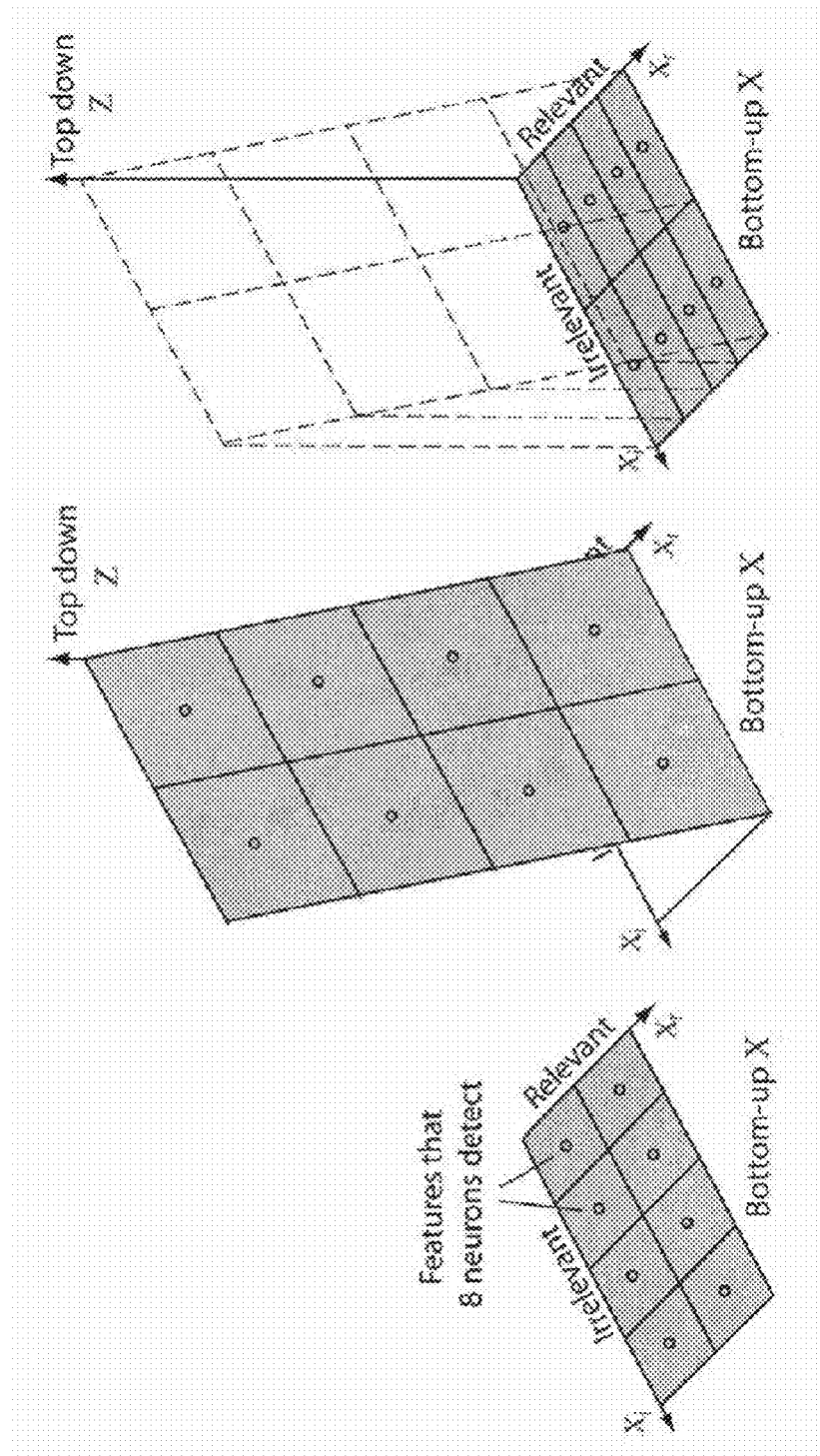
FIGS. 6A, 6B and 6C illustrate a top-down effect from square-like tiling, in accordance with various examples.

FIGS. 6A-C illustrate the top-down effect from the square-like tiling. Consider a limited resource, for example, 8 neurons, in a neuronal layer. The bottom-up input space X=$X_i$× $X_r$ includes the unknown irrelevant subspace $X_i$ and the unknown relevant subspace $X_r$. FIG. 6A shows that using the bottom-up input space X only, the limited number of neurons tile the bottom-up input space using "square" tiles. Graphically, the resulting partition space is called a Voronoi diagram, but "square" tiles are used for simplicity. Due to the variance difference, the irrelevant dimension $X_i$ receives 4 quantization levels but the relevant $X_r$ gets only 2 levels. FIG. 6B shows use of both bottom-up X input and top-down input Z during learning. Z is dependent on $X_r$, typically nonlinearly. For simplicity, the plot assumes that Z depends on $X_r$ linearly. The 8 neurons tile the uniform manifold (shaded region) using "square" tiles. FIG. 6C shows a test after training in FIG. 6B. Even when top-down input is not available during testing, $X_r$ now has 4 quantization levels but $X_i$ now has only 2. This means that using top-down inputs during training, the relevant subspace has statistically better nearest-neighbor matches and the irrelevant subspace gets worse matches.

According to the above to the above square-like tiling, the top-down connections recruit limited neuronal resources so that relevant input subspace $X_r$ has more quantization levels than the case without top-down. Given a fixed number of neurons in a layer, this means that the winner neuron is mainly determined by the relevant subspace $X_r$ as the stimulus-neuron match in it is better than in the case where top-down is not used. It is important to note that in SWW networks, each neuron has a limited default receptive field, but a foreground figure only fits roughly to this default receptive field, due to limited number of neurons. However, the top-down effect still enables the components from the figure to quantize finer and other components to quantize coarser. It is also important to note that the DP does not identify which part of bottom-up inputs is irrelevant and which is not. Signal relevance between relevant components in X and those in Z is automatically caught by LCA as illustrated in FIG. 6B.

Spatial Mechanisms can be viewed as chunk two. This chunk addresses how the neuronal layers of SWW network discussed above connect and learn to deal with spatial information. Here, "spatial" means different positions in the network that exists in 3-D space. As the brain is bombarded by a continuous flood of information from receptors (corresponding to pixels) and muscles signals (muscle elements or "muxels"), how does it attend to only a small relevant part of information needed to produce intelligent behavior? This is a challenging open problem. For example, in some WWN examples, 75% of pixels in each input image correspond to unknown complex natural backgrounds and the network must decide among a large number of possible positions: 20×20=400. The spatial mechanisms include type-based top-down attention, position-based top-down attention, experience-based bottom-up attention, and LCA enabled dynamic wiring of a highly integrated WWN from experience.

Bottom-up attention has been modeled by hand-modeled feature saliency properties. In the SWW network model here, bottom-up attention is not separated from, and is a natural consequence of, top-down attention. The more one attends an object in various background contexts, the more likely the attended object will pop up from similar background contexts in the future. Intuitively, what you see is related to how you see it in the past.

Top-down attention has two types, position based and object (or feature) based. Position-based top-down attention has been modeled as multi-level shifter circuits that switch, through many stages, the value of feature detectors in an early layer into a standard master map in a later layer. Existing models assume that the top-down control in terms of retinal position is available to the shifter circuit system. In contrast, the SWW network here uses its position motor as a natural source of top-down position-based control, and its type motor as a natural source of top-down type-based control. The required motor signals are either self-generated or teacher supplied. This tight integration not only allows difference alternative sources of top-down attention control to use the same network, but also opens the door toward future self-generated autonomous attention sequences (e.g., through a novelty-driven mechanism in motor behaviors).

Object-based top-down attention has been known to exist in primate vision but has resisted computational modeling, engineering realization, and analysis. Functional components of attention have been extensively studied and schematically drawn as block diagrams, although the position-based and object-based top-down attentions are not necessarily distinguished in prior studies. As some researchers have correctly pointed out, little is known about the neural representation of objects. The components in object representation have not been well understood computationally to enable a neuromorphic network implementation using in-place learning. In a simulation of the SWW network outlined in FIG. 1, experimental performance verified that representation consistent with existing neurophysiological studies. In particular, object-based top-down attention has been demonstrated: When, in the type motor, the neuron corresponding to the object of interest is imposed to fire at a high rate, the SWW network locates the object from the input image against a complex, natural background, and the position motor produces the position of the object of interest.

The requirement of biologically inspired cell-centered neuronal learning has played a critical role in avoiding numerous alternatives that may have side tracked efforts in integrating the key components of SWW. In other words, in an example to avoid task-specificity, no part of the SWW network was semantically designed to learn a hand-specified property of objects in its environment, such as edge orientation, color, disparity, and motion. An autonomous neuron does not have such information other than its internal cellular mechanisms and external cellular environments. Instead, object representation in SWW is rooted in LCA mechanisms, while the global sensorimotor pathways follow the discovery of dorsal and ventral pathways. The SWW network further computationally shows that the two dorsal and ventral pathways are not independent. Bottom-up saliency, position-based top-down attention, and object-based top-down attention are three tightly intertwined aspects of a single SWW network. In particular, there is no master feature map other than areas each serving as a bridge representation in the two-way information flows between pixels and "muxels".

In an example, normalization is performed in every area. Suppose that a neuron in an area (e.g., IT or PP) has a bottom-up input x and top-down input z. The normalization of the input vector p is:

$$p \leftarrow \left( \alpha \frac{z}{\|z\|}, \beta \frac{x}{\|x\|} \right)$$

where $\alpha=0.5$ and $\beta=1-\alpha=0.5$ by default. In other words, both the bottom-up and top-down parts are normalized to have a unit length, before being weighted by $\alpha$ and $\beta$ respectively. Likewise, if x or z has two subspaces, each subspace is normalized so that every vector from each subspace is of the same length. This normalization is an important step for neuron wise information integration, as different sources may have very different dimensions, although the response value of a neuron is normalized to a value between 0 and 1 after the LCA scaling.

With this framework, the representation of each object is fully distributed, as illustrated in FIG. 1. Similar to the receptive field concept of a neuron, the effective field of a neuron is the area in the motor output map whose values will affect the top-down input to the neuron. There is another concept, the input field and output field of a neuron, defined as all the neurons from which the neuron directly receives inputs and to which feeds output, respectively. From early sensory area to a motor area, the receptive fields of neurons increase from small to the size of the entire image. Conversely, the effective fields decrease from the entire motor output map (entire image of "muxels") in the retina down to few "muxels" in a motor area. Neurons in V2 are both type specific and position specific. The neurons in the PP area are less type specific than V2. Finally, the PM output is almost completely type invariant. Likewise, neurons in IT are less positional specific than V2. Finally, the TM output is almost completely positional invariant.

Therefore, the representation of an object in SWW network is not only highly distributed but also tightly cooperative with the representations of other objects, as a natural consequence of generating desired behaviors at the two motor areas.

Invariance can be developed through selective wiring. How does an SWW network develop type invariance in position motor outputs and positional invariance in the type motor outputs? FIGS. 7A-B indicate dynamic wiring for the ventral and dorsal pathways by LCA—how a neuron develops such motor-specific invariance using supervision from its top-down inputs.

Figures 7A, 7B:
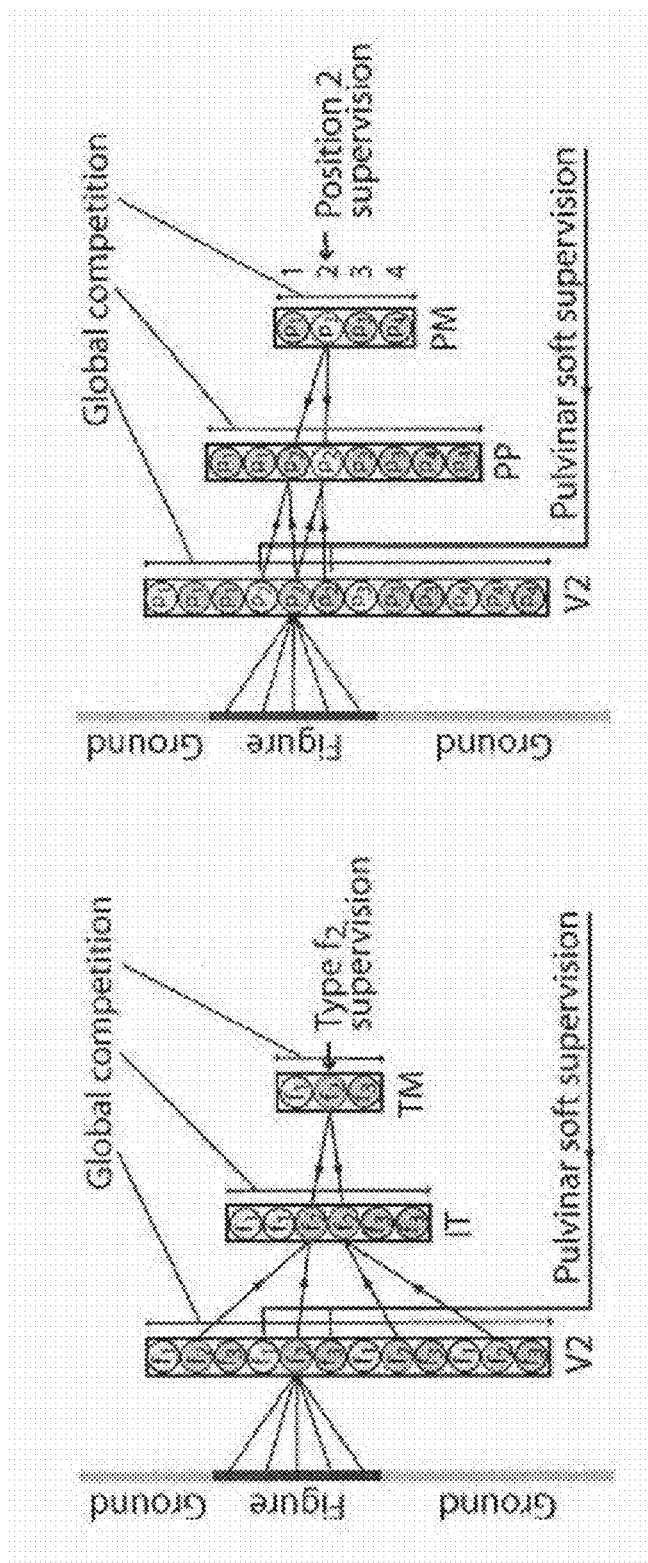
FIGS. 7A and 7B indicate dynamic wiring for ventral and dorsal pathways by LCA, showing how a neuron develops such motor-specific invariance using supervision from its top-down inputs, in accordance with various examples.

Top-down connections supervise the learning of motor-specific invariance, position invariance from TM and type invariance from PM. Label $f_i$ marks a neuron responding to object i, i=1; 2; 3. Assume the top-1 firing rule and only input connections to some typical neurons in IT and PP are shown. Other neurons connect similarly in V2, TM, and PM. FIG. 7A relates to the Ventral pathway. Each IT neuron develops positional invariance for a single type $f_i$ since its top-down signals are type specific $f_i$ and only one neuron fires in V2 at any time. Depending on the availability of neurons in IT, there might be multiple neurons that correspond to a single object type, giving more quantization levels for within-type variation. FIG. 7A relates to the Dorsal pathway. Each PP neuron develops type invariance since its top-down signals are position specific. Depending on the availability of neurons in PP, there might be multiple neurons that correspond to a single position, giving more quantization levels for within-position variation.

In fact, the neuronal wires are automatically connected through the synapse update of LCA. The increment of synaptic vector is yp, response weighted input, as indicated in Eq. (3). Asymptotically, the synaptic vector of a neuron approaches an amnesic average of response weighted input, denoted as $v(t)=E_t[yp]$, where the operator $E_t$ is the amnesic average up to time t. By amnesic average, it is meant that older data are weighted less than a straight temporal average, because of the amnesic function $\mu(n)$ in Eq. (4). Therefore, the condition for a synapse from its pre-synaptic neuron P and its post-synaptic neuron N to be strong is that both neurons fire together often or, equivalently, the following event happens often:

$A$=Pre-synaptic neuron $P$ wins when post-synaptic neuron $N$ wins.

This is because in order for a component in the increment vector yp to be high, the two corresponding factors y and the corresponding component in p must be both high.

Consider that a post-synaptic neuron N fires. The following two typical cases are useful for understanding this simple, but very powerful Hebbian learning mechanism. The first typical case has multiple firing pre-synaptic neurons. The input vector p has multiple pre-synaptic neurons firing as a firing pattern. This is the case when each pre-synaptic neuron locally detects a feature or simply is a pixel, as shown in FIGS. 7A-B, where P neurons are pixels in the foreground figure and N is the 5th post-synaptic neuron in V2. It is important that when N wins, the input patterns p across different times are very similar, so that the average synaptic vector v(t) of N maintains a sharp representation of these similar patterns. If v(t) looks very blurry, the similarity of averaged patterns is too low and, thus, more N neurons are useful to share the variation in p as more neurons result in more quantization levels.

The second typical case has a single firing pre-synaptic neuron. This is the case when a pre-synaptic neuron best matched its type at its position, but the global competition has suppressed all other competing neurons that are not as well matched, as shown in FIGS. 7A-B, where the 5th neuron in V2 is now considered the pre-synaptic neuron P of the post-synaptic neuron N in IT. Suppose that when the first $f_2$ neuron N in IT fires, it "sees" bottom-up input $x_1=(0,1,0,0,0,0,0,0,0,0,0,0) \in R^{12}$ 40% of times and $x_2=(0,0,0,0,1,0,0,0,0,0,0,0) \in R^{12}$ 60% of times. After the amnesic average, the bottom-up weight $v_x$ of N is $v_x = E_t[yx] = 0.4x_1 + 0.6x_2 = (0,0.4,0,0,0.6,0,0,0,0,0,0,0)$ as illustrated for the bottom-up connections from V2 to the first $f_2$ neuron in IT in FIG. 7A. Then, whenever the 2nd neuron or the 5th neuron in V2 fires alone due to global competition, the 1st $f_2$ neuron will be the only neuron to fire, even when no neuron is firing in TM during testing. In other words, average automatically achieves invariance if the presynaptic area has only a single neuron firing.

The following reasoning explains how motor-specific invariance is developed in an SWW network. First, consider V2. During training, a region of size $3 \times 3 \times 3$-neurons centered at the foreground position is softly supervised by the pulvinar during training—no outside V2 neurons are allowed to fire and inside neurons compete to fire. Therefore, from the top-down effect, background responding neurons in V2 cannot survive the global top-1 firing competition. This means that bottom-up attention may significantly depend on experience. Thus, at any time, the neuron that fires in V2 must represent a foreground figure at that location, as shown in FIG. 7A, where the 5-th neuron in V2 wins. However, the where-what network has a limited resource in V2—there are 5 possible object views at each pixel position but only 3 L4 neurons at each pixel position. The nearby L4 neurons in V2 compete for firing, its 21×21 receptive field might miss the center of the figure by 1 pixel in horizontal and vertical directions.

Second, consider IT. During training when the best matched IT neuron fires, the firing neuron "sees" only one V2 firing neuron at a time and the corresponding type neuron in TM must also fire as the supervision is assumed correct. In FIG. 7A, two neurons share all the cases of object $f_2$, while $f_2$ type is high in TM. The upper $f_2$ neuron in IT picks the upper two positions of V2 while the lower $f_2$ neuron picks the lower two positions. Other IT neurons cannot fire for the $f_2$ object as they cannot survive the global top-1 competition in IT.

Third, consider TM. In TM, only a single neuron is dedicated to type $f_2$ as determined by the teacher. When the $f_2$ neuron in TM is supervised to fire, only one of the $f_2$ type neurons in IT fires. According to the above discussion, the bottom-up synaptic vector of the $f_2$ neuron in TM connects to all the $f_2$ neurons in IT through amnesic average.

Then, why is IT used, as TM could be directly connected to V2? If TM is directly connected to V2, each TM neuron must be automatically connected to roughly $20 \times 20 = 400$ neurons in V2, each representing a different figure position. Each synapse has only roughly a 1/400 chance to be updated when the post-synaptic neuron fires. This leads to weak synapses not suited for robust winning under a limited resource in V2.

The reasoning for type-invariance and type-specificity along the dorsal pathway is analogous, as illustrated in FIG. 7B. In various examples, an SWW network developed from a properly conducted training session is able to filter out background in V2, and neurons in IT and TM learn positional invariance while keeping type specificity.

The analysis about type invariance in the automatic wiring along the dorsal pathway is similar, as shown in FIG. 7B. The major difference is that each neuron in PM indicates a position of the figure, instead of type. Thus, neurons in PP and PM automatically learn type-invariance while being position-specific.

In experiments with limited neuronal resource, the SWW networks were not able to memorize every foreground figure pattern in V2. There are many more figure patterns and positions than the number of neurons in V2, especially if an unlimited number of within-class variations is considered. Experiments can show that with a limited finite neuronal resource, there is no guarantee that a network will be able to correctly classify, and estimate the position of, all new unseen images that contains a learned object in an unobserved new natural foreground. However, the temporal mechanism of SWW networks will help drastically, if an overt eye movement can bring a foreground object to the center of image.

Each layer is considered to be a set of "paired layers", so that bottom-up and top-down can compete separately. Evaluations show that only less than 50% recognition rate and positional accuracy are achieved if a single (unpaired) layer is used for each area of V2, IT, and PP. This is because inner product values from a bottom-up input are typically similar, since many V2 feature detectors can get reasonably strong responses from background. However, inner product values from a top-down input vector are very different across neurons. Adding the two inner products together in a single layer before competition caused the winner to be mainly determined by the top-down input. A subjective top-down input can hallucinate a non-existent object from a background. Herein, this phenomenon is called a top-down hallucination. The worst result in a stereo experiment can be seen (FIG. 14) due to the top-down hallucination effect.

In the cerebral laminar cortex, there are 5 layers, L1 to L6. L1 mainly contains axons. L2/3 takes top-down inputs and L5 assists inhibition in L2/3. L4 takes bottom-up inputs and L6 assists inhibition in L4. In other words, competition in the cerebral cortex is carried out for bottom-up input and top-down input separately in their own dedicated layers L4 and L2/3, respectively. The L4 layer represented by LCA competes for bottom-up input x only by computing response $y_4$ and update its layer $L_4$:

$$(y_4; L_4) \leftarrow f_{LCA}(z|L_4).$$

The L3 layer competes for top-down input z only by computing response $y_3$ and update its layer $L_3$:

$$(y_3; L_3) \leftarrow f_{LCA}(x|L_3).$$

The synthesis layer L2 simply adds the two responses point-wise as the output y from the area with paired layers: $y=(1-\alpha)y_4+\alpha y_3$, where a is the relative weight for top-down input (e.g., $\alpha=0.5$). $\alpha$ can be learned as this is a simplified version of LCA. This corresponds to a layer of neurons each having only two synapses, which can be adaptive. This explains that SWW network shown in FIG. 1 has two layers, L4 and L2/3 explained above. For this reason, each area in a SWW network has two layers, one carrying out LCA for bottom-up input and the other for top-down input, as illustrated in FIG. 1. The responses from the two layers are combined by a synthesis layer where each neuron has a small input field of 3×3×3 from L4 and L2/3, respectively. Whether the cerebral cortex has this fine synthesis layer is yet to be verified, but very fine neuronal radial connections have been recently reported.

The above discussed principles for SWW networks can be experimentally studied with visual where-what networks. Five objects were represented, respectively, by 5 foreground images of size 21×21. An input image is composed by placing a foreground image at any position of a background image of size 40×40 pixels, as shown in FIG. 2. Namely, about 75% of the pixels are from background.

The configuration of the network is illustrated in FIG. 1. As the size of the foreground image is fixed, the network can be simplified by dropping early areas such as LGN and V1. For variable object sizes and large object variation, LGN and V1 can be used.

The purpose of this stimuli selection was to avoiding compounding SWW problems with more within-object variation. However, there is no guarantee that a winner neuron in V2 has the exactly correct receptive field for a foreground object because of the limited neuronal resource—there are not sufficient neurons in V2 to memorize all the foreground images. In the example, there are a total of 5 foreground patterns at each position but only 3 bottom-up L4 neurons in V2. L4 must develop LCA features that trade off among types and positions. Therefore, the within-class variability is mainly due to the imperfectly aligned views and the included background pixels due to such misalignments.

In experiments, the SWW networks have been trained for all possible image locations (20×20) for each of the 5 objects, using supervised learning. The desired external actions are imposed at PM and TM, respectively. The desired internal action (attention) is supervised from the simulated pulvinar port, assuming that it provides the needed retinal location to the corresponding 3×3×3-pixel region in V2. Any neuron in V2 will not fire without falling into such a region of pulvinar supervision.

Figure 8A:
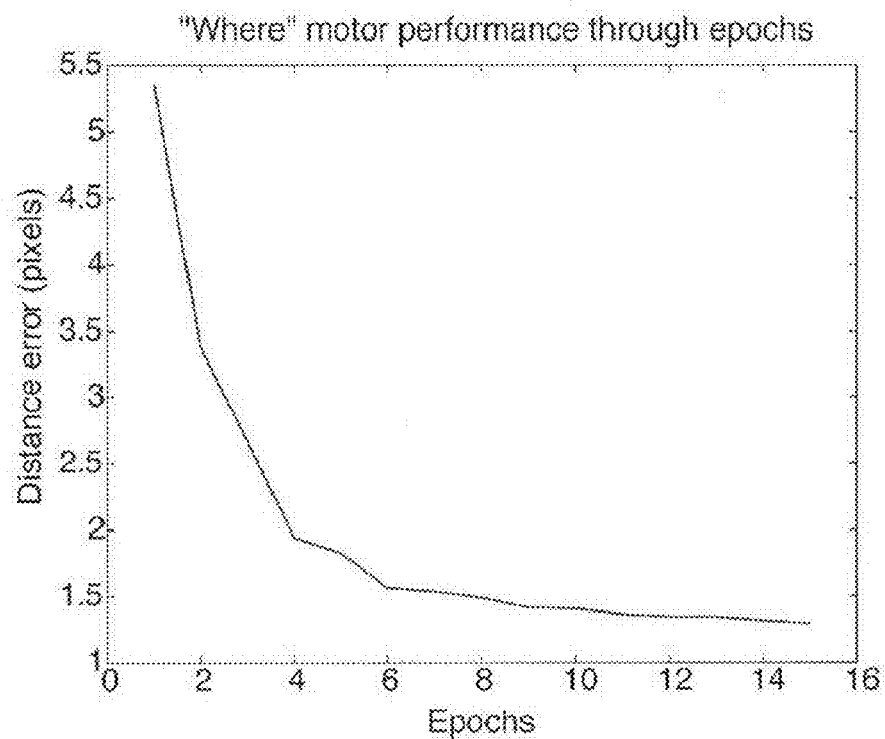
FIGS. 8A and 8B show the engineering-grade performance of the where-what networks for the figure-ground problem, in accordance with various examples.
Figure 8B:
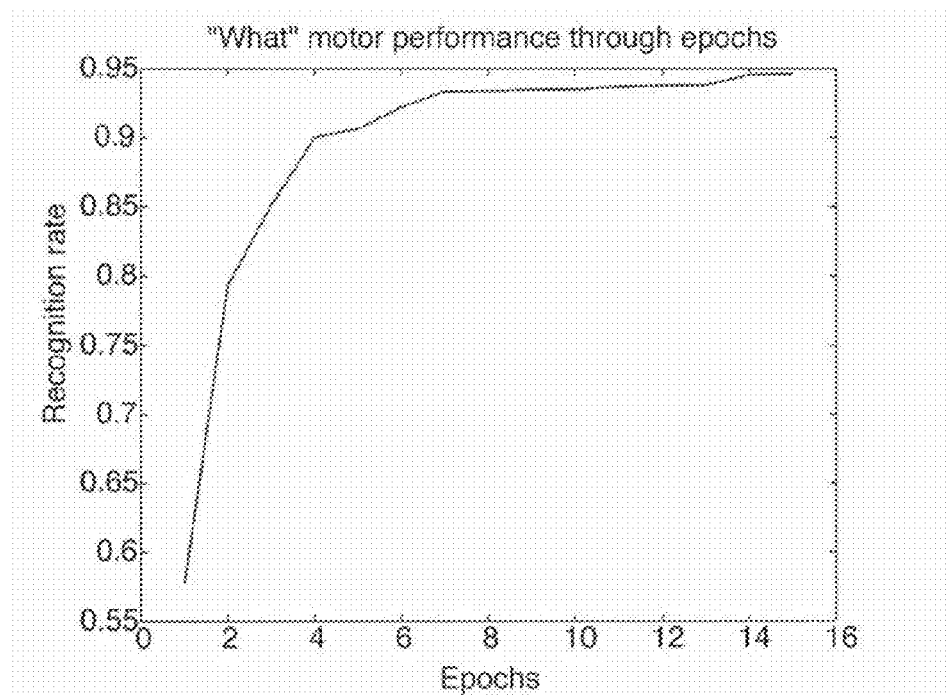

During testing, the networks used self-generated spatiotemporal context at both PM and TM, as the network updates around 5 times for each image input. Regardless of the high number of output neurons at PM (20×20=400), the correct object recognition rate was 94.7% and the average error of the position outputs from PM was 1.24 pixels after 15 epochs of training as shown in FIGS. 8A-B. This is the first time where a simulated network has learned a general purpose visual where-and-what problem—not only how to suppress background, but also generalized across all the receptive fields to reach total positional invariance without a need to hand-program shift-invariance (which cannot handle attention).

FIGS. 8A-B show the engineering-grade performance of the where-what networks for the figure-ground problem. FIG. 8A shows the average errors of the estimated positions of foreground objects in unknown complex natural backgrounds. This decreases through epochs of training experience. FIG. 8B shows the average correct recognition rates or the objects in such backgrounds, which increase through epochs of training experience. Each epoch includes the training data for all the objects at all the possible image positions with natural background images randomly extracted from large natural images.

Figure 9A:
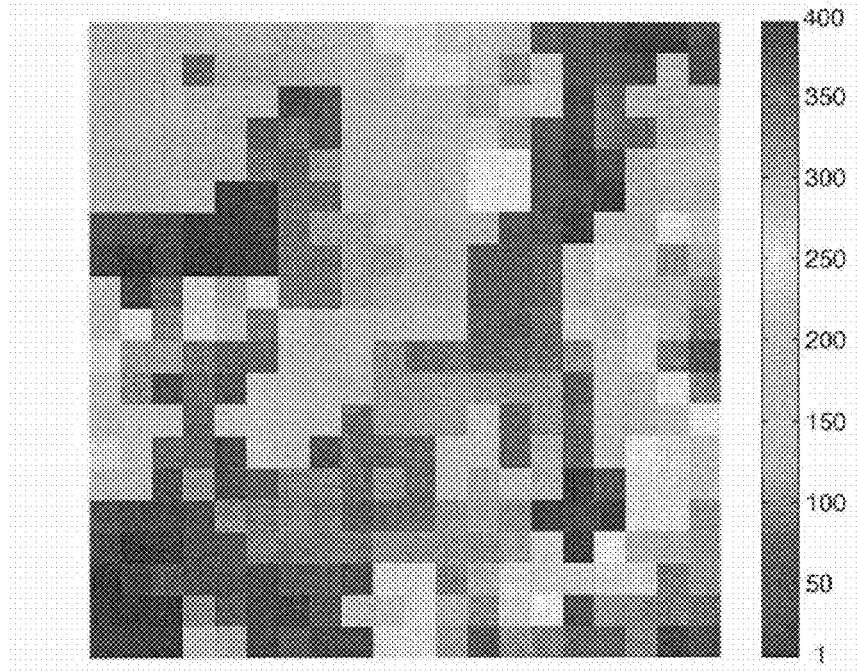
FIGS. 9A and 9B show self-generated bridge representations in a where-what network, in the hidden PP area and the hidden IT area, respectively, in accordance with various examples.
Figure 9B:
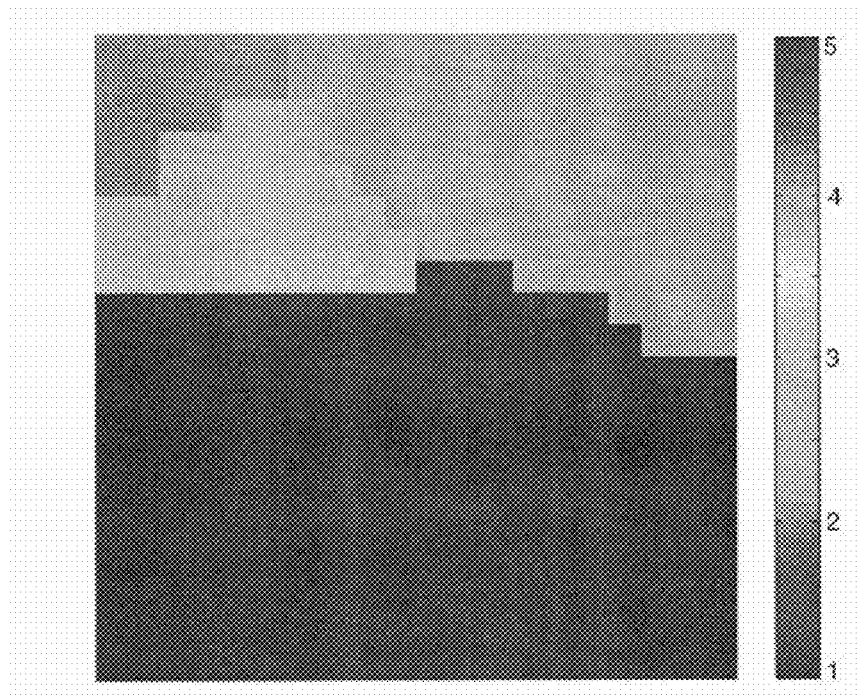

To visualize the distribution of neurons in network areas, an empirical "probability" distribution can be defined for each neuron using the relative frequency $p_i$ for it to win when input image contains a foreground figure of class i:

$$p_i = \frac{n(i)}{\sum_{j=1}^{c} n(j)} \quad (5)$$

where i=1, 2, ..., n for n classes, and n(i) is the number of times for the neuron to win when input image contains a foreground figure of class i. FIGS. 9A and 9B show 2D class maps for PP and IT, respectively. At each image position, a color indicates the class of the largest $p_i$. There are 20×20=200 classes for PP and 5 classes for IT. As FIGS. 9A-B show, neurons that represent the same class tend to group together. Herein, this is called class-specific topographic grouping, a property for the bridge representation between iconic sensory space and abstract motoric space illustrated in FIG. 1. Various examples show that this property is attributed to top-down inputs.

In experiments, with only one neuron allowed to fire for each of the two motors, the temporal information (which is needed to break a tie between two objects or two positions) was not fully used between any two consecutive network updates. Such top-down temporal information is discussed in the next section.

Temporal Mechanisms can be viewed as chunk three. This chunk corresponds to how the SWW networks deal with information that spans a variable length of time. For example, the neuronal learning mechanisms of Spike Timing-Dependent Plasticity span an interval of 50 ms. However, this short time span is not sufficient to explain how the brain deals with longer temporal context. Some neuroscience researchers argued that cerebral cortex does not use specialized timing mechanisms such as delay lines, oscillators, or a spectrum of different time constants. Consistent with their views, the DP for SWW networks here indicates that these characteristics are consequences of the genomic equivalence principle. A meaning-dependent design of temporal network structure is not only inconsistent with the in-place learning principle, but also insufficient to deal with complex temporal abstraction to be discussed next.

From a few examples, one can understand the challenge of dealing with temporal context. The first problem is object permanence—how does a network perceive different views of the same object in a scene as the same object, instead of irrelevant snapshots? Existing recurrent networks for temporal processing (e.g., the Hopfield Net, the Elman Net, the Jordan Net, wave-propagation SOM) use local framewise feedback to generate temporal iconic states. Object-based abstraction required for object permanence is elusive. The second problem is the explosion of iconic memory through time, if each sensory frame is temporarily stored for the detection of temporal context. Consider text processing by reading one word at a time. If the vocabulary size is k=50000, the number of possible sequences of length n is equal to $k^n$=50000$^n$, which will be larger than the total number of neurons in the brain when n is as small as 3. The third problem is time warping—when the network reads a text sentence, how does it perceive the same meaning of a text sequence although each word is presented for a different among of time while the network updates at frequency $f$? The same time warping problem exists in speech recognition and visual event recognition.

As explained next, the framewise motor-based abstraction scheme in the where-what networks discussed above and the single-motor networks discussed next address the above three major temporal problems altogether. Temporal context at each frame is abstracted in the form of equivalent action (not iconic with many forms) to avoid the explosion problem of iconic memory. Further, the framewise motor-based abstraction scheme not only naturally addresses the time warping problem, but also the more general problem of attending any subset of temporal context of a dynamic temporal length.

Consistent with the views that the brain deals with time without using expensive iconic memory or explicit time-delay lines, the SWW network deals with time using the same spatial network. This is possible and natural because the spatial network itself is abstractive at the motor end (e.g., object type at TM and image position at PM). Therefore the DP for SWW networks can be very simple: All the neurons in an SWW network take the values of neurons at the time instant t as input, and get the update neuron response ready by time t+τ, where τ is the period of network updates. This is called asynchronous updates—no master clock is needed.

Figure 10:
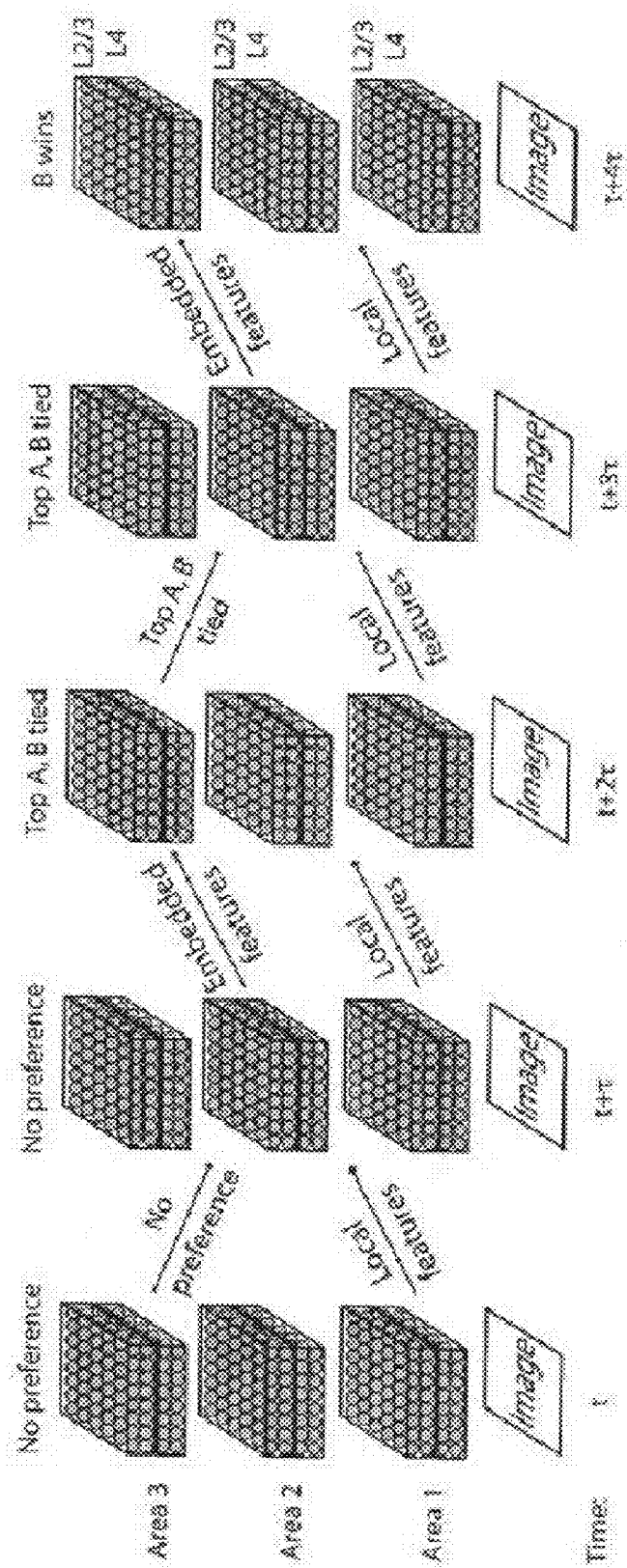
FIG. 10 illustrates an example of the temporal mechanisms of the SWW network, in accordance with various examples.

FIG. 10 illustrates an example of the temporal mechanisms of the SWW network. The network samples the real world at a frequency $f=1/\tau$, no matter whether sensory input changes or not. From the left to right: input without top-down context; bottom-up features computed at the middle cortex; competition at the higher cortex results in a tie for A and B classes (top-k neurons firing, where k>1); using A-B tied as the top-down context, newly attended features are computed by LCA at the middle layer; Class B wins at the motor area.

As illustrated in FIG. 10, the temporal context of SWW network is recursively integrated with the spatial context into the corresponding spatial coding in the network. In various examples, an SWW network runs continuously from time $t_0$. Let the discrete index n represents time $t_n = t_0 + n\tau$. Consider a three-area network in FIG. 10, running at discrete times $t_n$, n=1, 2, .... Area 1 simply contains the current input image of an image sequence. Area 2 is the bridge (hidden) area which embeds the inputs from area 1 and area 2. Area 3 is the output area, representing equivalent abstraction.

At time $t_n$, input $x(t_n)$ is present at area 1. Area 2, based on its area memory $A_2(t_n)$, receives $x(t_n)$ from area 1 as its bottom-up input and the last response $z(t_n)$ from area 3 as its top-down context, to compute the area 2 response $y(t_{n+1})$ and update its area memory to $A_2(t_{n+1})$:

$$(y(t_{n+1}), A_2(t_{n+1})) = f_2(x(t_n), z(t_n) | A_2(t_n)), \quad (6)$$

where $f_2$ denotes the area 2 function implemented by LCA. The major function of area 2 is selective embedding—recursively embedding the last temporal context $z(t_n)$ and the latest new input $x(t_n)$ into a single-area response $y(t_{n+1})$.

Next area 3, based on its area memory $A_3(t_{n+1})$, takes $y(t_{n+1})$ from area 2 as its bottom-up input, to compute the area 3 response $z(t_{n+2})$ and update the area memory to $A_3(t_{n+2})$:

$$(z(t_{n+2}), A_3(t_{n+2})) = f_3(y(t_{n+1}) | A_3(t_{n+1})), \quad (7)$$

where $f_3$ denotes the area 3 function implemented by LCA. The major function area 3 is abstractive mapping—mapping embedded response $y(t_{n+1})$ in area 2 to the corresponding abstract equivalent class represented by area 3 output $z(t_{n+2})$. If the teacher wants to supervise the motor, she imposes the desired value $z(t_{n+2})$ to represent the equivalent class $\phi$(w) of the attended part of the sensed context w.

There are several basic operations:

1. Link: If $z(t_{n+2})$ represents the context $z(t_n)$ followed by $x(t_n)$, the SWW network "links" contexts to make the temporal context longer. For example, if $z(t_n) = \phi$(abc) and $x(t_n) = d$, then $z(t_{n+2}) = \phi$(abcd), linking the class of abc with the class of d.

2. Drop prefix: If $z(t_{n+2})$ represents the equivalent class of $x(t_n)$, the network "drops" the prefix before $x(t_n)$. For example, if $z(t_n) = \phi$(abc) and $x(t_n) = d$, then $z(t_{n+2}) = \phi$(d), dropping the prefix abc.

3. Drop postfix: If $z(t_{n+2}) = z(t_n)$, the network "drops" input $x(t_n)$ as it keeps the last context unchanged. For example, if $z(t_n) = \phi$(abc) and $x(t_n) = d$, then $z(t_{n+2}) = \phi$(abc), dropping the postfix d.

From the above three basic operations, it is clear that such a network is able to attend any subset of the temporal context along the time axis and abstract the subset to the equivalent class at the motor output. The dually optimal LCA dynamically, recursively, and optimally embeds, at every network update, the joint distribution of bottom-up and top-down inputs p=(x,z) into the spatial representation in its neuronal layer. The key in supervised teaching is to supervise the equivalent class 0 at the motor output port at the proper time. These three basic operations are applicable to a network having more number of areas. This new temporal mechanism addresses the three problems below.

Hidden Markov Models (HMM) and Markov Decision Processes (MDP) have been widely used to detect temporal sequence with time warping. However, there are several major limitations with them:

1. Manual internal management during learning. For example, an HMM-based system of speech recognition typically contains many HMMs. Through human hand management, an internal HMM is dedicated to a hand-selected word and, further, each internal HMM receives only samples of the same word during training. In contrast, the DP for the SWW network handles internal wiring autonomously during training.

2. HMM and MDP are passive—they do not have a framework of internal action such as internal attention. For example, the probability of staying in the same state will drop if the stay time is increased. In contrast, the SWW network is active. Its hierarchical state is represented by the firing pattern at multiple layers, but its abstract state is supervised at the motor end. This enables an SWW network to handle time warpings that greatly deviate from all sequences that have been observed.

3. Atomic representation of HMM and MDP and many other symbolic representation methods—a separate node is required for a different concept or state. In contrast, a SWW network uses distributed representation. A layer of n neurons in the SWW network can represent at least $2^n$ patterns in theory, which means only a linear space complexity and linear computational complexity O(n) must deal with an exponential number $2^n$ of patterns, if the number of synapses is considered constant. In the brain, the average number of connections of a neuron is on the order of 1000.

The self-generation of temporal context can be understood as follows. For simplicity, consider a three-area network as shown in FIG. 10, but the lowest area only takes image input without doing any computation. Consider that the SWW network scans a sequence of words in an article but it needs to convert the text into a desired concept of temporal context. Note that a sensory input is iconic (pixel-like) but motor action is often abstract. Any human communicable concept can be said, written, or signed, through motors. From the sensory end to the motor end, the corresponding bridge representation in each area is less iconic and more motoric. Thus, the SWW network represents the designed temporal context as a firing pattern at its motor output. Immediately after reading the next new word $x_n$, all the network needs to do is to take the current temporal context $z_n$ and the new word to generate the response $y_{n+1}$ at the middle layer. In the next time instant, the motor layer maps the bottom-up $y_{n+1}$ input in the middle layer to its motor output $z_{n+2}$. Like a pipeline, an SWW network with 1 layer needs minimally 1 step for the motor output to generate the action that corresponds to the sensory input, as illustrated in FIG. 10. In an example, the imposed output at the motor is critical: The teacher supervises the motor output pattern that maps many equivalent sensory sequences (potentially infinitely many) to a single, equivalent class at the motor output.

The active handling of time warping is performed as follows. A blank space input is placed between any two words. While the network stares at the same word, the network can update as many times as needed. The motor action is always adaptive to the speed at which the words are fed in, as long as the network was taught properly so that the motor action in the network remains the same if the postfix of the context and the current input word are the same. If two consecutive words are the same in a sentence, a space between them identifies this case. In other words, it is the active action of SWW network—generating the equivalent motor action—that handles the time warping. In contrast, HMM and POMDP require computation of transitional probabilities which leads to a lower probability if the duration of a word is unusually long.

The explosion of iconic memory is contained too. Still assume that the number of spatial object appearances to be k but further the total number of equivalent object classes is m. Therefore, on average, each object class has k/m appearances. The total number of attended equivalent motor classes from all sequences of length n is c which is large but hopefully much smaller than $m^n$. This number c also depends on the experience of each SWW network. At each frame time t, the total number of equivalent classes in the temporal context is $c_t$<c. The SWW network recursively compresses $c_t$×k possible context-appearance pairs down to $c_{t+1}$ number of motor contexts. The number of attended contexts is always contained.

The SWW network clarifies how top-down information from motor (or later cortical areas) maintains a set of learned equivalent classes across time. Note that high level is not limited to a conceptual hierarchy. For example, the representation of "a fruit" is not higher than the representation of "an apple," but the developed neuronal connection patterns may reflect their semantic relationships. If teaching is done properly, different temporal bottom-up input sequences are mapped to the same equivalent class represented as a unique pattern in the motor output.

Figure 11:
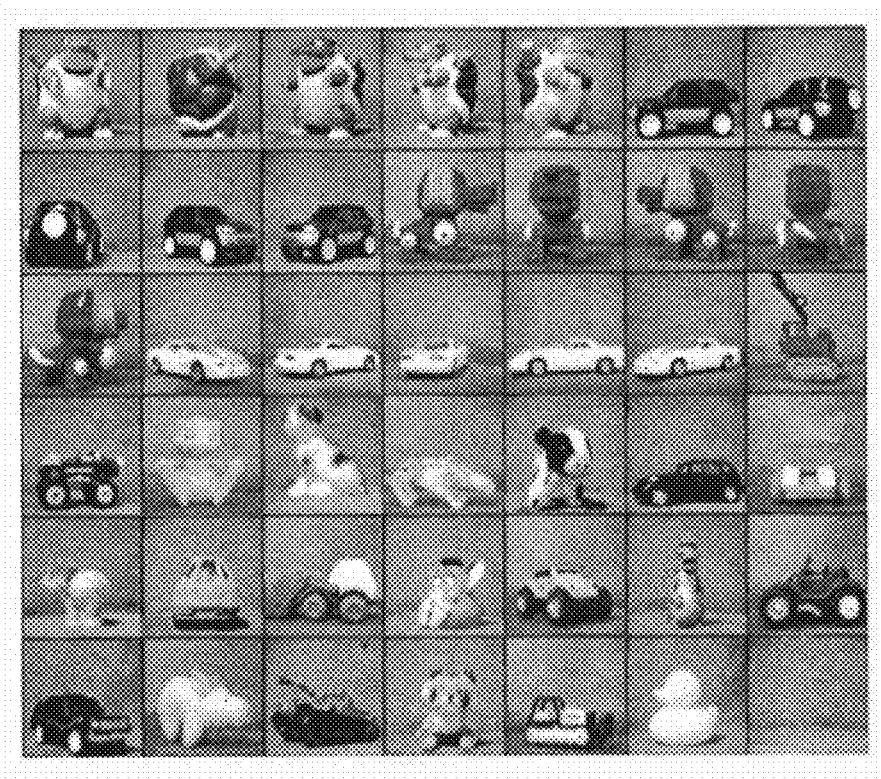
FIG. 11 shows images of twenty-five 3-D objects plus a background used for training and testing, in accordance with various examples.

In an experiment, a limited size network gave almost perfect 3D object recognition from untaught video sequences that were similar to those which were taught. The major purpose of this experiment is to understand the power of the SWW network to deal with within class variation. In this experiment, the objects are always placed roughly at the center of an image. Twenty-five 3-D objects were used, whose images are shown in FIG. 11. Some sample images of 25 3-D objects plus a background were used for training and testing. Each object was placed on a rotary base, which rotated horizontally in the full range of 360 degrees. 200 images of 56×56 pixels were taken in sequence for each object. At the experimenter's rate of rotation, the 200 images covered about two complete rotations of 360°. The image capturing process was intentionally not too controlled, so an object may vary slightly in position and size throughout its sequence to simulate imperfection of overt eye fixation. Including an additional empty (no object) class, there were 200×25+1=5001 images totally. Every fifth image in each object sequence was set aside for testing. To increase the difficulty level, only grayscale images were used.

A limited-size three-layer network like that in FIG. 8 was used, but each area is uniform (no paired layers L2/3 and L4). The first layer is simply a port for input images. The second layer of the network has only 20×20 neurons. If these neurons are considered to tile the space of 25 objects× 360°/objects=9000°, a variation of 90° of object views has only 4 neurons to quantize. The motor layer has 26 neurons, each representing one of the 25 objects plus the "empty" class.

Different networks of the same limited size of three layers were trained. A parameter α, 0<α<1, used for all neurons in layer 2 is the relative energy of the top-down input, and β=1−α is that of the bottom-up input. Thus, α=0 corresponds to a network that does not use top-down context and α=0.9 indicates a network that uses a lot of top-down input.

After each epoch of training, these networks were tested using the disjoint test set (i.e., none of the tested images is in the training set), also presented in object sequences with a few empty frames in between objects. What is interesting is that at each time step the networks with top-down context generate a different top-down attention control which selects new features from the bottom-up input.

Figure 12:
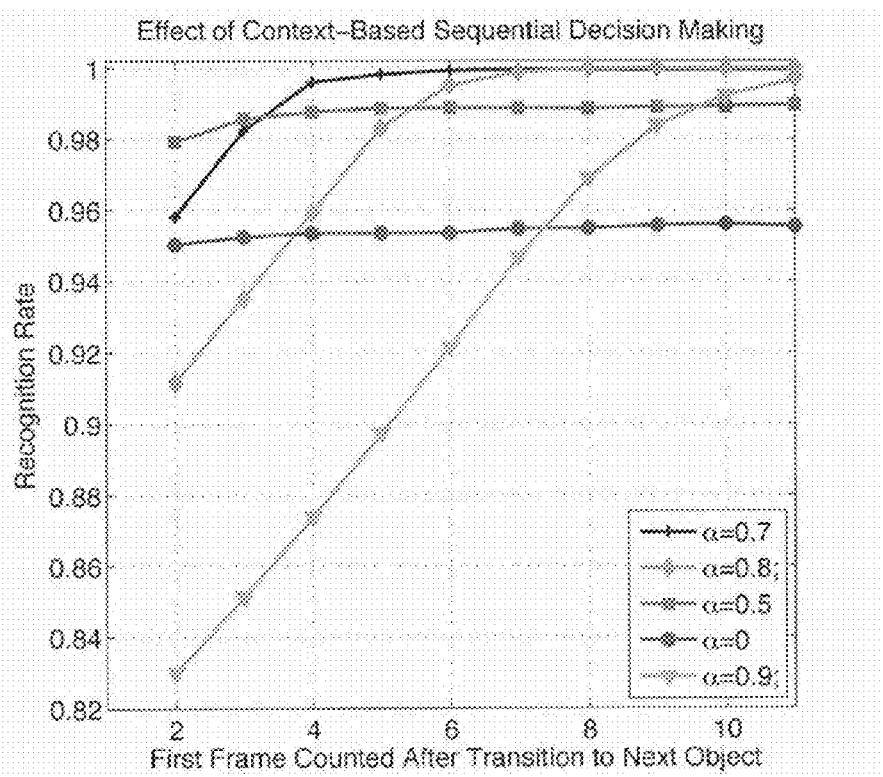
FIG. 12 shows a nearly perfect frame-wise motor-based abstraction scheme-made disjoint recognition, in accordance with various examples.

Sequential attentive updates made recognition almost perfect. FIG. 12 shows the framewise motor-based abstraction scheme made disjoint recognition almost perfect. The vertical axis indicates the average recognition rate for unseen views by the trained limited-size network, averaged over all the test frames from the i-th frame. The horizontal axis indicates the frame number i, the first frame counted for recognition rate after the input image stream transits to the next object. As it takes at least two time steps (frames) for the information from each image to go through the network and reach the motor output, the first testable frame is the 2nd frame. The plot shows that without top-down context α=0, there is over 4% error. When top-down input takes about 70% energy (α=0.7), the recognition is almost perfect after the seventh sequential decision (internal attention). With more top-down energy, almost perfect recognition will also arrive, but later.

As shown in FIG. 12, the network takes every time step to "think" (update the network) using top-down attention while different views of the unknown object flow in. As shown in FIG. 12, the network with α=0.7, took an average of 5 additional views (about 200 ms if the images are updated at 30 Hz) of the same object to be almost perfect in classification all the unseen views. (If the brain updates at 1 k Hz and a human needs 100 ms to produce an action, the brain took 100 times steps.) It is surprising that top-down attention can eliminate almost all the errors in one-shot recognition (α=0). This is in sharp contrast with the conventional wisdom of one-shot pattern recognition in disjoint tests that do not re-use top-down information self-generated.

The results indicate that α=0.8 or larger requires relatively more views to reach an almost perfect recognition because the injected momentum of top-down context is larger (too "subjective" when the network "thinks"); yet α=0.5 or lower does not inject a sufficient amount of top-down context to enable an almost perfect recognition (not sufficiently "subjective").

The networks all learned fast, due to the dual optimality of LCA as discussed above. They reached 90% of the final recognition rate after the first epoch and about 99% after the second. It took at least two time steps for these 3-layer networks to generate the corresponding action (which was classification).

Figures 13A, 13B:
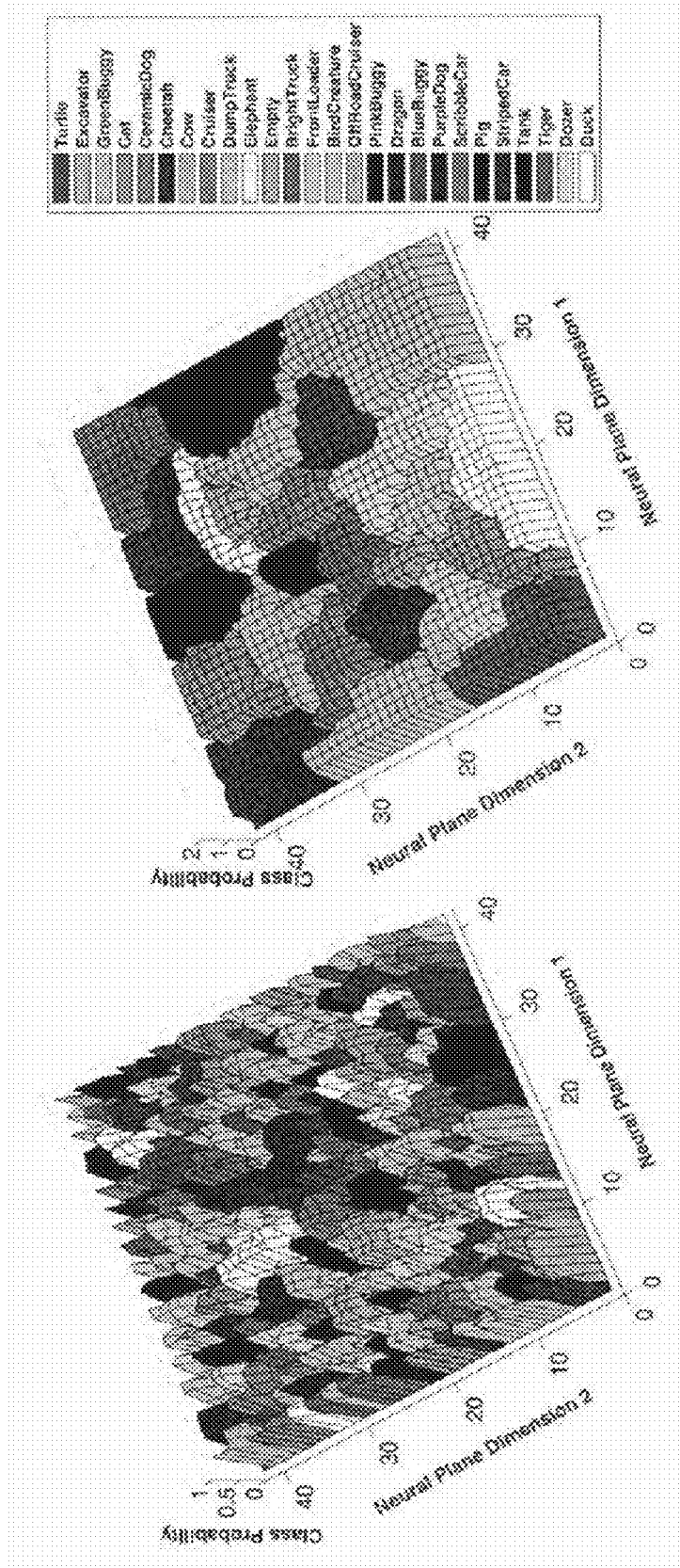
FIGS. 13A and 13B illustrate class-specific topographic grouping, in accordance with various examples.

FIGS. 13A-B illustrates class-specific topographic grouping. In class-specific topographic grouping, neurons that respond to the same class are localized if top-down inputs are used. This provides a new discovery about abstractive internal representation. The vertical axis indicates the class probability when a neuron in layer 2 becomes the winner during the test. For finer representation, 40×40 layer-2 neurons are used for this visualization purpose. FIG. 13A shows the situation without top-down input (α=0), which does not develop grouping, and shows an average error rate of 0.63%. FIG. 13B shows the situation with top-down input (α=0.7), where effective grouping is evident, with an average error rate of 0.33%.

FIGS. 13A-B show that with top-down inputs (α=0.7), neurons that respond to the same class are grouped more tightly as shown in FIG. 13b than the case without top-down inputs (α=0). Therefore, the class-specific topographic grouping is attributed to top-down inputs. This property predicts that top-down input from downstream motor area is a computational reason for the formation of the fusiform face area (FFA) and the parahippocampal place area (PPA) region in the brain.

It is known that there are disparity tuned cells in V1 and V2. It is still not clear how they emerge from experience. Existing engineering techniques involve explicit left-and-right feature matching, explicit or implicit. Such techniques do not permit tight integration of other stereo relevant information, such as shape and shading. Network-based stereo methods have been published but all of them suffered from the precision problems. Previous discussion herein of the top-down effect, with respect to FIGS. 6A-C, 4 explains computationally how the top-down signals that are related to object distance (e.g., a hand reaching for an object) can recruit disparity turned cells in V1, V2 and other areas along the dorsal pathway.

Figure 14:
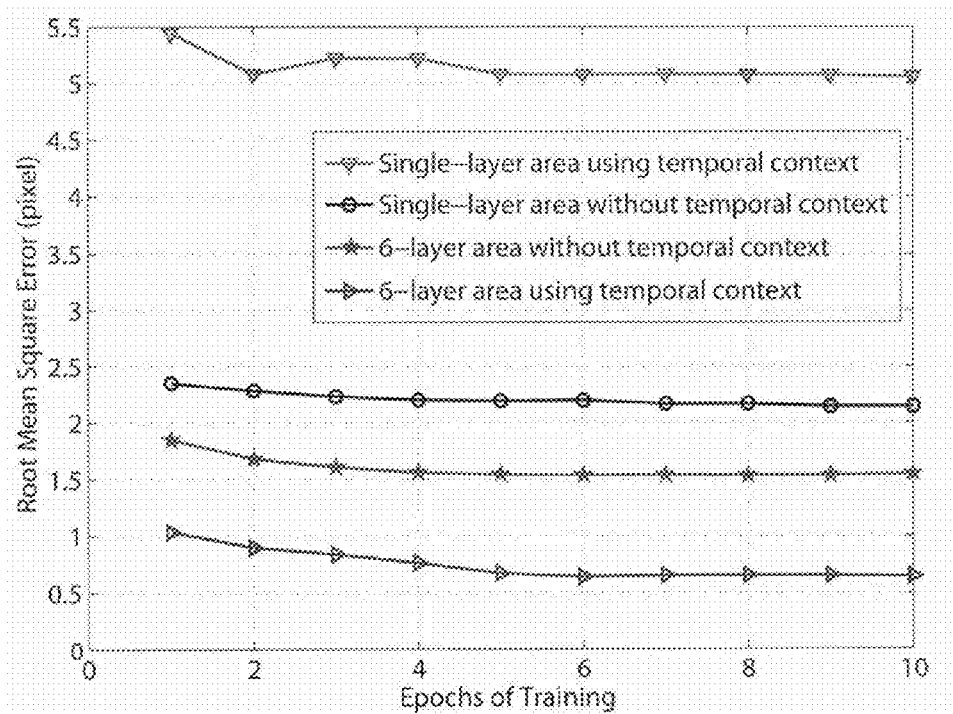
FIG. 14 shows a 6-layer laminar architecture and temporal context jointly, which improves performance of free-of-matching stereopsis, in accordance with various examples.

FIG. 14 shows the 6-layer laminar architecture and temporal context jointly made a drastic difference in the performance of free-of-matching stereopsis. The average of stereo estimation improves over epochs of training, showing how temporal context signals and 6-layer architecture improve the accuracy of outputs. The input to the network is a pair of image rows, each 20 pixels wide, extracted from the natural images. The right-view was shifted by one of 17 integer disparity values between −8 and +8 pixels. From seven randomly selected large images, five were chosen for generating stereo rows for training and two for disjoint testing. A three-area SWW network was trained, with area 1 as the input layer without computation. Area 2 has a paired 6-layer structure with 40×40×1 neurons in each layer. The motor layer has 17 neurons, representing one of the 17 disparities.

Due to top-down hallucination, temporal context caused the average error to deteriorate from about 2.2 pixels, to a near chance level of 5.0-pixels, if the single-layer architecture is used in area 2. The 6-layer (paired layers) architecture is very effective for top-down temporal context, leading to a surprising, unprecedented sub-pixel accuracy (around 0.7 pixels). The natural texture images used for testing have not been used for training.

SWW networks can be applied to complex text processing. Text processing requires more complex temporal context although each word has zero within-class variability. Several complex text processing tasks have been successfully tested using single-layer architecture of SWW networks. They include recognizing synonyms; classifying phrases; word sense disambiguation based on temporal context; and recognizing new sentences that have not been learned using state equivalence (all 100% correct). The networks have also been tested on complex text processing tasks for natural languages, including part-of-speech tagging (assigning the words in a sentence to the corresponding part of speech, 99.6% correct); and chunking (grouping subsequences of words as syntactic chunks and classify the chunks by syntactic labels, 95.2% correct). The corpus used was extracted from the CoNLL-2000 shared task 2, tagged from the Wall Street Journal corpus, but the present subject matter is not so limited.

A SWW network can learn and act continuously through time. The network's attention changes as long as one or more of the following three events occurs: (1) the input image changes due to an external world change or its eye motion (controlled by position motor outputs), (2) the position information in PM changes, or (3) the type information in TM changes. Attention can be generated-internally, while a new image is received, but the PM and TM are left free (the output is not imposed). If the firing neuron in a motor is suppressed through time (e.g., novelty wanes), the next winning neuron pops up, leading to position-based or object-based attention shifts. Attention can also be directed externally as the user commands. A user's activation of a neuron in PM leads to a position directed covert saccade. A user's persistent activation of a neuron in TM leads to type directed object search and then object tracking.

In contrast with conventional wisdom, bottom-up saliency in SWW networks is, at least partially, a result of past associated motor activities, via the top-down projections from the two types of motors—position and object. This is because during the teaching session, the corresponding supervised position motor and the supervised object motor pass top-down signals to early best matched object responding neurons to enable them to win globally (retinally) while competing with other background responding neurons. This winning in early layers recruits neurons for more exact matches in the future, which will increase the future chance of foreground representing neurons winning while competing with all background responding neurons (for different backgrounds), with or without top-down attention. In other words, the more frequently attended, the more likely something salient will "pop up".

Any type of sensory invariance can be automatically learned by the SWW networks, at least in principle, including position, viewing angle, size, lighting, or various shape deformations. The examples reported herein relate to success in dealing with variations in position and viewing angle, because of the recency of the discussed three-chunk discovery. This implies that it is computationally possible for the genome not to imbed environment-dependent invariance, although such a possibility needs to be further biologically verified. In other words, invariant cognition can arise from consistent time proximity between each attended sensory input and the corresponding motor action. It is important to note that the "active motor action" here does not have to be overt. In a mature brain, the corresponding firing in pre-motor area without the corresponding overt action in the motor area plays the same rule.

The dual optimality of the LCA-based neuronal layers (Chunk one) is critical for demonstrating engineering grade performance with a limited size network. Like a puzzle, these three top-level chunks (the dual optimality of the LCA-based neuronal layers, spatial mechanisms, and temporal mechanisms) depend on one another in the herein reported small scale but engineering grade successes. Without the spatial mechanism in SWW, feedforward processing is insufficient for finding a learned object in complex unknown background. The current bag-of-feature approach in engineering visual and text processing systems is not sufficient to take into account the relative positions of objects and words. The expected wide applications of SWW networks and the need for large-scale real-time learning hardware can motivate production of brain-scale hardware chips that develops actual wiring from real time experiences.

Figure 15:
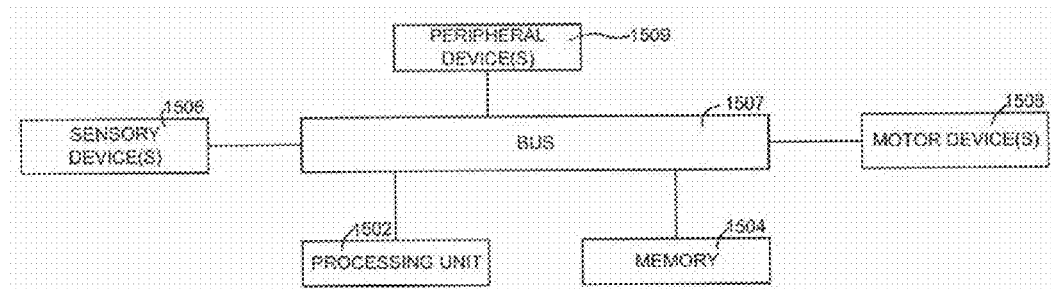
FIG. 15 shows a block diagram of an example of a system configured to apply spatiotemporal methods in accordance with various examples.

FIG. 15 shows a block diagram of an example of a system configured to apply spatiotemporal methods in accordance with various examples of the invention. The system can be structured as a distributed system. The system can be structured as a machine. A neuromorphic spatiotemporal wherewhat machine can be realized as a robot-like apparatus. The system includes one of more sensory devices 1506, one or more motor devices 1508, a processing unit 1502 operating in conjunction with memory 1504, peripheral devices 1509, and a bus 1507 operable to provide communications among the components of the system.

Sensory devices 1506 can include imaging devices such as cameras and other optical devices that can collect or capture images or data that provide image information. Yet, sensory devices 1506 are not limited to imaging devices. The motor devices 1508 can include various devices that allow the system to perform some activity. The nature of peripheral devices 1509 depends on the function of the system. Data can be provided from sensory device(s) 1506 to processing unit 1502 via bus 1507. Data can be provided from motor device(s) 1508 to processing unit 1502 via bus 1507. In addition, the processing unit can provide data, which may include control signals, to sensory devices 1506, motor devices 1508, and peripheral devices 1509 via the bus 1507. Processing unit 1502 and memory 1504 can engage in bidirectional communication via bus 1507. Various combinations of direct connections among the components of the system can be used in addition to or isolated from the bus communication.

Processing unit 1502, memory 1504, sensory devices 1506, and motor devices 1508 can be realized in a configuration that provides for software processing that is massively parallel. Alternatively, the system can be configured for limited parallel processing. Further the memory may be realized as machine-readable medium having machine-executable instructions, such as a computer-readable medium having computer-executable instructions, for operating the system to apply spatiotemporal methods in accordance with various examples of the invention. The machine-readable medium is not limited to any one type of medium. Various examples or combination of examples for the system to apply spatiotemporal methods can be realized in software implementations and combinations of hardware and software implementations.

5-Chunk

Some examples include a general purpose model of the brain, called a Self-Aware and Self-Effecting (SASE) model. Examples provide a general-purpose cell-centered in-place learning scheme to handle various levels of brain development and operation, from the cell level to the brain level. Various examples provide five "chunks" of the brain "puzzle": 1) development, 2) architecture, 3) area, 4) space and 5) time. The "development" chunk is associated with a practical brain, natural or artificial, that autonomously develops through interactions with the natural environments, without any previously given set of tasks. The "architecture" chunk handles: (1) complex backgrounds where, at least in some instances, the signal-to-noise ratio is smaller than 1 (<0 db) (e.g., more input components are irrelevant to immediate actions than those that are relevant); (2) abstraction, reasoning and generalization with abstract and concrete contexts; and (3) multiple sensory modalities and multiple motor modalities and their integration. The "area" chunk is associated with feature development and area representation, without rigidly specifying what each neuron does. The "space" chunk is associated with foreground objects within complex backgrounds and includes conflicting invariance and specificity criteria for type, location, size, orientation, expression, etc. Learned context-dependent spatial attention addresses these sometimes conflicting spatial criteria. The "time" chunk is associated with the brain's use of intrinsic spatial mechanisms to deals with time, without dedicated temporal components. Various examples relate to practical temporal contexts, including the conflicting criteria of time warping, time duration, temporal attention, long temporal length, etc. Various examples include learned context-dependent temporal attention to provide these criteria.

In various examples, the "developmental" chunk includes task-nonspecificity, emergent representation, and skull-closedness aspects. In some examples, the "architecture" chunk of the puzzle outlines how basic units are put together. The "area" chunk serves as a basic unit, i.e. general-purpose unit or building block for the architecture. The "space" chunk describes how the brain deals with spatial information, for elements in the external environment (e.g., outside the brain) and elements inside the brain that spread out in its internal space. The "time" chunk schematically clarifies how the brain deals with time beyond the short time span of 50 ms characterized by the intrinsic biological properties of a single neuron.

Demonstrated by human cognitive and behavioral development from infancy to adulthood, autonomous development is nature's approach to human intelligence. Because symbol only modeling is insufficient to deal with uncertainty, a Bayesian probability framework was added to such symbolic models, using either probability models for spatial aspects or Markov chains for temporal aspects. However, Bayesian models are not developmental and the symbolic boundaries ("walls") 1704 between different internal units (nodes or Markov chains) were handcrafted or defined by human programmers. Thus, they belong to the architecture of FIG. 17A. This approach represents a "skull-open approach" to the brain. In various examples, a teacher understands a given task and the concepts it needs. Then it manipulates the "brain's" internal representation through its open "skull". Skull-open approaches are labor-intensive to build and brittle for the real world environments. Given a task, the process of handcrafting a brain-like information processor requires a large amount of man-hours for manual instantiation of an internal representation for each task. The resulting system is known to be brittle due to the inability of a human to sufficiently predict the dynamic real world.

Figure 16:
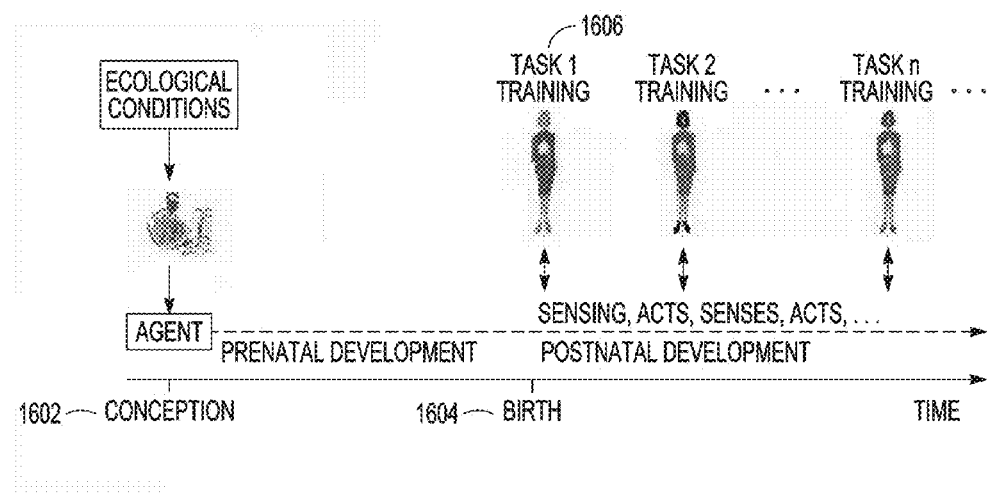
FIG. 16 shows a method of autonomous mental development by machines, inspired by human mental development, according to various examples.

A human brain is gradually developed together with the body from conception, to birth, to infancy, to adulthood, all through active sensorimotor experiences. Without the process of development, there is no signal processor. The genome is known as a developmental program (DP). For machines, the DP can be directly designed to short-cut evolution. FIG. 16 illustrates one example of autonomous mental development (AMD) for machines.

FIG. 16 illustrates a method of autonomous mental development by machines, inspired by human mental development, according to some examples. In some examples, no task is provided during the programming (i.e., conception) time 1602. A general-purpose task-nonspecific developmental program is loaded onto the agent's "brain," in various examples. In certain examples, prenatal development may preliminarily wire the "brain" before "birth" 1604 using "spontaneous" (e.g., internally generated) signals, such as those from sensors and motors. After the "birth," the agent starts to learn an open variety of skills and tasks through interactions with the physical world. In various examples, this includes training 1606. During the development, the "brain" is "skull-closed" meaning that there is no or a reduced need for the programmer to directly intervene in the brain's internal representation after the conception. The tasks that the agent learns during lifetime are determined after the birth by other users and, therefore, the brain's internal self-organization is totally autonomous (i.e., emergent representation).

In some examples, within a distributed DP, the developmental process depends on interactions among neighboring cells as well as the locally and remotely connected cells, while the entire process is regulated by the genome in the nucleus of every cell. In some examples, the brain's internal representation is not totally innate. Internal representation is a compounding result of the genome and the experience, instead of rigidly specified by the DP, in certain examples.

Various examples include 1) task nonspecificity, and 2) a skull-closed approach throughout a brain's learning for emergent internal representation. "Task nonspecificity" is associated with a genome (i.e., natural developmental program) and is responsible for an open variety of tasks and skills that a newborn will learn through their lifetime, in various examples. Many tasks (e.g., task environment and task goals) are unknown to prior generations. In some examples, it is difficult or impossible for task specific information to be kept in the genome as a part of the hereditary information from the parents. Without knowing any task, a DP designer (i.e., the nature's evolutional process or a human programmer) creates a smart mechanism that regulates the development of the brain's internal representations autonomously for an open variety of future skills and tasks.

In some examples, "skull-closed" relates to conditions in which a teacher or operator is restricted from one or all of isolating modules from the "brain," defining their roles and the meanings of their input ports and output ports, training them individually and manually linking them to the brain. In some examples, such skull-open functions are accomplished with machine learning using human designed symbolic "walls." In contrast, during the autonomous development of a natural or an artificial brain, the brain is "skull closed," and the teacher has access only to two ends of the brain, its sensors and its effectors. In some examples, the teacher does not have direct access to its internal representation. Therefore, the DP should regulate the development of internal representations using information from these two ends. The agent should develop mental skills for an open variety of tasks incrementally without requiring human re-programming or direct internal manipulations after its "birth." Internal sensation and internal action (i.e., thinking) are associated with development.

Autonomous mental development provides several benefits. A first benefit is that the resulting brain is less brittle. Examples that include many neural network methods require a "skull open" approach. In these examples, the holistically-aware central controller, at least at the linking ports of the separately trained modules, is a teacher. This holistically-aware human central controller implants static meaning "walls" which lead to a brittle "brain" because no static meaning "walls" appears sufficient for dynamic real-world environments. For example, he may specify "oriented edges" or "SIFT feature" as a static representation for the feature module. This approach is insufficient for all robotic tasks in all dynamic natural environments. J. Weng, "Task muddiness, intelligence metrics, and the necessity of autonomous mental development," Minds and Machines, 19(1):93-115, 2009, incorporated herein by reference in its entirety, analyzed that human-level performance means successful treatment of a total of at least 26 muddiness factors in five categories. Existing AI systems have shown success for only clean tasks that are near the origin of 26-dimensional muddiness frame.

A second benefit is lifetime adaptation and understanding. For humans, the DP is responsible for whatever can happen through the entire life. For machines, the DP enables the robot to develop its mental skills (e.g., including perception, cognition, behaviors and motivation) through interactions with its environment using its sensors and effectors. In principle, there is no limit for their living and learning, as they can upload their "brains" from worn bodies to new bodies.

A third benefit is an agent that is more tractable, as humans are relieved from task-specific programming. The DP enables machines to learn new tasks that a human programmer does not know about at the time of programming. As shown in this article, it is tractable to model the functional equivalence of DP (i.e., genome). In J. Weng, "Task muddiness, intelligence metrics, and the necessity of autonomous mental development," Minds and Machines, 19(1):93-115, 2009, a special purpose, traditional AI machine is associated with the intelligence of its programmer, not the intelligence of the machine. This is because the human programmer is its external "central" controller—the joint task executor.

A fourth benefit is scaffolding. In some examples, early learned skills assist in the learning of more complicated new skills in carefully designed settings. Later, these new skills are further consolidated in later less structured, more general settings.

A fifth benefit is that the agent is useful for understanding the human brain and human intelligence. The above and other properties of developmental learning can be used by humans to incrementally improve their level of intelligence.

Various SASE examples include the following algorithms. Algorithm 1 is associated with the developmental SASE brain, and includes an Input: (S, M), where S is the sensory input-and-output (receptor neurons) and M is the motor input-and-output (muscles and glands). The output to S is for attention. Output: (S, M). "Prenatal" initialization includes initialization of an adaptive part of the brain, parameters N and responses R. In some examples, for each level of the network, the brain runs the Lobe Component Analysis (LCA) initialization algorithm, where a level is a subunit in an area. "Live"—development includes setting S and M to be the sensory port and motor port of the brain, respectively. Some examples run the following brain update function fbrain forever: (S, M, R, N)←$f_{brain}$(S, M, R|N) as fast as possible, where ← means "replace" and a vertical bar is followed by slowly changing parts. In some examples, the network is framewise incremental since N does not keep multiple sensory frames from S or multiple motor frames from M. A developmental algorithm does not require a task to be known. In some examples, the algorithm uses a design of sensors in S, the motor effectors in M, computational resource in SASE network N which also determines the dimension of response R. Therefore, in some examples, the developmental algorithm is species specific (sensors, effectors, body) but not task specific.

Algorithm 2 (Brain update function $f_{brain}$) is associated with Input: (S, M, R, N). Output: (S, M, R, N). Optionally, the external teacher trains by overwriting part or all of the motor in M and showing some sensory examples in S. Much in S is from irrelevant background. In some examples, fetch S and M from the environment and R from the internal brain. In some examples, each level of the brain runs the LCA update algorithm in parallel to get the new (S, M, R, N). It replaces the old (S, M, R, N). No global clock is needed.

Accordingly, an architecture specifies how levels are connected. In some examples, the uniform LCA determines how the brain runs. This method of autonomous development reduces the required man-hours to develop a complex system.

Figures 17A, 17B:
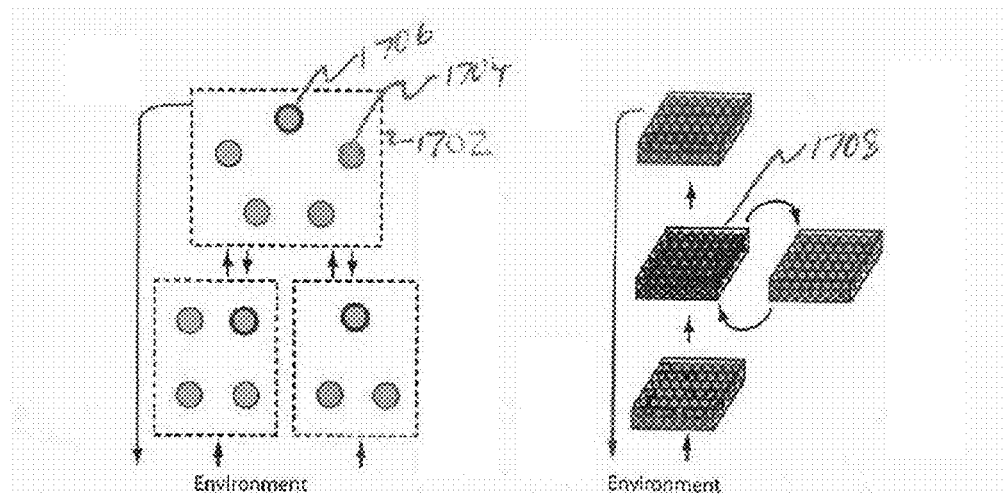
FIG. 17A shows a symbolic agent architecture.
FIG. 17B shows a connectionist agent architecture.
Figure 17C:
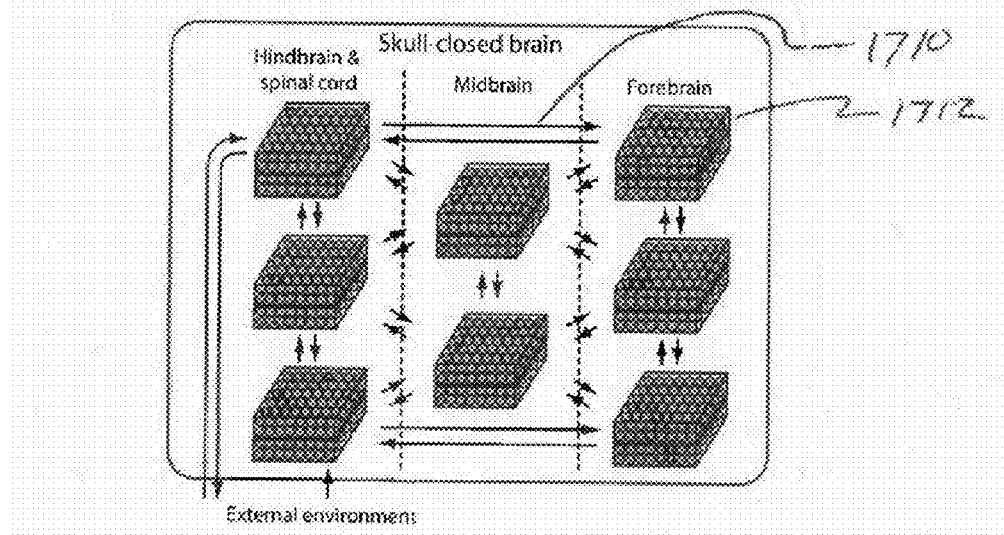
FIG. 17C shows a SASE brain model according to various examples.

FIG. 17A shows a symbolic agent architecture. FIG. 17B shows a connectionist agent architecture. FIG. 17C shows a SASE brain model according to some examples. FIG. 17A shows a symbolic "open-skull" architecture where each rectangular block 1702 corresponds to a module with a hand-crafted or defined meaning, e.g., a word at the lower level and a sentence at the higher level. A heavy node 1706 is the end node of the module, shown emboldened. Thus, this type does not autonomously learn.

FIG. 17B shows a connectionist network with fully emergent representation. The examples includes a classifier using local feedback. In some examples, the middle area 1708 creates a local feedback. This type can autonomously learn. This struggles to deal with (1) complex backgrounds, (2) deliberative reasoning and (3) desired temporal contexts.

FIG. 17C shows an example of the SASE model for the brain. Only some connections 1710 are shown. For every unit 1712, its sensory area is also an output port for its top-down attention (i.e., self-effecting), and its motor area is also an input port for its top-down sensing (i.e., self-aware). The brain is skull-closed as no direct internal manipulation by the teacher is permitted after the birth. The internal self-organization and representation emergence is fully autonomous through the agent's life. A lower brain is developed earlier, so that the higher brain as basic areas can innervate into lower ones later.

In some examples, symbolic architectures use human handcrafted instantiation of internal representation, as illustrated in FIG. 17A. Artificial neural networks have been largely used as classifiers or regressors, as indicated in FIG. 17A. In artificial intelligence, an agent is modeled as something that senses the external environment and acts on the external environment. The SASE determines internal status of the brain by sensing the brain itself In some examples, SASE internal actions alter operation (e.g., attention).

Examples of SASE brain architecture encompass several concepts. In some examples, there is no master map. In some examples, a receptive field is in general dynamic, not appearance kept or topology kept. In some examples, effective fields are dynamic. In some examples, motor areas are hubs for abstraction and top-down attention through action learning. In some examples, abstraction, reasoning, generalization, planning, decision making, multimodal integration and self-awareness are all aspects of the emergent responses of a tightly connected brain network. In some examples, the brain is a skull-closed statistical machine that records statistical relationships during a lifetime.

Figure 18:
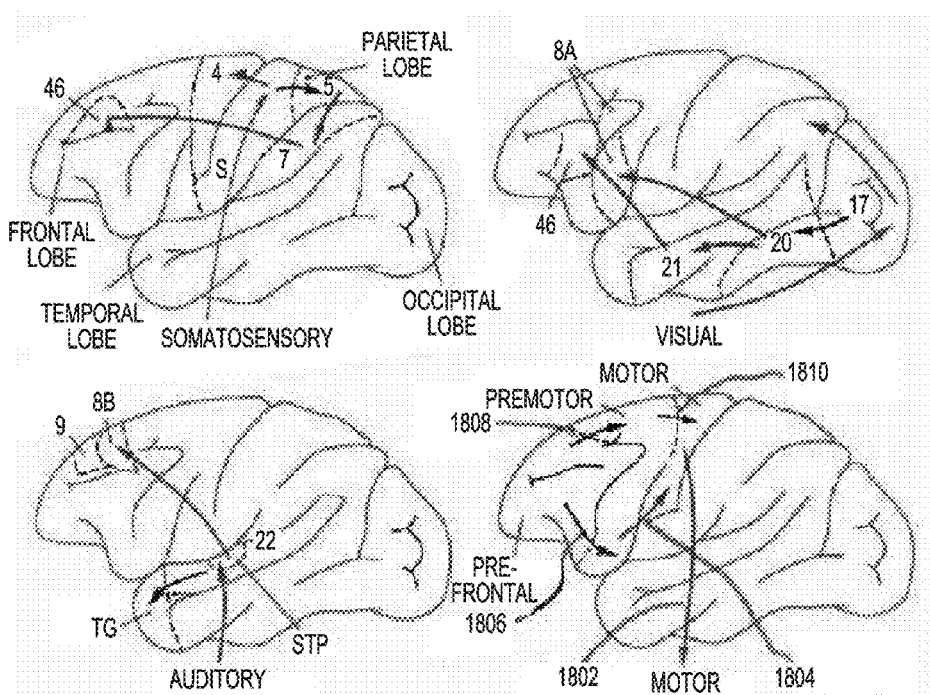
FIG. 18 shows major lobes of a cerebral cortex and major cortical pathways.

FIG. 18 shows major lobes of the cerebral cortex and major cortical pathways. The upper left shows somatosensory pathways S, 4, 5 and 7. The upper right shows visual pathways 17, 20, 21 and 46. The lower left shows auditory pathways 8B, 9 and 22. The lower right shows motor pathways 1802, 1804, 1806, 1808 and 1810. In some examples, the somatosensory, visual and auditory pathways converge to the frontal cortex where the motor pathways drive motor neurons (i.e., effectors). In some examples, only bottom-up links are shown. In some examples, every one-way connection is in fact two-way, realized by two one-way connections. The numbers marked are Brodmann codes for brain areas. A Brodmann area is a region of the cortex defined based on its cytoarchitecture, or organization of cells.

Regulated by the genome, the central nervous system develops extensive, complex processing hierarchies through experience. Each sensing modality (visual, auditory, touch, etc) corresponds to a different sensory pathway. Each may diverge to multiple pathways in the cortex as shown in FIG. 18. In some examples, each of these pathways occupies different cortical areas and they may converge. In some examples, certain modal sensory inputs converge on multi-modal association areas. There are three major convergence areas in the cortex: prefrontal, parieto-temporal and limbic cortices. These further link with the motor areas (i.e., external muscles and internal glands).

Figure 19:
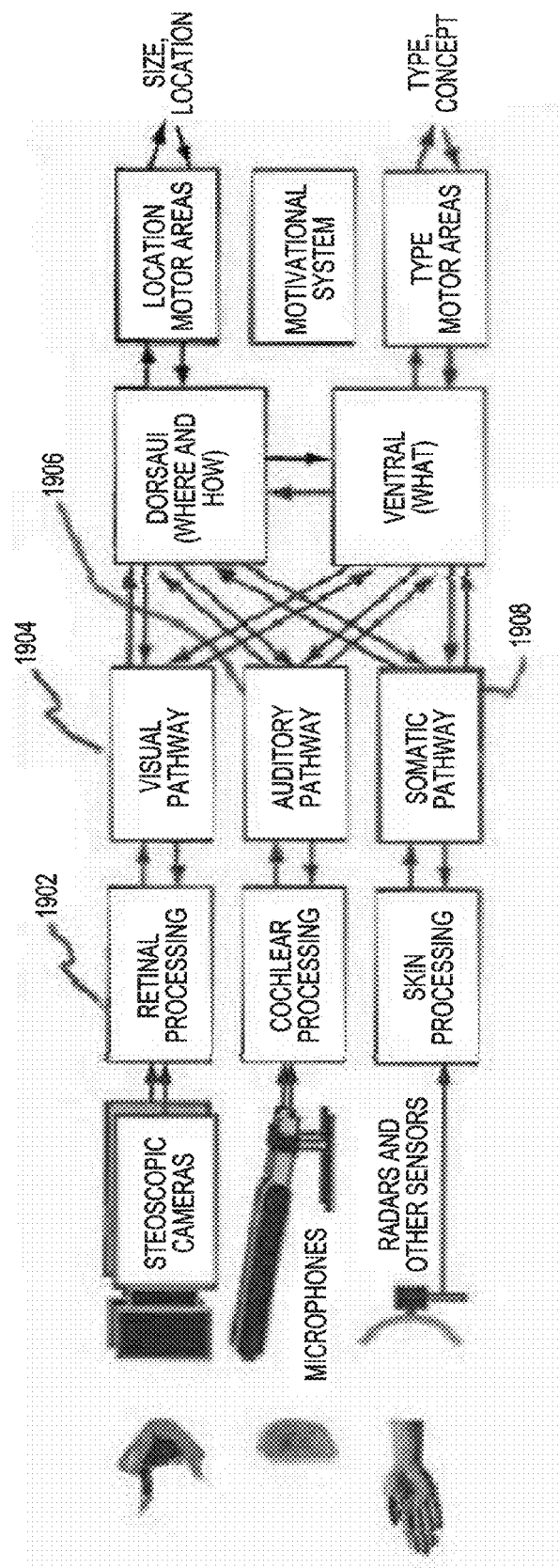
FIG. 19 shows a diagram of a connection pattern for a multisensory, multi-effector developmental brain, according to some examples.

FIG. 19 is a diagram of a connection pattern for a multi-sensory, multi-effector developmental brain, according to some examples. The multi-sensory and multi-effector integration is achieved through developmental learning, in certain examples. In some examples, each area, e.g. 1902, can be served by one or multiple SASE areas. In various examples, each sensory pathway includes a network of cortical areas before reaching one of the three major converging areas 1904, 1906, 1908, in certain examples. In some examples, neurons in early cortical areas typically have smaller receptive fields than those in later areas.

In some examples, each sensory pathway is not a single cascade. For example, V1 connects not only V2, but also V3, PIP, V4, MT, etc, in certain examples. In various examples, such a pathway configuration relates to the area-innervation model in FIG. 17C, as innervation of an area to any pair of highly related pair of cortical area improves the performance of the original pair. According to some examples of the SASE brain model, any two areas that exhibit significant statistical cofiring activities generate morphogens that attract neurons and generate synaptogenic factors that spawn synapses. Thus, in certain examples, they are connected to one another. A direct connection is formed in some instances. Some connected areas contain morphogens and synaptogenic factors that slow down further innervation.

The biological genomic equivalence principle implies that a cell is a general-purpose machine during its development and operation as far as its genome is concerned. All cells generated from the single cell zygote through many rounds of mitosis become increasingly differentiated, meaning that they become more specialized while migrating after being generated from the progenitor cells in the ventricular zone. Mitosis continuously goes on in a developing brain. Where each cell goes (cell migration), how it grows (cell expansion), how it extends (axon and dendrite path-finding), whether it survives (neurotrophic factors), synapse formation and synapse elimination (synaptogenic factors) are all activity dependent. This cell-centered autonomy, while interacting with nearby environment, gives the basis for the SASE brain model to treat any set of cells (neurons) as a unit, in certain examples.

An example of the SASE brain architecture is schematically illustrated in FIG. 17B. In this model, the basic processing unit is a set of connected neurons. The SASE architecture is about the scheme in which multiple units are integrated into a larger unit.

Brodmann areas were originally defined and numbered by Korbinian Brodmann based on his visual inspection of slices of the brain. Thus, in various examples, each Brodmann area is considered a basic unit of the SASE brain architecture. However, as the brain needs to be studied in different scales and granularity, any brain area of a desired size under consideration can be considered a unit of the SASE model. In general, therefore, examples of the SASE brain model allow a basic unit to be any set of neurons.

Examples of such a basic unit include a combination of several Brodmann areas (e.g., V1 plus V2), a single Brodmann area (e.g., V3), a subarea of a Brodmann area (e.g., 23a), or a single neuron, depending on the size under investigation for each unit. In some examples, V1 and V3 are a single basic area in a SASE model. In some examples, V1 and V3 are not immediate neighbors in the cortex since they are separated by V2 between them. If V1 and V3 are considered as a unit, the behavior of this unit is also complex and so is its relationship with other units.

In various examples, for a basic unit Y, its sensory area X and its motor area Z are directly connected. In some examples, the spinal cord is developed earlier than other later brains. In various examples, receptors the spinal cord connects to are considered its sensory area X and motor neurons it connects to are consider its motor area Z. In various examples, the spinal cord can be considered an internal area Y that links its sensory area X and its motor area Z. In the left column of FIG. 17C, the internal area Y includes the spinal cord and the hindbrain, in certain examples. In various examples, while the spinal cord and the hindbrain are taking shape, the midbrain innervates them. In some examples, the forebrain innervates the midbrain, the hindbrain and the spinal cord at a later time. In various examples, within the forebrain, more neurons innervate LGN and V1 because of highly correlated signals from them during prenatal development, using signals from the retina. In some examples, fewer neurons innervate LGN and V2 because their cofiring activities are relatively weaker.

Various examples of the SASE brain model in FIG. 17C include a spinal cord, a hind brain, a midbrain and a forebrain. In various examples, the spinal cord is the earliest "brain" and the forebrain is the latest brain. In various examples, an earlier brain exists in earlier species and develops earlier during neurogenisis. In various examples, because they develop earlier, they catch the earliest co-firing activities. With such an earlier brain, some examples conduct simple sensorimotor behaviors that are fast but take into amount relatively small number of receptors. Some examples exhibit a withdraw reflex when touching a hot surface. In some examples, a small receptive field is used when there are too few neuronal resources to detect cofiring in larger areas. In some examples, neurons in an earlier brain serve as scaffold for later brains, as neurons in a later brain use neurons in the earlier brain as sensory area X and motor area Z. In various examples, neurons in a higher brain have a larger receptive field and larger effective field. In some examples, these neurons involve more synaptic "hops", as illustrated in FIG. 17C.

In various examples, a brain forms its sensory pathways primarily based on the co-firing statistics of received signals. For example, if a brain area is lesioned, its connected region will gradually "fill the gap," that was performed by the missing area.

In various examples, for each area Y, consider its sensory area X and its motor area Z. The area Y produces internal representation from its sensory area X and its motor area Z, in certain examples. In various examples, it senses sensory input from X, but it also produces top-down signals for X as top-down attention. This is "self-effecting" as Y acts on its sensory area X within the brain. The area Y sends its response to its motor area as its action, but it also receives top-down signals from its motor area Z. In various examples, this is "self-aware" as Y senses the status of its motor area. In other words, its sensory area is not only its input port but also its output port; similarly its motor area is not only its output port but also its input port. In various examples, the SASE model assumes output-port-is-input-port (OPIIP) by default.

In various examples, based on the genomic equivalence principle and neuronal co-firing learning discussed herein, the SASE brain model is of general purpose with respect to developmental mechanisms. In FIG. 21B, there are two foreground objects A and B, both of which are against a complex natural background. This background problem is common for the brain, as all the receptors are firing all the time, from visual background, from auditory noise and distracters, and from the skin contact with clothes, for example. The number of input components that are irrelevant to the desired action is typically more than the number of related components. In various examples, more than 75% pixels are from the background and only less than 25% are from the foreground, resulting in an average signal to noise ratio (SNR): SNC<10 log 10 (0/25/0/75)=−4.8 db.

In various examples, for auditory modality, the situation is similar. A large number of neurons in MGN and auditory cortex detect a sound feature of a foreground (e.g., speech) and of a background (e.g., noise or music). These feature neurons are like pixels in an image, except in visual images, pixels from the foreground are typically connected because of the typical continuity of physical objects. In speech examples, feature neurons from the foreground are not always connected in the auditory cortex. Synaptic learning will automatically zero out irrelevant inputs because of their failure of consistent cofiring with the post-synaptic neuron.

Error back-propagation has been a popular idea for connectionist local learning, although there has been no biological evidence that the brain uses this method. Assuming that the error is available at the output port Z, the error back-propagation method computes the derivatives with respective to every bottom-up weight, which is related to the corresponding input value. As it is not known that the input component is in background or foreground, error back-propagation quickly erases the synaptic memory responding the background. Therefore, such a method can be only applied to clean-background problems. The same is true for the Cascade-Correlation Learning Architecture which freezes the old network and adds new nodes for the required new memory, which also leads to unbounded growth of the absolute memory size.

The greedy learning idea has also been used for unsupervised learning for Deep Belief Networks (DBNs). Restricted Boltzmann machines do not allow interactions of neurons in the same layer, but LCA does for its dual optimality discussed below. Thus, SASE is expected to have smaller error and learns faster than DBNs. In addition, this type of method is also not applicable to complex background problems discussed below. Different from DBNs, the multiple levels in SASE are mainly for different object sizes in sensory areas and for motor hierarchies in motor areas (e.g., an action requiring firing of many muscle elements, i.e., muxels).

In contrast, the LCA is dually optimal and biologically plausible, as set forth herein. One class of problems is called scene classification. Complex features (e.g., patterns or SIFT features) are detected from small patches across the entire image. The locations of all features are discarded, resulting in what is called "bag of features". If the features are sufficiently discriminative for classifying a scene type or for recognizing an object, such methods can be used to classify scenes or even for recognizing objects from general backgrounds. However, performance is associated with or depends on how discriminative the features are.

Various examples discussed here recognize general objects from complex backgrounds. In various examples, an image forms a temporal sample of all receptors of a sensory modality, visual, auditory, touch, spell or taste. In a vision example, the set of all possible background images is:

$$B=\{b|b \in R^d \text{ is an image of the real world}\}$$

which is infinite because of the infinitely large world. Consider a foreground object of type $t \in T$, location $l \in L$ and further the vector $w \in W$ denotes all other possible properties w (e.g., object orientation, the distance from the viewer, lighting, etc), respectively. In various examples, the set of all foreground images $f$ is:

$$F=\{f(t,l,w) \in R^d | t \in T, l \in L, w \in W\}$$

which is also infinite. In some examples, the pixels in a foreground image that do not receive optical projection of the corresponding object have a unique value of "transparent." An input image with background is a composite image $x=b \vdash f$ where the projection operator $\vdash$ denotes transparency-based foreground overwrite: Each pixel in x takes the corresponding pixel value of $f$ if it is not transparent and otherwise the corresponding pixel value of b. The set of all possible input images with backgrounds is then $X(B, F)=\{x|x=b \vdash f, b \in B, f \in F\}$ which is again infinite. Through development, an embodied brain, natural or artificial, samples the images in X actively and incrementally, as the natural consequence of its interactions with the physical world.

Various examples address attention and recognition using batch operations. Consider a finite set of m training images from the background B and foreground F, $$\Sigma(B,F)=\{x_1, x_2, \ldots, x_m | x_i \in X(B,F)\},$$

together with the ground truth $G=\{(t_i, l_i)|t_i \in T, l_i \in L, i=1, 2, \ldots, m\}$. A test image $x=b+f \in X(B,F)$ is not in the training set, $x \notin X(B,F)$, but its foreground part $f$ is similar to at least some foreground parts of images in the training set but the same is not necessarily true for the background part b. Various examples determining a batch attention-recognition algorithm $f_{AR-b}$ that takes the $\Sigma(B, F)$, G, and x as the input and returns the predicted class label t and location l: $(t,l)=f_{AR-b}(x|\Sigma(B, F), G)$. Various examples are able to manage large amounts of data. Further, continuity of objects as they move in space may also be useful (e.g., object permanence) as the reality typically occurs continuous in real time.

Various examples address Attention and recognition using a developmental approach. After initialization, various examples develop an embodied agent through interaction with the real physical world that determines the background B and the foreground F:

$$(S_{n+1}, M_{n+1}, R_{n+1}, N_{n+1}) \leftarrow f_{AR-d}(S_n, M_n, R_n | N_n)$$

for $n=1, 2; \ldots, m$, where the discrete index n is for time $t_n = t_0 + n\tau$, $S_n \in X(B, F)$ is the observation of the background and foreground, $M_n$ may occasionally contain ground truth g but not contain it all the time, $R_n$ the internal response, $N_n$ the adaptive part of $f_{AR-d}$ and g a part of ground truth related to time $t_n$. During future times $n=m+1, m+2, \ldots, m+j$, with the testing length $j>1$, without imposition of all the motor effectors, the agent function $f_{AR-d}$ autonomously produces motor outputs $(M_{m+2}, M_{m+3}, \ldots, M_{m+j+1})$ that are consistent with typical agents in this age group of the species. "Occasionally contain ground truth" is a condition that allows type bias and location bias from the teacher, if so desirable, but not necessarily, so that the teacher can let the agent practice.

Various examples are related to a number of learning modes. Some examples are associated with eight learning modes, as set forth in J. Weng and W. Hwang; From neural networks to the brain: Autonomous mental development; IEEE Computational Intelligence Magazine, 1(3):15-31, 2006, which is incorporated by reference herein in its entirety. Various examples provide rich animal learning such as by providing communicative learning. Various examples define a biased sensor as a sensor that is innately biased (e.g., pain sensor). According to some examples, the internal representation is fully emergent e, a biased sensor is used b, and a motor is imposed i. Various examples define $2^3=8$ types of learning modes for each motor. In various examples, developmental learning allows learning modes to take place in any order or concurrently. In certain examples, various learning modes are used for computationally understanding of human intelligence and for effective autonomous development of machine intelligence.

Various examples deal with motor initiated learning, where the motor signal is self-generated (during autonomous exploration or practice) or occasional teacher imposed (motor-imposed supervision). Additional example includes reinforcement learning. In some of these examples, communicative learning is not effective without the basic mechanisms for motor initiated learning readiness.

Figure 20:
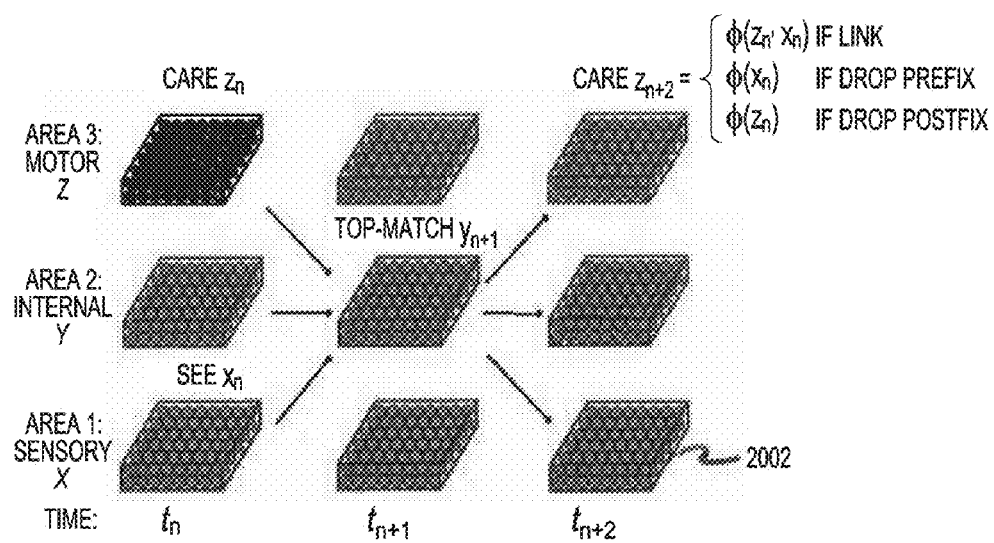
FIG. 20 shows a spatial SASE network for both spatial processing and temporal processing without dedicated temporal components, according to various examples.

FIG. 20 shows a spatial SASE network for both spatial processing and temporal processing without dedicated temporal components, according to some examples. At each temporal unit, e.g. 2002, shown above (e.g., two time frames), three basic operations are possible: link, drop prefix, and drop postfix. After proper training, the temporal context machine ("TCM") is able to attend any possible temporal context up to the temporal sampling resolution.

Various examples are associated with a generic area Y that has its sensory area X and its motor area Z, as illustrated in FIG. 20. Because of the need to address the complex background problem, the SASE model provides a deeper need: to provide receptive field and effective field that are smaller than X and Z, respectively, as illustrated in FIG. 21B. If the receptive field of a neuron matches the foreground object well, the response of the neuron is not very sensitive to the background.

Various SASE model examples generally provide for top-down analysis. In various examples, lateral inhibitions within a cortical area are important for enabling different neurons to detect different features. In some examples, this function seems more intrinsic than the benefit of using a sparse. This is indeed what Lobe Component Analysis (LCA) as a model for a cortical feature level does. J. Weng and M. Luciw; Dually optimal neuronal layers: Lobe component analysis; IEEE Trans. Autonomous Mental Development, 1(1):68-85, 2009, which is incorporated by reference herein in its entirety.

In several examples, biological plausibility is rooted in a model's lateral inhibition and lateral excitation. Some examples are assisted by star-shaped neurons called stellate neurons, so that fewer neurons (pyramidal cells) can win to fire and have their weights updated. In some examples, this provides a dynamic model for long-term memory and working memory that is absent from error back-propagation methods. In certain examples, the few firing neurons that fit the best are working memory for this context and they should update to refine their memory. The other majority of the neurons do not fire and correspond to the long-term memory for this context.

In various examples, dual optimality of LCA is associated with a target of neuronal representation of all features is optimal for the smallest possible expected representation error. In some examples, at every time instant the rate is optimal to minimize the expected error to the best but unknown representational target. In some examples, the first optimality leads to the Hebbian learning direction. The second optimality leads to the optimal step sizes depending on each neuron's firing age, according to some examples. In some instances, this is a nonlinear optimization problem. In such instances, without an effective method to find the matches, direct lateral inhibition caused oscillations undesireable performance for large size problems.

One example solution for a slow computer is to quickly find out the winners using a top-k winner mechanism to replace the time consuming and unpredicatable mutual lateral inhibitions. This leads to computationally efficient and per-formance satisfactory Mutilayer In-Place Learning Networks (MILN) where every layer uses both bottom-up input X and top-down input Z as its neuronal input space $P=(X, Z)$, in certain examples.

In various examples, top-down connections include loops associated with time. Consider the three-layer network in FIG. 20, running at discrete times $t=t_0, t_1, t_2, \ldots$. At time $t_n$, the response vector $z_n \in Z$ at the motor area Z gives the top-down context, e.g., the goal according to some examples. In some examples, the response vector $x_n \in X$ at the sensory area X gives the bottom-up context, e.g., the image input. The internal area Y has c neurons as clusters for its input space $P = X \times Z$, in the forms of neuronal synaptic vectors:

$$V=(v_1, v_2, \ldots, v_c), v_i \in P=(X,Z), i=1,2,\ldots,c.$$

Figure 21A:
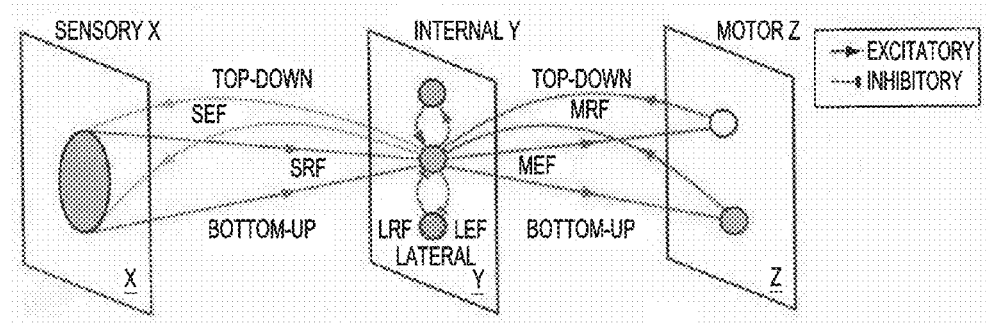
FIG. 21A shows a basic unit of a hextuple representation which bridges two arbitrary brain areas, according to various examples.
Figure 21B:
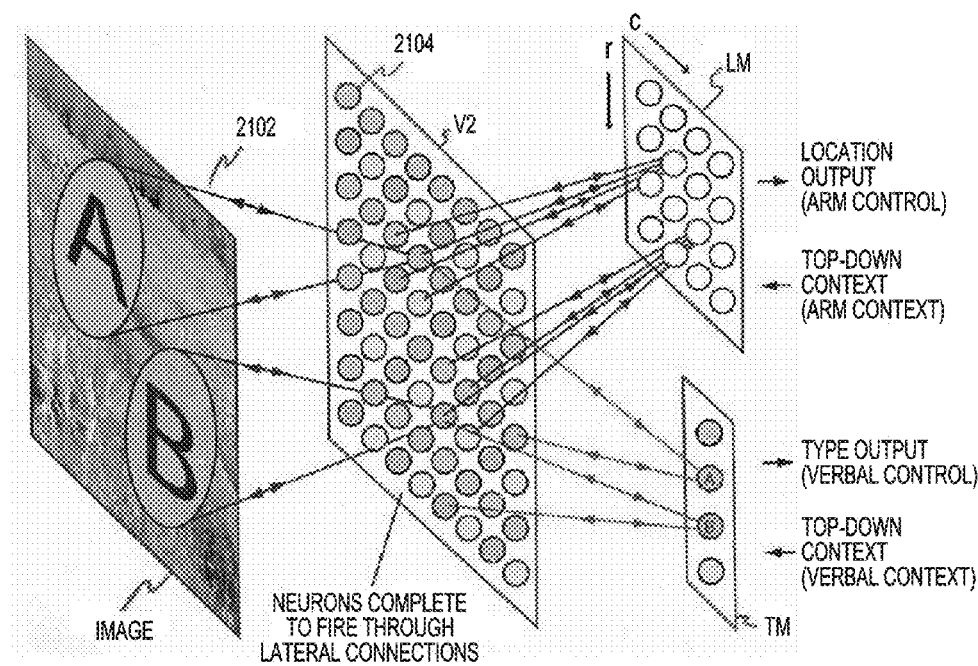
FIG. 21B shows a Where-Where Network (WWN), according to various examples.

FIG. 21A shows basic unit of the hextuple representation that bridges two arbitrary brain areas, according to some examples. FIG. 21B shows a Where-Where Network (WWN), according to some examples. SRF, MRF, LRF, SEF, MEF, and LEF are recurrent in some examples. FIG. 21B shows an example WWN with four areas (image, V2, LM and TM) and its hextuple network representation. Each wire or other conductor 2102 connects if the pre-synaptic and post-synaptic neurons 2104 have co-fired. The weight is the frequency of pre-synaptic co-firing when the post-synaptic neuron fires. Within each cortical area, each neuron connects with highly correlated neurons using excitatory connections (e.g., NMDA-ergic) but connects with highly anti-correlated neurons using inhibitory connections (e.g., GABA-ergic). In various examples, this forces neurons in the same area to detect different features in SRF and MRF. These developmental mechanisms result in the shown connections, in some examples.

Every V2 neuron is location-specific and type-specific, corresponding to an object type (marked by its color) and to a location block (2×2 size each). Each LM neuron is location-specific and type-invariant (more invariance, e.g., lighting-direction invariance, in more mature SWWs). Each TM neuron is type-specific and location-invariant (more invariance in more mature SWWs). Each motor neuron pulls all applicable cases from V2. In some examples, it also top-down boosts all applicable cases in V2 as top-down context. A two-way arrow means two one-way connections. In some examples, there are connections within the same. Since V2 is the first area from the image here, V2 does not need explicit SEF connections. In some examples, all LM and TM neurons have global SEFs.

In various examples, each vi has a different receptive field and a different effective field, as illustrated in FIG. 21.

Various examples only allow top-k probability values to have non-zero values in y to keep c−k neurons not firing so that they can keep their long-term memory. This is an important advantage over straight probability based representation.

Consider case k=1 in top-k response for y∈Y. Given input p=(x, z)∈P, the LCA algorithm finds the best matched neuron j with its synaptic vector $v_j$:

$$j = \arg\min_{1 \le i \le c} d(p, v_i)$$

where $d(p, v_i)$ denotes the competition-based dynamic distance between p and $v_i$. The response neuron j with synaptic vector $v=(v_x, v_z)$ approximates the probability:

$$y_i = r(v, p) = p(x \nabla v_x, z \nabla v_z) \tag{1}$$

where x∇v means the event that the x falls into the Voronoi region of v in the sense of inner product instead of the Euclidean distance. All other neurons do not respond. Then, the response vector $y=(y_1, y_2; \ldots y_c)$ is a distributed representation for the location of p=(x, z) in the space of P.

In various examples, if the vectors in V are properly learned, there are sufficient number of receptive fields in X and different number of effective fields in Z so that any combination of (x, z) in the practical real world has a good match with the closest $(v_x, v_z)$ which has nearly the correct receptive field and the correct effective field. In some examples, the highest response in y corresponds to the correctly detected foreground object and the intended top-down message (e.g., goal location and goal type in FIG. 21).

Thus, as long as the motor area Z maps $y_{n+1}$ to the desired output vector $Z_{n+2}$, the area Y approximates the mapping between its sensory area X and its motor area Z.

Various examples can be understood by setting k=1 for top-k firing in Y and the i-th neuron fires in Y. In some examples, the j-th component is set to one ($z_j=1$) indicating that the j-th motor neuron represents the location or the type of the foreground object. In some examples, in LCA analysis that over time, the weight $w_{ji}$ that links $y_i$ to $z_j$ approaches:

$$w_{ji} = E[y_i | z_j=1] = p(y_i=1 | z_j=1).$$

In other words, the $y_{n+1}$ vector feeds the probability value for $z_{n+2}$. The top response in Z corresponds most likely action if k=1 for top-k response in Z.

Update expressions for several examples are as follows. The area 2 takes the top-down input $z(t_n)$ from area 3 as the top-down temporal context and the bottom-up input $x(t_n)$ from area 1 which represents the current sensory input. Its area function implemented by LCA maps $(x(t_n), z(t_n))$, based on its area memory $A_2(t_n)$, to its response $y(t_{n+1})$ and updates the area memory to $A_2(t_{n+1})$:

$$(y(t_{n+1}), A_2(t_{n+1})) = f_2(x(t_n), z(t_n) | A_2(t_n)) \tag{2}$$

where $f_2$ indicates the area 2 function realized by LCA. Next, area 3 is updated by:

$$(z(t_{n+2}), A_3(t_{n+2})) = f_3(y(t_{n+1}) | A_3(t_{n+1})) \tag{3}$$

where $f_3$ indicates the area 3 function realized by LCA. If the teacher wants to supervise the motor, impose the desired value $z(t_{n+2})$.

Similarly, for top-down attention from Y to X, the $y(t_{n+1})$ vector feed the supervised or self-practiced value for $x(t_{n+2})$:

$$(x(t_{n+2}), A_1(t_{n+2})) = f_1(y(t_{n+1}) | A_1(t_{n+1})) \tag{4}$$

Various embodiments avoid estimating the joint probability distribution of the distribution of a cascade of levels LGN, V1, V2, V3, V4, IT, assuming only neighboring layers are connected, as such an approach is an intensive computational task, as areas connect beyond neighboring pairs.

In various examples, computation and learning are constrained by the in-place learning principle—each neuron is responsible for its own computation and learning. Various examples avoid the assumption that only neighboring layers are connected. Any connected multiple areas can be lumped into X or Z, depending on the sensory-motor classification, in certain examples.

In various examples, using the co-firing learning in LCA, adding an internal area Y between any two areas X and Z will predict the desired (supervised) output in Z and provides the desired top-down attention (predicted image) in X.

In various examples, each neuron has a bottom-up input x, a top-down input z and a lateral input y from all the neurons in the same area Y. The pre-action potential of the neuron is a normalized inner product:

$$r(x, y, z) = x \cdot (v_x / \|v_x\|) + y \cdot (v_y / \|v_y\|) + z \cdot (v_z / \|v_z\|).$$

where all the inputs and weights are non-negative. Several LCA algorithm examples use the top-k mechanisms to avoid any iterations to lead to the top-k winners. The dynamic scaling of response values to the full range of [0; 1] allows us to interpret the response values as approximated probability. However, most weak probability events are all discarded to cut off response to backgrounds. This also avoids the well known loss of memory caused by letting too many neurons update.

FIGS. 3-4 show Lobe Component Analysis for bottom-up and top-down input spaces, according to some examples. In various examples, the default connection pattern of every neuron in response space Y as a bridge representation of the bottom-up input space X and the top-down input space Z. Some or all connections are local but two-way. Blue "B": neuronal input; red "R": axonal output. In some examples, in the same layer, near neurons are connected by excitatory connections (for layer smoothness) and far neurons are connected by inhibitory connections competition resulting in detection of different features by different neurons.

FIG. 4 illustrates several aspects of the dual optimality of LCA. The upper layer indicates the positions for the neurons in the same 3-D layer. In various examples, the firing neurons, e.g., green "G," are context-dependent working memory and those do not fire are context dependent long-term memory. In some examples, the lower layer indicates the very high dimensional input space P=X–Z of the cortical layer Y, but illustrated in 2-D. Each curve links the neuron in Y plane with its synaptic weight vector illustrated as the tile center position in P=X–Z, in certain examples. For simplicity, the tilts in P by the neuron can be considered as Voronoi diagram, in certain examples. In various examples, the purple "R" area indicates the manifold of the input distribution, which is typically very sparse in P and of a much lower dimension than the apparent dimension of P.

In various examples, the spatial optimality of LCA means that the target tiling by the neuronal tiles in the pink area is optimal to minimize the representation error of P=X–Z. In various examples, the temporal optimality of LCA means that the neuronal weight of firing neurons should move toward their unknown best target the quickest through the developmental experience. In some examples, the updating trajectory of every neuron is a nonlinear trajectory. In some examples, the statistical efficiency theory for neuronal weight update (e.g., amnesic average) results in the nearly minimum error in each age-dependent update, meaning not only the direction of each update is nearly optimal (e.g., Hebbian direction), but also every step length. One benefit is that one or both are fully automatically determined. Additional aspects of LCA are discussed in association with FIGS. 3-4.

In various examples, the Lobe Component Analysis (LCA) not only has a long-term memory model, but also casts long-term and short-term memory in a dually optimal framework. Some examples utilize aspects of Self-Organization Map (SOM) and LISSOM. Some LCA embodiments distribute limited number of neurons of each area optimally in the input space X×Z. Some examples involve Hebbian learning, spatially and temporally, as illustrated in FIGS. 3-4 according to certain embodiments.

In various embodiments, a spatial optimality sets up an improved target. With a limited number of neurons in each area, the set of all synaptic vectors is V. In some examples, representation for each input p=(x, y, z) is $\hat{p}(V)$, whose error is $\|\hat{p}(V)-p\|$. The spatial optimality identifies the theoretically best set V* that minimizes the expected representation error: $V^* = \arg\min_V E\|\hat{p}(V)-p\|$.

The temporal optimality does the best for V(t) at every time t through lifetime, by minimizing its expected distance to the best but unknown target $E\|V(t)-V^*\|$. Suppose that the neuron j with synaptic vector $v_j$ is the top winner. This temporal optimality leads to not only Hebbian direction yp but also the best step size $w(n_j)$ for every update:

$$v_j \leftarrow (1-w(n_j))v_j + w(n_j)(yp)$$

where $w(n_j)$ and $1-w(n_j)$ are the optimal learning rate and retention rate, respectively, both depending on the firing age $n_j$ of neuron j. The real-valued firing age is updated as $n_j \leftarrow n_j + y$.

In one example a child is staring at a novel car, indicated by pattern "A" in FIG. 21B, and his pulvinar suppresses other background sensing neurons as he attends. This leads to the firing of pink V2 neuron in FIG. 21 that best matches the "car" image at the correct retina location. At the same time, his mother repeats "car, car," which excites, through child's the auditory stream, the child's motor neurons for pronouncing "car." This association should have established before since when the child motor pronounced "car," his auditory stream heard his own "car"—co-firing. This corresponds to the firing between the V2 neuron and the pink motor neuron in TM in FIG. 21. Their synapse (both-way) is connected with the Hebbian increment $yp_i$ where $p_i$ is each active V2 neuron. The learning of LM is analogous.

Thus, as car appears at different "retinal" locations, the "car" neuron in TM adds "location" connections while all firing LM neurons add their "car" connections, in certain examples. In some examples, the response y is an approximated probability for the event that the neuron detects to occur at the current time. Then the above learning expression incrementally updates the synapse as the sample probability for the pre-synaptic neuron to fire conditioned on that the post-synaptic neuron fires.

In various examples, all "loser" neurons are not updated and their ages do not advance, serving as the long term memory relative to this context p. Therefore, the role of each neuron as working-memory or long-term memory is dynamic and relative. If it fires, it is part of the current working memory and updates. Otherwise, it is part of the long term memory. Therefore, forgetting occurs only in the details of the nearest matched memory for "unconscious" refinement of skills.

Figure 22:
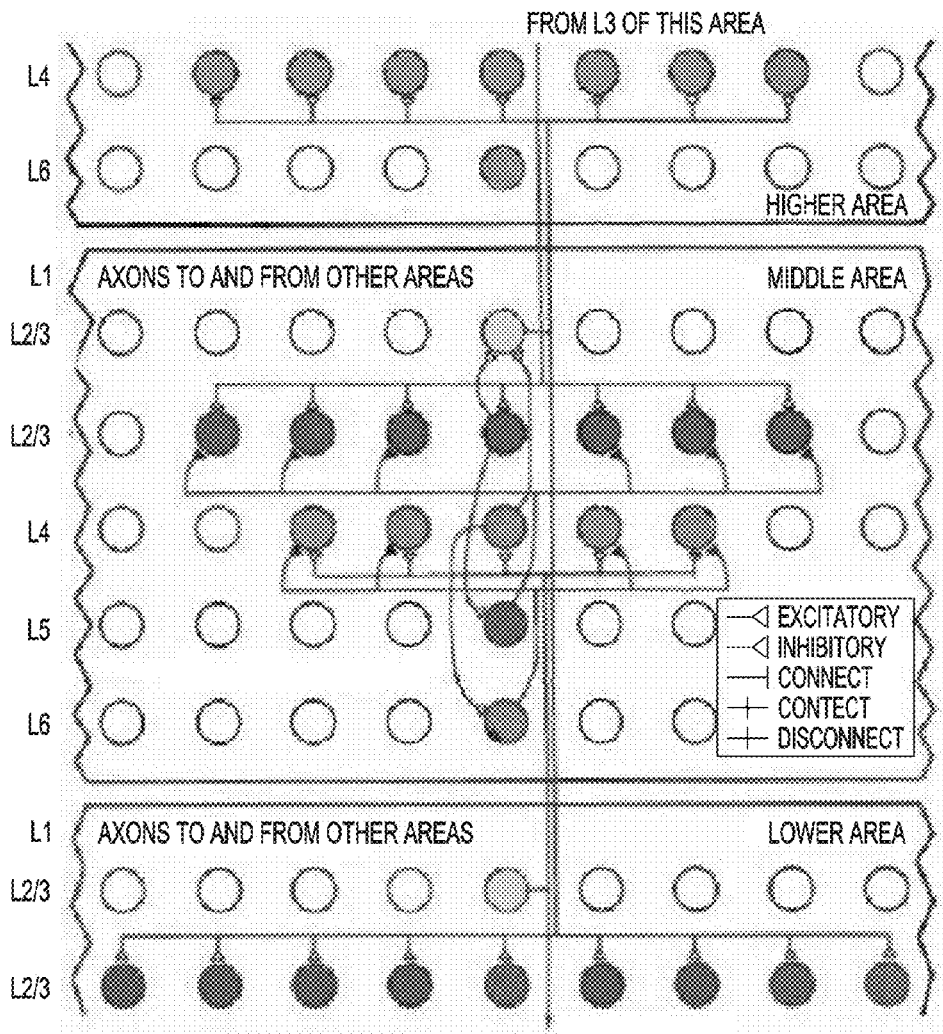
FIG. 22 shows a cortex area including a schematic illustration of a laminar cortical circuits, according to various examples.

FIG. 22 shows a cortex area including a schematic illustration of the laminar cortical circuits, according to some examples. Various examples enable the pre-screening for the bottom-up input (green) and two-down input (red) before two-way integration (yellow). In various examples, layer L5 assists L2/3 and L6 assists L4. In some examples, only major connections, e.g. 2202 are shown. In some examples, minor connections reported by neuro-anatomical studies should be caused by individual neurons that link a source X and a motor Z as an area Y, when X and Z are both in the same cortical area.

Prescreening for both bottom-up and top-down signal sources is useful to disregard weak and irrelevant responses that are distractors before bottom-up and top-down integration, in certain examples.

The cerebral cortex contains six layers: layer L1 is the superficial layer and layer L6 is the deep layer. In various examples, L4 and L2/3 each have a prescreening layer as shown in FIG. 22 with L5 assisting the one in L2/3 (red) and L6 assisting L4 (green), in the sense of enabling long range lateral inhibition. Such long range inhibitions encourage different neurons to detect different features, in certain examples. In some examples, there is an integration layer (yellow) in L2/3, integrating the prescreened bottom-up and top-down inputs.

In various examples, there are rich minor connections beyond those shown in FIG. 22. Various examples include a 6-layer laminar architecture to provide performance improvements in a variety of visual problems over corresponding single-layer cortical area architecture.

In various examples, the integration layer in L2/3 based on its current own content $L(t_{n-1})$ takes three signal sources: prescreened bottom-up input $x(t_{n-1})$ as lower features, lateral input $y(t_{n-1})$ from its own layer as its last response, and top-down input $z(t_{n-1})$ from prescreened top-down input, all at time $t_{n-1}$. Through the feature development function modeled as the Lobe Component Analysis (LCA), the integration layer generates its next response $y(t_n)$ at time $t_n$ as the attention-selected response and to update its level to $$L(t_n):(y(t_n),L(t_n))=f(x(t_{n-1}),y(t_{n-1}),z(t_{n-1})|L(t_{n-1})) \quad (9)$$

where $f$ denotes the function of LCA. Various examples incorporate a process of attentive context folding, folding the spatiotemporal information from the three sources into one response vector and the updated cortical layer. LCA models the feature layer and its assistive layer in the laminar cortex, in certain examples. For the bottom-up prescreening in L4 and L6 combination, $z(t_{n-1})$ is absent in the above expression, in some examples. For the top-down pre-screening in L2/3, $x(t_{n-1})$ is absent, in certain examples.

During the process of development, the signals in the motor area Y reflect daily activities generated either internally from the brain, externally through external supervision, and mixtures of both, according to several examples. There are two sensory modalities, in various examples.

An example is shown in FIG. 21B. Various examples consider a single area. In FIG. 21B, it is labeled V2. However, the middle area can be any area in the brain. In various examples, the pink neurons in V2 have two parts of their receptive field: sensory receptive field (SRF) A in the image, and the motor receptive fields (MRF) corresponding to the corresponding position in LM area and type in TM area. In some examples, if patch A presents in the image and the corresponding pink neuron fires, the location information and the type information are sent to the corresponding neurons in LM and TM, respectively. In various examples, neurotransmitters from a target area can influence the targeting of migrating neurons and growing axons during the formation of neuronal circuits.

The model here relates the causality of such "where" and "what" representations to their respective motor areas. In various examples, this is because the dorsal stream and ventral stream further connect the Location Motor (LM) area and the Type Motor (TM) area, respectively. In the example of FIG. 21, muxels in LM and TM areas are "meta" muxels, representing instances of abstract actions.

Each stream not only serves its motor area, but is also affected by it, according to several examples. In some examples, this is because each cortical neuron is connected by not only bottom-up, and lateral connections but also top-down connections, where bottom-up, top-down and lateral mean "from image to motor," "from motor to image," and "among neurons in the same area," respectively, as illustrated in FIG. 21. For each neuron, its classical receptive field (RF) and effective field (EF) only represent the bottom up flow, and should be called sensory RF (SRF) and motor EF (MEF), respectively, according to certain examples. Its receptive field has further the motor RF (MRF) for its top-down input and lateral RF (LRF) for its lateral input. Its effective field has further the sensory EF (SEF) for its top-down output and lateral EF (LEF) for its lateral output. See FIG. 21A for six fields—hextuple fields of each neuron, two renamed and four new ones. Therefore, according to several examples, the representation of a basic unit in the brain is hextuple: SRF-MRF-LRF-LEF-MEF-SEF.

FIG. 21 gives an example of the resulting hextuple network representation throughout a WWN which includes one image buffer, an internal area (V2), and two motor areas (LM and TM). The amount, richness, and sophistication of its behaviors are limited by the resource available and its experience (e.g., "living" age).

Figure 23:
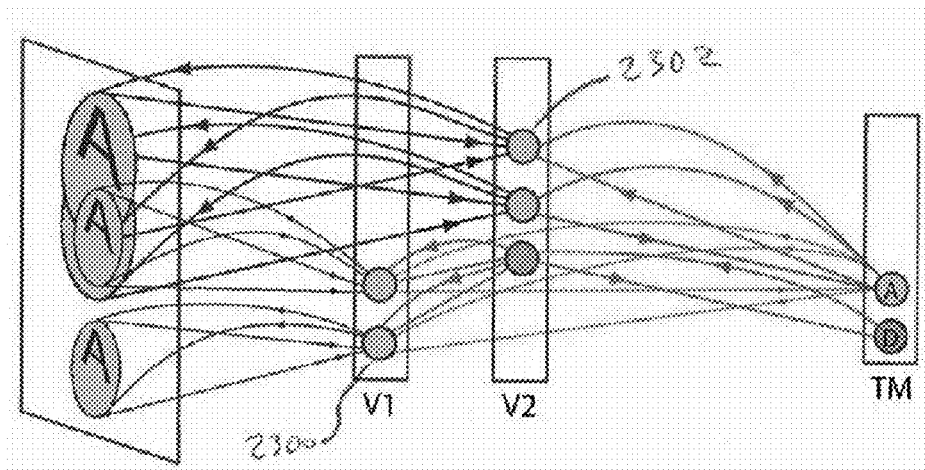
FIG. 23 shows more than one internal areas that deal with receptive fields of different sizes, according to various examples.

FIG. 23 shows more than one internal areas that deal with receptive fields of different sizes, according to some examples. In some examples, areas are disconnected and dynamic (active partially each time). V1 neurons 2300 have small sensory receptive fields (SRFs) and V2 neurons 2302 have large ones, in certain examples. The "pink" V1 and V2 neurons all connect with the "pink" motor neuron, which learns type-A with size-invariance and location-invariance, according to certain examples. In various examples, only one pattern "A" appears in the input image, and the sensory receptive field of the "pink" motor neuron is dynamic—only one subpart is active at any time. When two small "A" pattern appear concurrently, the dorsal stream (not shown) selects one from V1, in certain examples. Thus, the receptive field of the pink motor neuron is also selective, according to some examples. In various examples, the sensory receptive field of the "green" V2 neuron corresponds to disconnected multiple "A" features, useful for object recognition with occlusion or scene classification, indicated by the type "D" motor neuron, in certain examples. Thus, in some examples, the active part of the receptive field of "green" motor neuron is disconnected. In various examples, all such dynamic, selective, and disconnected receptive fields are learned automatically from the original large static scope of connections where most connections become zero later.

In various examples, a receptive field is understood as a more-or-less static field for a sensory neuron (e.g., detecting a feature in the field). In various examples, the hextuple concept relates to a receptive field can be dynamic, selective and disconnected, as demonstrated in FIG. 23 and the portions of the specification that discuss that figure.

For example, the receptive field concept is conventionally for a sensory neuron, not a motor neuron. However, the sensory receptive field (SRF) of the "pink" motor neuron in FIG. 21B is a union of the overlapping SRFs of all "pink" V2 neurons. Thus, in various examples, the SRF of each motor neuron is global, but dynamic and selective, since only a few V2 neurons win to fire at any time.

The "green" neuron in FIG. 23 explains that active parts of SRF may be disconnected in the retina, useful to reveal object with occlusion or scene type. In various examples, WWN treats input components as a "bag-of-features" because of the inner-product-based neuronal response. In various examples, the need for V1 to directly connect to motor to learn the motor-specific type clarifies why in the brain an earlier area (e.g., V1) links with not only the next area (e.g., V2 for disconnected SRF), but also other later areas (e.g., frontal cortex for small SRF). In various examples, this is a connection pattern universally found in the visual.

In various examples, an MRF is also selective and dynamic, e.g., different motor actions boost a V1 neuron at different contexts. In some examples, an MRF is typically disconnected (e.g., each V2 neuron connects one neuron in LM and TM, respectively).

In the example of FIG. 21, the teacher uses a canonical representation—using the highest responding neuron to represent an output—to teach LM and TM. This canonical way is only for simpler explanation, but is wasteful in some examples. In general, each firing pattern represents an instance of an action, as, e.g., each arm reach requires multiple muscles to contract simultaneously. Furthermore, a multi-muxel action may represent the presence of multiple abstract concepts (e.g., "apple" and "fruit"), according to certain examples.

Two neurons are connected if they co-fire often (e.g., Hebbian learning). Therefore, for each neuron, three pairs are similar in their total static scope: SRF-SEF, MRF-MEF, and LRF-LEF pairs, according to some examples.

Figure 24A:
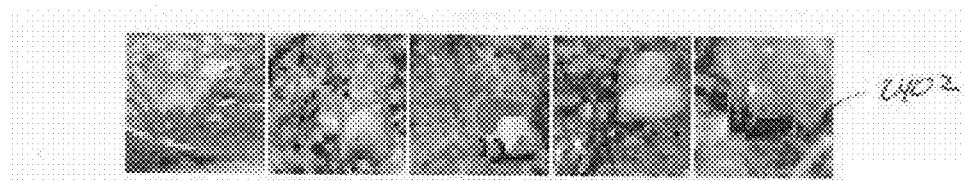
FIGS. 24A, 24B, 24C, 24D and 24E show aspects of a WWN, according to various examples.
Figure 24B:
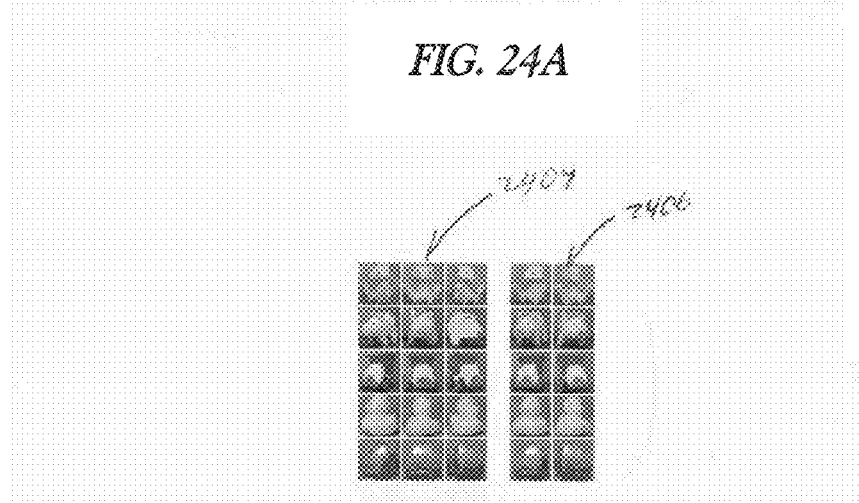
Figure 24C:
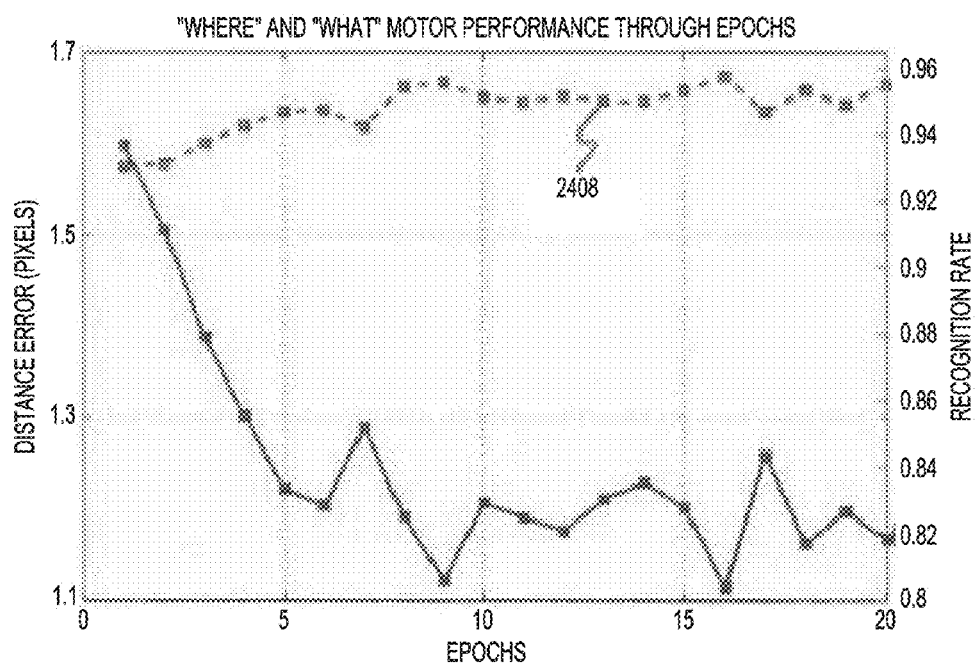
Figure 24D:
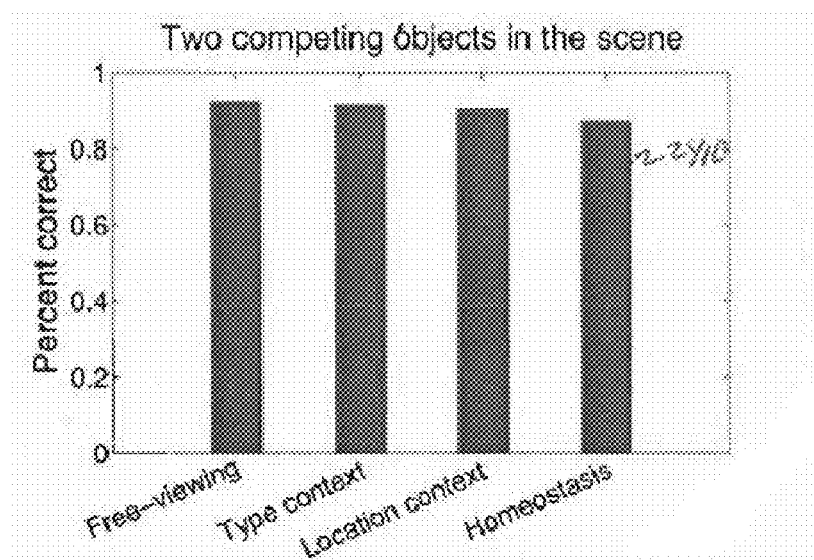
Figure 24E:
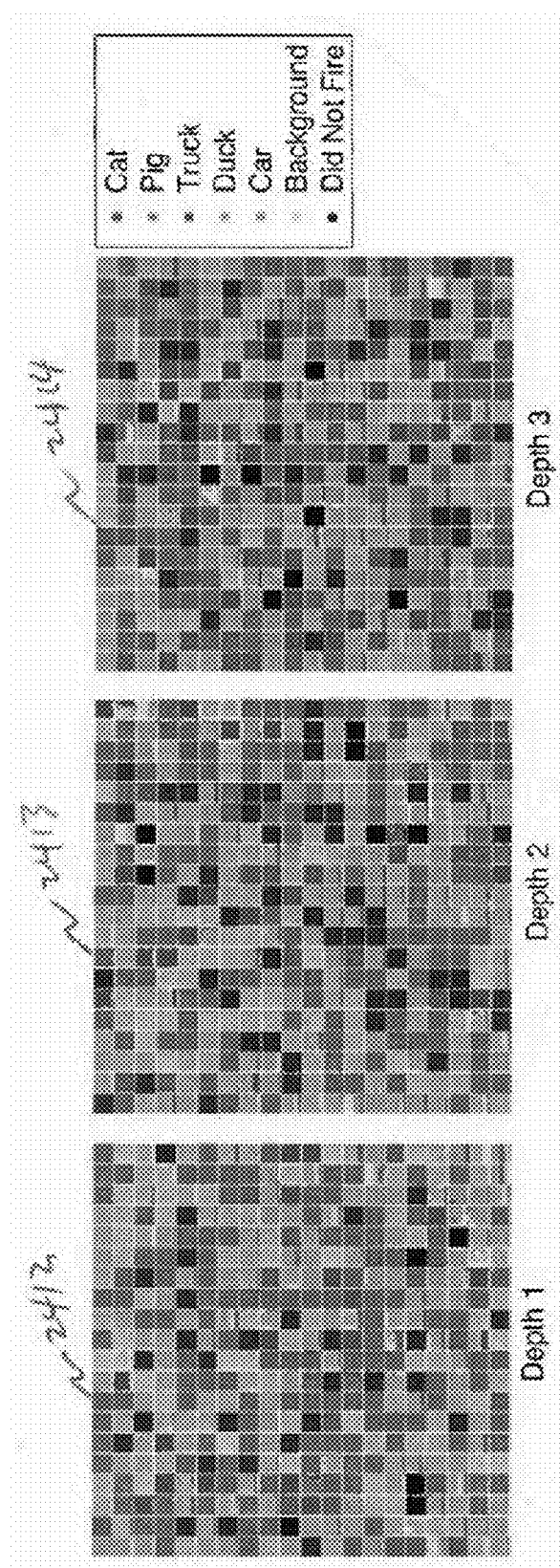

FIGS. 24A and 24B show what-where-networks, according to some examples. WWNs for the joint attention-recognition problem under the free-viewing mode and reasoning modes. FIG. 24A show example image inputs 2402. FIG. 24B shows foreground training images (left three) 2404 for each object and test images (right two) 2406 from different viewing angles. FIG. 24C shows the average errors 2408 of the reflexive actions, reaching and telling the type (recognition) during free-viewing in unknown complex natural backgrounds, which improve through epochs of learning experience in some examples. FIG. 24D shows the performance 2410 when input contains two learned objects: reflexive (free-viewing), two types of deliberative reasoning (top-down type-context and location-context), and fully autonomous deliberative reasoning (homeostasis). FIG. 24E shows V2's action representation map 2412 (for TM)—the location-type map of V2 for top-1 winning in the free-viewing mode through the disjoint test, according to some examples. It has an array of cells, each representing a V2 neuron (20 rows, 20 columns, depths 1 to 3, 2412-2414, respectively). In various examples, in each cell, the area of a color is proportional to the corresponding probability of the type. If all the neurons are type-pure, all the cells have a single color.

In various examples, a Where-What Network is a simplified but a general purpose vision system (for the first time) for recognizing general objects from complex backgrounds. To simulate a shortage of neuronal resource relative to the input variability, various examples use a small network including five classes of objects, with images of a single size, and different natural backgrounds. Multiple examples use the same 5 object classes, but different background images. In some examples, there are 3 V2 neurons at each location, but 15 training object views. In some of these examples, the WWN is 4/5=80% short of resource to memorize all the foreground objects. In some examples, each V2 neuron deals with misalignment between an object and its receptive field, simulating a more realistic resource situation. Some examples process in 20×20=400 locations.

FIG. 24B shows the results provided by some examples after a first round or epoch of practice. After 5 epochs of practice, various example networks reached an average location error around 1.2 pixels and a correct disjoint classification rate over 95%. Various examples provide a solution to the joint attention-recognition problem in unknown complex backgrounds with a practical-grade performance in free-viewing mode. Dynamic selective SRF of all motor neurons are used, according to some examples.

FIG. 24D shows the V2 class map from the disjoint testing in the free-viewing mode, which shows that most neurons are almost class-pure, except a few around the decision boundaries. In various examples, this is because each V2 neuron fires and learns only when a foreground object is present, and the top V2 winners report matches of a single type. In some examples, the top-down representational effect discussed below further discounts leaked-in background pixels (due to limited neurons), since the co-firing wiring enables the correct motor neuron to send the correct top-down signal to the correct V2 neuron during training and practice. In various examples, the LCA optimality contributes to the superior purity of V2 neurons under a limited number of neurons and experience. FIG. 24E gives two examples of outputs in the free-viewing mode. In various examples, this object representation scheme does not use a holistically object-aware, appearance-kept, size and locational invariant master map.

Various embodiments include top-down attention configured to have an operational bias of two types, location based and object (or feature) based. In various examples, the top-down signal from a motor action can represent any human communicable concepts, and the deliberate reasoning schemes discussed here are applicable to general abstract concepts.

In various examples, deliberative reasoning is a process of reasoning that is not only from abstract concepts to abstract concepts, but also use top-down context (e.g., goal) to reason with bottom-up concrete evidence (e.g., pixels from foregrounds and backgrounds). Various SASE examples discussed here provide a connectionist model for deliberative reasoning.

FIGS. 25B, 25C, 25D, and 25E illustrate the 3-stage process as a complete link in a series of general purpose WWN deliberative reasoning:

... ⇒ Abstract context
⇒ Internal updates
⇒ Abstract context updated
...

FIG. 25 shows a WWN 2502 performing deliberative reasoning with pixels for complex background problems, according to some examples. FIG. 25A shows a free-viewing—reflexive, no top-down context, in certain examples. In some examples, the WWN attends object A and it is at "upper left". FIGS. 25B, 25C, 25D, and 25E show a top-down context—deliberative, in certain examples. FIG. 25B shows an abstract context, in certain examples. In various examples, a "friend" states an abstract concept "Object B." Through the auditory stream 2504, WWN 2502 gets an "Object B" firing in its TM area in a top-down context. In various examples, FIG. 25C shows internal updates. In some examples, winners among top-down boosted V2 neurons now fire (one here), with all pixels taking into account. In various examples, in FIG. 25D an abstract is context updated. In various examples, the firing V2 neuron sends the response to LM and LM, where one reporting the abstract location and the other confirms the abstract type. FIG. 25E shows examples of deliberative reasoning by a trained WWN. "Context" means top-down context. In some examples, a green octagon indicates the location and type action outputs. In some examples, the octagon is the default receptive field before synapse adaptation where individual synaptic weights can reduce from LCA learning.

Various examples define each neuron's sensory input neurons (SIN) corresponding to SRF. Similarly, various examples define MIN, LIN, LON, MON, and SON, corresponding to MRF, LRF, LEF, MEF, and SEF, respectively. Therefore, the connections of each feature (pyramidal) neuron are hextuple: SIN-MIN-LIN-LON-MON-SON.

Figure 25A:
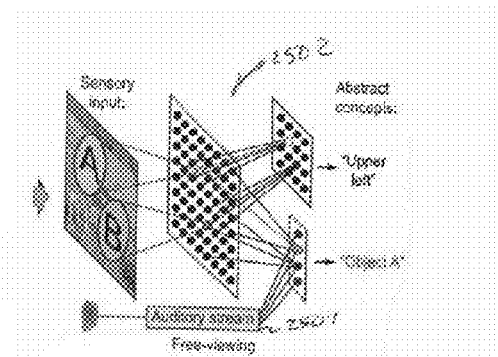
FIGS. 25A, 25B, 25C, 25D, and 25E show aspects of a WWN performing deliberative reasoning with pixels for complex background problems, according to various examples.
Figure 25B:
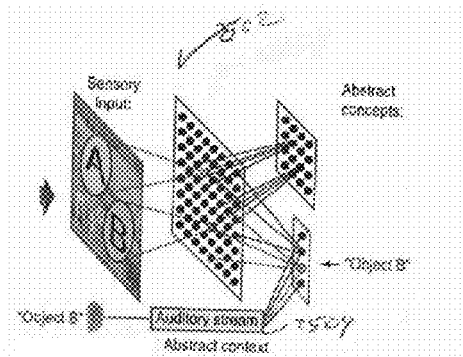

The first stage is "abstract context". The top-down context is an instance of the motor action now. It can be either self-generated, externally injected (motor-end supervision or sensory-end communication), or a mix of both. FIG. 25B shows an example in which the top-down context is communicated via the ears (e.g., from a teacher). In various examples, the concept(s) represented by the motor here are general-purpose, as it can be any other human communicable concept (e.g., goal or criteria). In various examples, the firing TM neuron(s) sends boosting signals to all its SONs in V2, using the Hextuple representation from TM (SEF). In some cases top-down attention is associated with location-based, type-based and more, via motor hubs.

Figure 25C:
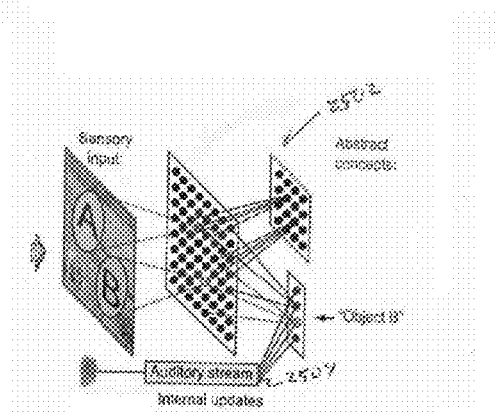
Figure 25D:
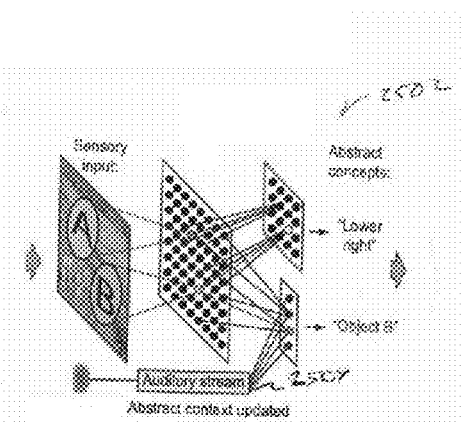
Figure 25E:
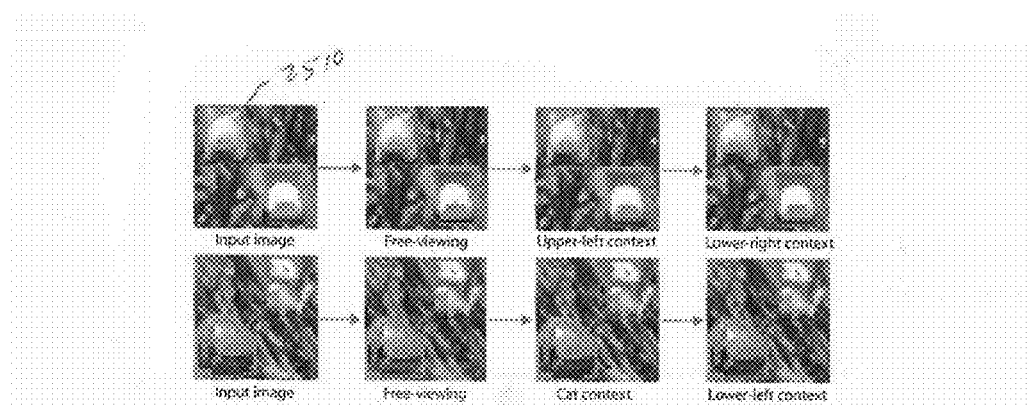

The second stage is "internal updates" and includes computation with (e.g., abstract) top-down context and (e.g., concrete) bottom-up pixels (e.g., foreground and background) using the entire network's hextuple representations (e.g., those depicted in FIG. 25C). In some examples, all the above SONs in V2 are boosted, increasing their chance to win. The "originating" motor neurons together with the boosted and now firing V2 neurons conceptually correspond to what is called "motor imagery" [65] during which a human mentally simulates a given action, according to some examples. Further repeated neuronal computation for all neurons in V2, LM, and TM using their SINs, MINs and LINs result in mental imagery in which the top-down context corresponds to an imaginary rotation action.

The third stage is "abstract context updated." In various examples, the V2 winners send signals to MONs (e.g., now involving all related motor areas) using the entire network's Hextuple representations. In various examples, the motor areas (LM and TM) display the result of reasoning as an instance of the updated action (see FIG. 25D) but it can represent any abstract concept(s).

In various examples, this general-purpose network thinking process is rooted in experienced associations through the emergent internal Hextuple representation, instead of an externally handcrafted symbolic representation. In particular, it is not based on mathematical logic, according to some examples.

In various examples, a WWN for deliberative reasoning processes two competing objects in each image, at four possible quadrants to avoid overlapping. As shown in FIG. 25C, some examples find 96% from the type context to reason location and 90% from the location context to reason type.

To allow the network to self-generate its own top-down contexts (i.e., abstract "thoughts") like an autonomously "living" animal, some examples use a homeostatic mode. According to some examples, the currently two firing motor neurons in LM and TM are suppressed (simulating temporal depletion of synaptic vesicles which package neural transmitters) and relative to other neurons are boosted concurrently, simulating the disappearance of lateral suppression from the previous winner. In various examples, WWN correctly deliberatively reasons for the "runner-up" object (in LM and TM) under this homeostatic mode. Some examples have an average success rate 83%, such as in FIG. 25C.

Various examples reason using abstract concepts about type and location. Some examples are general for any abstract concept and any concrete sensory inputs. In various examples, any abstract concept can be expressed using motor actions and a language. Some SASE models deal with a single motor area which contains many abstract actions, and should be sufficient to show that it can reason about any abstract concept. Some examples can see that there are in fact no fundamental difference between LM and TM, as both drive multiple muscles. Various examples teach the motor area with patterns that have more than one active component.

There are two frameworks with regard to how the brain deals with time, one using dedicated temporal components and the other using an intrinsic biological spatial network without dedicated temporal components. In the first framework, the main scheme for longer time dependency is to link temporal units that are separated long in time via delay lines or a self-organized map. Examples of these long-time models explicitly model time in the internal representation. In the second framework, a random network is constructed to display its temporal behaviors. Some examples demonstrate only perception of very short intervals.

Different from the first framework, various SASE models discussed here deal with time without dedicated temporal components. In various examples, no neuron or unit in the SASE model has a temporal identification with respect to the current time. In various examples, one or more SASE models can learn both types temporal problems, those that disregard time warping (e.g., in text reading discussed below) and those that care about the time duration. The basic difference is in what the action z represents. With the former, z's at different times record the passage of events without being sensitive to time duration. With the latter, z's at different times records the time duration between events. The work here is the first to demonstrate not only long term dependency in behaviors, but also to incorporate both duration insensitive behaviors and duration sensitive behaviors.

In various examples, a maximum likelihood estimation for temporal context problem finds high probability events in the following probability density: For a moderate n, this problem is not tractable as the number of possible sensorimotor sequence is exponential in time n.

Instead, a developmental SASE brain example recursively learns an equivalent action that lumps all the possible temporal sensorimotor trajectories into a single distributed representation $z_i$. If z is external, it can be taught through different learning modes. If z is internal, it is gradually emergent from developmental activities. Thus, the above probability density is converted to a recursive one: where xn is top-down attention signal and $z_n$ is the bottom-up action signal.

However, in various examples, the SASE model does not explicitly estimate the distribution of all possible combinations of $(x_n, z_{n-1}, z_n)$ since it is too expensive. As illustrated in FIG. 20, the learned layer Y and the learned bottom-up weight for Z compute directly the highest probability $z_n$ using expressions Eq. (2) and Eq. (3), according to some examples. Similarly, the learned top-down weight for X computes the highest probability top-down signal for area 1 $x_n$ using expressions Eq. (2) and Eq. (4). In various examples, the difference is that it takes two network updates to process the above one input n because the network has two computational layers for each of $z_n$ and $x_n$.

In various examples, the brain intelligence is manifested from the trajectories of context-dependent attention. From the above formulation, some examples feature no boundary between the spatial information and the temporal information in the internal representation of SASE model.

Unlike HMM whose insensitivity to time warping is a fixed property, the SASE brain model can deal with both time warping and time duration, as illustrated in FIG. 20. In some examples, this is because the task context can be kept recursively in action z. Depending on the task memory in z, the network can choose to disregard the duration information or count the amount of duration.

Finite Automata

Examples include a new type of recurrent network that is more general than finite automata. Thus, according to some examples, the network performs context-based or state-based reasoning of a general purpose finite automaton. The more general aspects of this network include that it is developmental. Various examples have internal representations that emerge from its "living" experience in the grounded physical world through interactions with its external environment and internal (inside the "skull") environment. In various examples, an architecture is sensor and motor driven, so that the network directly receives and outputs instances of numeric patterns, not just abstract symbols. In some examples, a building block is a dually optimal feature area called Lobe Component Analysis for the best use of network resource (size) and teaching resource (living time), as discussed herein. In various examples, space properties deal with goal-directed or context-directed attention to a small relevant part of the world in the presence of irrelevant information or background. Various examples include time properties that extend an infinitely long logic sequential operation of a finite automaton to infinitely long spatiotemporal events in complex backgrounds. One or more results of such a network are represented in its motor end, in certain examples.

In various examples, Finite Automata (FA) includes probabilistic extensions that include one or more of Hidden Markov Models (HMM), Partially Observable Markov Decision Processes (POMDP) and Bayesian Nets (also called belief nets) and other learning frameworks. Examples discussed here provide machines are able to learn new concepts when the preselected concepts are not sufficient for the dynamic open-ended real world. Further, various examples process a number of states that are exponential in their number of concepts.

Various examples process general spatiotemporal events in complex backgrounds. In some temporal events, the time between two sub-events are irrelevant to the desired action (e.g., when one reads separate words here) but in other events, the time duration between two sub-events are relevant (e.g., determine how fast one reads).

Epigenetic developmental (ED) network examples discussed here can reason with FA. Further, examples networks discussed here include a series of additional capabilities that address some major problems of symbolic approaches. The ED networks discussed here form a basic, general-purpose "building block" that seems to have the potential to develop simple or complex brain-like networks.

Figure 26A:
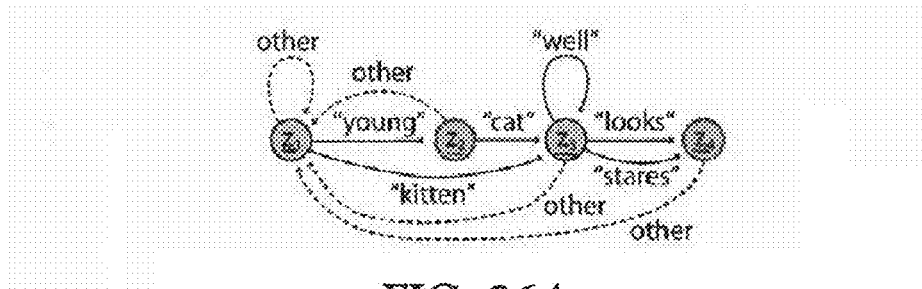
FIGS. 26A, 26B and 26C show aspects of a "skull-open" Finite Automaton (FA) with a "skull-closed" ED network, according to various examples.
Figure 26B:
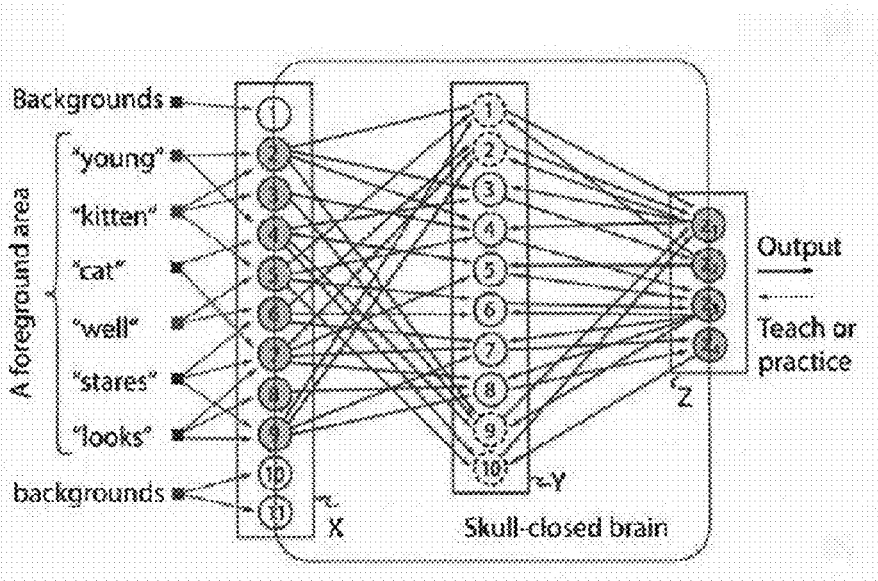
Figure 26C:
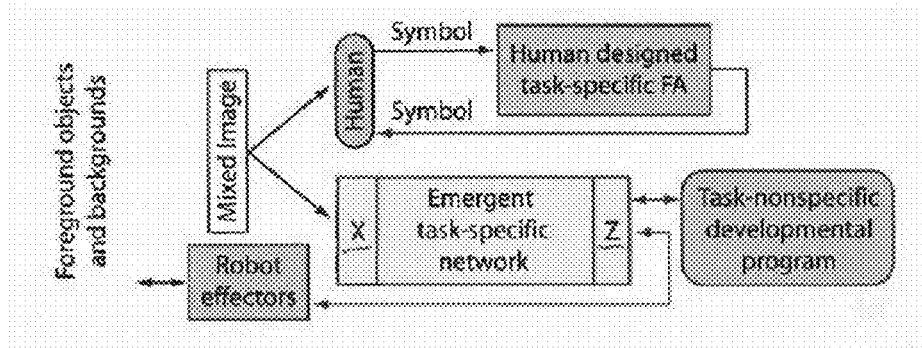

FIGS. 26A-C show aspects of a "skull-open" Finite Automaton (FA) with a "skull-closed" ED network, according to some examples. FIG. 26A shows an example of an FA, handcrafted, static, and reason from symbol to symbol. FIG. 26B shows an example of an a corresponding ED network that lives and learns autonomously in the real world, and that was taught to produces the same equivalent actions as FIG. 26A, via a canonical conversion between a set of symbols, to an m-dimensional vector space X: $\sigma_i$ corresponds to $x_i \in X$ where $X_i$ has only the i-th component to be one and all other components to be zeros. In various examples, each object in the real-world environment generates a sample foreground patch. In various examples, a teacher does not intervene directly inside its closed "skull" other than indirectly through its sensory port X and motor port Z. According to the examples, a circle represents a neuron. "Green" represents a foreground image patch among possibly many such patches in a practical system, although only one foreground patch is illustrated here. In the brain, all possible patches are present at different resolutions according to the experience. The ED network autonomously self-organizes its internal (i.e., inside the "skull") representation through interactions with the real-world environment. When the motor end is not supervised (imposed or "clamped"), the network autonomously practice without changing its operational mode. The pattern in Z not only affects the external environment, but also serves as a concept (location, type, goal, etc.) that operates on the internal environment. In various examples, a "skull-closed brain" uses top-down attention, which affects which neuron in Y wins and further affects which object in X is attended or boosted among typically large complex backgrounds. For simplicity, top-down connections from Y to X are not shown. In various examples, for input attention, they are present and learned. FIG. 26C shows a comparison of the developmental and operational mode of the FA and the ED network. Pink areas are human designed or human taught. Yellow areas are autonomously developed.

FIG. 26A shops a finite automaton (FA), also called a finite state machine. At each time instance, it is at a state. At the beginning, one example is at state $z_i$. Each time, it receives a label as input (e.g., "young"). Depending on its current state and the next input, it transits to another state. For example, if it is at $z_1$, and receives label "young", it transits to "$z_2$", meaning "I have 'young'." Other inputs from $z_1$ leads back to the $z_1$ meaning "start over," in the example. The state indicates that the last few labels have the following meanings: $z_1$: start; $z_2$: "young"; $z_3$: "young cat" or "kitten"; $z_4$: "kitten looks" or equivalent. Accordingly, various FA can abstract. In FIG. 26A, the FA example treats "young cat" and "kitten" the same in its state output.

In general, a finite automaton is a 5-tuple (Q, Σ, $q_0$, δ, A) where Q is a finite set of sates, Σ is a finite set of input symbols, $q_0 \in Q$ the initial state, δ: Q×Σ→Q is the transition function and A ⊂ Q is the set of accepting states. Many extensions from such an acceptor FA are available. A straightforward extension from the above acceptor FA is to modify A to be a set of output symbols and add ω: Q→A as an output mapping. Without loss of generality, various examples consider that each state has a different action so that each state itself is an output.

Many Cognitive Science models and artificial intelligence systems use FA as the base model, e.g., the Hidden Markov Model (HMM), Partially Observable Markov Decision Processes (POMDP) and the Bayesian Nets. The states of such machines are static after the human design.

Various examples include an Epigenetic Developmental (ED) network. "Epi" means post. "Genetic" means conception—the origination of a life. An ED network is not task-specific at the birth time. Its concepts are learned dynamically and incrementally from its motor end, through interactions with the environments.

Exemplified in FIG. 1B, an ED network lives and learns autonomously in the open-ended, dynamic, real physical world. For example, the "young" object makes the pixels 2 and 4 bright and all other green pixels dark. Its motor vector z, is not only an output vector to drive effectors (muscles) to act on the real world R but also an input vector from the motor end because the environment can set z, e.g., by a teacher in R. The ED network was taught to attend to a spatiotemporal object in a complex background according to the motor z which also represents any concept (e.g., location, type, goal).

In some examples, born at time $t=t_0$, the ED network lives and develops. At each time $t_n$, n=1, 2, . . . , each area A in the ED network computes response $y(t_n)$ using its bottom-up input $x(t_{n-1})$, its existing response $y(t_{n-1})$, its top-down input $z(t_{n-1})$, its existing weight vector $v(t_{n-1})$ and updates its weight vector to v(tn):

$$(y(t_n), v(t_n)) = f_A(x(t_{n-1}), y(t_{n-1}), z(t_{n-1}), v(t_{n-1})) \quad (A)$$

where $f_A$ is the area's computation and incremental update function described below. Similarly, the sensory area X and the motor area Z also compute and update this way. But X does not have bottom-up input and Z does not have top-down input if they are nerve terminals. Receptors and muscles are nerve terminals.

In some examples, it is advantageous to consider input from the same Y area separately. In such instances, each neuron in Y has weight vector $v=(v_x, v_z)$. From bottom-up and top-down inputs x and z, its pre-action potential is the sum of two normalized inner products:

$$r(v_x, x, v_z, z) = \frac{v_x}{\|v_x\|} \cdot \frac{x}{\|x\|} + \frac{v_z}{\|v_z\|} \cdot \frac{z}{\|z\|}$$

which measures the degree of match for both parts.

Lateral inhibitions among the neurons in the area A enable neurons to compete. In some examples, only the k of them with the strongest pre-action potentials survive the competition and fire. Let the weight vector of neuron i be $v_i=(v_{xi}, v_{zi})$ for inputs from other areras. Considering the case k=1, in some examples, only one neuron fires. The single winner neuron j is identified by:

$$j = \arg\min_{1 \le i \le c} r(v_{xi}, x, v_{zi} z).$$

The lateral inhibitions along the neurons in A dynamically scale the pre-action potentials of the top matched neurons. For k=1, only the single winner fires with response value $y_j=1$ and all other neurons in A do not fire. The response value $y_j$ approximates the probability for (x, z) to fall into the Voronoi region of its $v_j$ where the "nearness" is $r(v_x, x, v_z, z)$, in certain examples. Thus, the more neurons the area has, generally, the more likely there is almost perfect match between the winner $v_j=(v_{xj}, v_{zj})$ and an input $p=(x, z)$:

$$vxj \approx x \text{ and } v_{zj} \approx z$$

not counting the lengths of these vectors because of the length (contrast) normalization in $r(v_x, x, v_z, z)$.

In some examples, all the connections in ED network are learned incrementally based on co-firing of the pre-synaptic activity $p=(x, z)$ and the post-synaptic activity y of the firing neuron. In various examples, if the pre-synaptic end and the post-synaptic end fire together at $t_{n-1}$, the synapse has a synapse gain yp at $t_n$. Other non-firing neurons do not modify their memory. When a neuron j fires, its weight is updated by a Hebbian-like mechanism:

$$v_j \leftarrow (1-\rho(n_j))v_j + \rho(n_j)y_j p \quad (B)$$

where $p(n_j)$ is the learning rate if the firing age $n_j$ of the neuron j, a closed-form solution for the dual optimality (e.g., as set forth herein) and each $v_j$ is initialized by a different smooth Gaussian profile or by initial input data discussed below. Then, the age of the neuron j is incremented $n_j \leftarrow n_j+1$. A component in the gain vector $y_j p$ is zero if the corresponding component in p is zero. Each component in $v_j$ so incrementally computed is the estimated probability for the pre-synaptic neuron to fire conditioned that the post-synaptic neuron fires.

During the simple mode of learning discussed here, neurons responding for backgrounds are suppressed and are not attending, so that almost no neurons learn the background. This means that during training, the foreground object of interest is explicitly taught.

In various examples, given a FA, there is an ED network that, from the same sequence of inputs, generates exactly the same output sequence as the FA for infinitely long time. In various examples, spaces X and Z of the network correspond to $\Sigma$ and Q, respectively, via a canonical conversion. By canonical conversion from a set $\Sigma=\{\sigma_i|i=1, 2, \ldots, m\}$ to an m-dimensional vector space X, various examples demonstrate that $\sigma_i$ corresponds to $x_i \in X$ where $x_i$ has only the i-th component to be one and all other components to be zeros. In various examples, these are equivalent, denoted as $\sigma_i=x_i$, in the sense of the canonical conversion.

As illustrated in FIG. 26, in various examples, between the FA and the real physical world is an operator that attends an object from the real world and interprets it as a symbolic label which is fed into the FA. In various examples, the FA outputs a symbolic output. In various examples, the operator interprets the meaning of the output label from the FA. In some examples, this process continues indefinitely. In additional examples, an operator teaches a general-purpose ED network whose autonomous development is regulated by a operator designed or evolved, task-nonspecific developmental program. According to some examples it is shown in the "Example ED Network learning an FA" that a operator in the environment can teach the ED network to produce the exact equivalent action sequence through time, as the operator-FA combination produces, while the ED network gradually matures though its autonomous 'living" in the real world. The learning mode used in the "Example ED Network learning an FA" is communicative motor-supervised learning. In various examples, additional components of ED are needed for it to learn in additional modes of developmental learning include reinforcement motor-supervised, reinforcement motor-autonomous, and communicative motor-autonomous.

In various examples, if the real world at any time $t_n$ has k>1 learned objects in the input image $I_n$ at learned attention masks a, then in theory there are multiple Y neurons that have the same degree of bottom-up match. Still, the Y neuron that wins is the one that is boosted by top-down context $z_{n-1}$.

In various examples, the top-down vector $z_{n-1}$ can be determined by not only the last y vector, but also the external environment, through direct operator supervision (i.e., query commend) on the motor or a cue from another sensory modality (e.g., auditory "cat" that drives the same motor as the visual "cat"). In various examples, the top-down weight from Y to X learns the spatiotemporal attention a based on Y response. Thus, the attention sequence that the operator used is also learned by the network, not just temporal independent attention pattern a. In some examples, based on this theory, attention—which Y wins when k>1 bottom-up matches are present—is not just bottom-up based on bottom-up contribution, but also in conjunction with top-down input $z \in Z$.

The biological brain does not necessarily develop exactly as the theoretical proof in "Example ED Network learning an FA" explains—the FA model is not necessarily on the mind of a trainer. However, different default receptive fields of the ED network spread out everywhere in the retinal image; the winning neuron near the correct location best detects a learned object. When multiple learned objects are present in x, the top-down bias from z boosts, as top-down attention, the corresponding y for the desired object. As z presents spatiotemporal context, y is selected by temporal context in z. The real-world environment can show an object to the eye and set an abstract concept about the object onto the motor port, such as type, location, goal, etc.

In various examples, the more ED network lives and learns, the smarter it becomes. Its internal goal-directed reasoning behaviors emerge further through autonomous practice during which the output end is not supervised by a teacher.

As a general purpose learning network for approximating the signals observed from sensory area X and motor area Z, it has the following properties:

Development. In various examples, an FA is handcrafted, but the corresponding ED network is emergent from experience from a sufficient number c of neurons. An FA takes symbolic input which requires a operator to prepare from the large real world. In contrast, an ED network lives in the real world, as it takes sensory images from X and motor images from Z (e.g., through supervised learning).

Architecture. In various examples, the network has an internal area Y whose connections can emerge to be very complex. However, the recurrence is very dense between X and Y and between Y and Z.

Area. Each area is a building block of the brain. In various examples, it is not difficult for an area to learn a fixed FA, as each neuron guarantees to learn a different input pair (x, z). However, there are many areas in the brain, with increasingly more areas gradually added between earlier developed areas, while these earlier areas are still developing. In other words, the sensory area X and the motor area Z of each area themselves are slowly changing. Therefore, the experience of each area is not fully described by a deterministic FA, as the entire multiple-area network learns and matures. The above learning method is dually optimal for such an uncertain world. In addition, it uses incremental learning, compared with the batch learning in HMMs, POMDP and Bayesian networks.

Space. In various examples, the goal or context at any time $t_n$ is from Z which boosts only the experience-connected neurons in Y so that they can compete to win from other neurons, either having bad matches from large background or good matches from their learning experience but without top-down boost (the network does not attend). In various examples, the size of the background is irrelevant, only the goodness of match is. This gives a potential to deal with many irrelevant sensors at any time.

Time. In various examples, as a well designed FA records only relevant context (e.g., time duration irrelevant or relevant), the corresponding ED networks also does. A major difference is that with FA, the operator should foresee everything ahead of time. With an ED network, any new teacher can teach new motor behaviors based on the performance of the network at that age. The motor Z represents all actions that an animal can produce or state, such as action, goals, contexts, concepts, intents, etc.

Complexity. In various' examples, an agent needs to learn n spatiotemporal concepts and each concept has m values. To distinguish these many states, an FA needs $O(m^n)$ states, exponential in the number n of concepts. An ED network uses distributed representation in X and Z. If the network uses n motor areas to represent n concepts and m neurons for each, the network needs $O(m^n)$ motor neurons. Various examples recognize that how distributed representation of ED network reduces the representation complexity from the FA's $O(m^n)$ complexity to $O(m^n)$. Various examples reduce the size of an FA by manually identifying states that are impossible in a particular task, but this manual process is tedious for large-scale problems, error-prone, and does not guarantee to change the exponential $O(m^n)$ complexity, in certain examples.

Note that the network resource can be redirected while the network matures. Not all possible $m^n$ combinations are observed at every stage of one's life even though they are theoretically possible. This allows a resource limited internal area Y to save space by only memorizing observed input pairs within a reasonably long time span. For example, a child does not need to do an adult job; an adult does not need to memorize all childhood details. In contrast, an FA does not have any internal representation like Y as all its representation is in $\Sigma$ and Q and they are handcrafted by operators.

Examples of trained ED networks recognize temporal visual events, general objects from complex natural backgrounds, spatiotemporal disparity from stereo without explicit stereo images matching, text processing as temporal sequences for generalization to new sentences based on synonyms, part-of-speech tagging problem and chunking using natural languages.

In general, examples of ED networks discussed here simulate how a brain area A autonomously connects (i.e., innervate) its sensory area X and its motor area Z so that the new network can internally predict signals observed from X and Z, predict for not only Z but also X for attention.

In various examples, given a FA there is an emergent network set forth here that learns its function. Furthermore, the network deals with the world directly by learning attention for complex backgrounds, without a operator in-between itself and the real world. The network is developmental in various examples, it learns incrementally, is fully autonomous in the self-organization of its internal representation, and deals with general spatiotemporal events in complex backgrounds.

Various examples teach a developmental network for operator-level performance using scaffolding. Some examples teach so that earlier learned mental skills assist the learning of later mental skills.

In various examples, more areas innervating a large network enable more default receptive fields that adapt and fine turn through learning. In various examples, this incremental developmental process allows local in variances learned in earlier layers to be used by later areas. In various examples, the function of each area is not predetermined before innervation, but is dynamically determined by all connected areas each of which optimally predicts the signals in its own sensory area and its own motor area.

Example ED Network Learning an FA

Starting from time $t_0$, set the output $z_0 \equiv q_0$ from the network. Run the given FA and observe its input and output. At time $t_n$, n=1, 2, ..., the network performs the following. The FA is at state $q \equiv z_{n-1}$. The operator of the FA attends to an object in the real world image $x_n$ and produces the equivalent symbolic input a e $\Sigma$ to feed the FA which then transits to state $q' \in Q$. The ED network does the same, but grounded in the real world without an operator in-between. This occurs wherein $\sigma \equiv a(x_n)$, where a: $X \rightarrow X$ is an attention mask function so that the attended components in $x_n$ are 1 and other components are zero denoting the background in $x_n$ at $t_n$.

If $p = (a(x_n), z_{n-1})$ is a new input to the Y area of the network, then the FA never transited from $q \equiv z_{n-1}$ to $q' \equiv z_n$ through q to q' input link $\sigma$ and, thus, the network generates a new internal neuron in Y whose input weight vector is initialized as $(a(x_n), z_{n-1})$, and updates its internal response vector $y \in Y$. Then, it supervises its motor output to produce $z_n \equiv q'$. The single firing neuron in Z incrementally averages for the new input y vector, where only the new neuron fires at 1 and all others do not. The network updated twice, the first is to add a new neuron to Y. The second is to generate the desired $z_n$ and links the new neuron in Y to the single firing neuron in $z_n$ for learning action generation and all the firing neurons in $a(x_n)$ for learning top-down attention to X.

If the vector $p = (a(x_n), z_{n-1})$ is not new to Y, then according to the neuron generation rule there is a neuron j in Y whose synapse vector exactly matches $(a(x_n), z_{n-1})$, then all the network does is to update the response for $y \in Y$ in which the single correct neuron j fires. Eq. (B) in this computes the incremental average of the same input vector p for the single firing neuron j, which does not change the synaptic vector of neuron j because all the input vectors of j when it fires are the same. In various examples, the network updates again without changing input $x_n$. Thus, the second network update leads to output $z_n$ which should be equivalent to $q_0$, since FA is deterministic. The input vectors of the firing neuron in Y and the firing neuron in Z are still exactly the same after the twice network updates.

From the above analysis, the number of neurons in Y is the number of different vectors in $T = \{(a(x_n), z_{n-1}) | n=1, 2, ...\}$. If $x_n$ is always clean, i.e., $x_n \equiv \sigma \in \Sigma$ at all $t_n$ without the need of the attention mask a function, the number of neurons in Y for the ED network is at most $c = |\Sigma \mu Q|$ where |S| denotes the size of the set S. Otherwise, each different pattern of attention function $a(x_n)$ requires a different neuron in Y, although they all produces the same equivalent symbol $\sigma \in \Sigma$. In other words, the network also learns invariance of attended foreground using case-based learning, e.g., each case corresponds to a different location and a different size of the attended object. The attended spatiotemporal event in X is represented in the motor $z_{n-1} \in Z$. Such an attended event can be of any desired temporal length, just as the FA does. Note that both FA and the network do not have any component dedicated to time.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
generating, within a machine using a processing unit, actions for the machine based on correlating spatial inputs linked in time for each neuron in a set of neurons on a neuronal layer for the machine such that correlation of the correlating spatial inputs includes applying a firing-age dependent plasticity, wherein the spatial inputs are from an input layer and a corresponding output layer.

2. The method of claim 1, wherein the method includes computing responses for all the neurons, the response for each neuron based on relevance of sensor inputs and effector inputs for the respective neuron.

3. The method of claim 2, wherein computing responses for all the neurons includes computing responses for all the neurons at a time of $t+\tau$, $\tau>0$, in which responses, only at time t, are included in computing the responses at $t+\tau$.

4. The method of claim 1, wherein generating autonomous decisions results from an iterative selection of a neuron from the set of neurons best matched to a feature from a sensory input relative to a motor input.

5. The method of claim 1, wherein the method includes operating on the neurons without using error signals for back-propagation.

6. The method of claim 1 wherein the firing-rate dependent plasticity is simulated by the processing unit using a non-negative amnesic function.

7. The method of claim 1 wherein the firing-age dependent plasticity is simulated by the processing unit and used to generate an optimal step size for a Hebbian learning mechanism.

8. The method of claim 1 wherein the firing-age dependent plasticity is simulated by the processor and used to generate an optimal update direction for a Hebbian learning mechanism.

9. A non-transitory machine-readable medium that stores instructions, which when performed by a machine, cause the machine to perform operations comprising:
generating, within the machine using a processing unit, autonomous decisions for the machine based on correlating spatial inputs linked in time for each neuron in a set of neurons on a neuronal layer for the machine such that correlation of the correlating spatial inputs includes applying a firing-age dependent plasticity, the spatial inputs being from an input layer and from a corresponding output layer.

10. The non-transitory machine-readable medium of claim 9, wherein the instructions include computing responses for all the neurons, the response for each neuron based on relevance of sensor inputs and effector inputs for the respective neuron.

11. The non-transitory machine-readable medium of claim 10, wherein computing responses for all the neurons include computing responses for all the neurons at a time of $t+\tau$, $\tau>0$, in which responses, only at time t, are included in computing the responses at $t+\tau$.

12. The non-transitory machine-readable medium of claim 9, wherein generating autonomous decisions results from an iterative selection of a neuron from the set of neurons best matched to a feature from a sensory input relative to a motor input.

13. The non-transitory machine-readable medium of claim 9, wherein the instructions include operating on the neurons without using error signals for back-propagation.

14. The non-transitory machine-readable medium of claim 9 wherein the firing-rate dependent plasticity is simulated by the processing unit using a non-negative amnesic function.

15. The non-transitory machine-readable medium of claim 9 wherein the firing-age dependent plasticity is simulated by the processing unit and used to generate an optimal step size for a Hebbian learning mechanism.

16. The non-transitory machine-readable medium of claim 9 wherein the firing-age dependent plasticity is simulated by the processor and used to generate an optimal update direction for a Hebbian learning mechanism.

17. A system comprising:
a sensory device;
a motor device;
memory; and
a processing unit coupled to the sensory device, to the motor device, and to the memory, the processing unit arranged to operatively execute instructions stored in the memory, which when executed by the processing unit, cause the system to perform operations including generating, within the system using the processing unit, autonomous decisions for the system based on correlating spatial inputs linked in time for each neuron in a set of neurons on a neuronal layer for the system such that the correlation of the spatial inputs includes applying a firing-age dependent plasticity, the spatial inputs being from an input layer and from a corresponding output layer.

18. The system of claim 17, wherein the processing unit and the memory are operable to compute responses for all the neurons includes computing responses for all the neurons at a time of $t+\tau$, $\tau>0$, in which responses, only at time t, are included in computing the responses at $t+\tau$.

19. The system of claim 17, wherein the processing unit and the memory are operable to determine whether one or more of features extracted from the sensory input are irrelevant to motor actions of the system and to automatically disregard features determined to be irrelevant.

20. The system of claim 17, wherein the system is arranged as a distributed system.

21. The system of claim 17, wherein the system is arranged as a robot-like apparatus.

22. The system of claim 17 wherein the processing unit simulates the firing-rate dependent plasticity using a non-negative amnesic function.

23. The system of claim 17 wherein the processing unit simulates the firing-rate dependent plasticity to generate an optimal step size for a Hebbian learning mechanism.

24. The system of claim 17 wherein the processing unit simulates the firing-rate dependent plasticity to generate an optimal update direction for a Hebbian learning mechanism.

* * * * *

UNITED STATES PATENT AND TRADEMARK OFFICE
CERTIFICATE OF CORRECTION

PATENT NO. : 8,694,449 B2
APPLICATION NO. : 12/790735
DATED : April 8, 2014
INVENTOR(S) : Weng et al.

Page 1 of 3

It is certified that error appears in the above-identified patent and that said Letters Patent is hereby corrected as shown below:

In the Specification

Column 6, Line 42,
 Delete "V2-It-TM." and insert --V2-IT-TM.--
Column 8, Line 58,
 Delete "1," and insert --I--
Column 10, Line 67,
 Delete "area" and insert --area.--
Column 11, Line 28 (approx.),
 Delete " $v_j \leftarrow w_1 v + w_2 y_j p,--$ " and insert -- $v_j \leftarrow w_1 v + w_2 y_j p,$ --
Column 12, Line 15,
 Delete "$R_1, R_2, R_c,$" and insert --$R_1, R_2, \ldots, R_c,$--
Column 13, Line 51,
 After "According", delete "to the above"
Column 15, Line 27,
 Delete "β" and insert --β,--
Column 16, Line 58,
 Delete " $\notin R^{12}$ " and insert --$\in R^{12}$--
Column 17, Line 5,
 Delete " $3 \notin 3\times 3$ " and insert --3×3×3--
Column 17, Line 39,
 Delete " $20 \notin =400$ " and insert --20×20=400--
Column 18, Line 31 (approx.),
 Delete " $(y_3; L_3) \leftarrow f_{LCA}(x|L_3)$ " and insert -- $(y_3; L_3) \leftarrow f_{LCA}(x|L_3)$ --

Signed and Sealed this
Thirtieth Day of September, 2014

Michelle K. Lee
*Deputy Director of the United States Patent and Trademark Office*

CERTIFICATE OF CORRECTION (continued)
U.S. Pat. No. 8,694,449 B2

Column 18, Line 34,
    Delete "a" and insert --α--

Column 19, Line 55,
    Delete "20×20=200" and insert --20×20=400--

Column 21, Line 58,
    Delete "0" and insert --ø--

Column 27, Line 42,
    Delete "backgrounds" and insert --backgrounds,--

Column 30, Line 17,
    Delete "fbrain" and insert --$f_{brain}$--

Column 30, Line 18,
    Delete "R|N" and insert --R, N--

Column 31, Line 11,
    Delete "itself" and insert --itself.--

Column 35, Line 19 (approx.),
    Delete "$R_n|N_n$" and insert --$R_n$, $N_n$--

Column 37, Line 25,
    Delete "vi" and insert --$v_i$--

Column 37, Line 42 (approx.),
    Delete "$y_i = r(v,p) = p(x\nabla x_x, z\nabla v_z)$" and insert --$y_i = r(v,p) = p(x\nabla v_x, z\nabla v_z)$--

Column 46, Line 3,
    Delete "xn" and insert --$x_n$--

Column 47, Line 20,
    Delete "$X_i$" and insert --$x_i$--

Column 47, Line 48,
    Delete "shops" and insert --shows--

Column 48, Line 30,
    Delete "v(tn)" and insert --$v(t_n)$--

Column 48, Line 59 (approx.),
    Delete "$j = \arg\min_{1\leq i\leq c} r(v_{xi}, x, v_{zi}, z)$-" and insert --$j = \arg\max_{1\leq i\leq c} r(v_{xi}, x, v_{zi}, z)$--

Column 49, Line 4 (approx.),
    Delete "$vxj \approx x$" and insert "$v_{xj} \approx x$--

Column 49, Line 4 (approx.),
    Delete "$v_{zi} \approx z$" and insert --$v_{zj} \approx z$--

Column 49, Line 17 (approx.),
    Delete "$v_j \leftarrow (1 - \rho(n_j))v_j + \rho(n_j)y_i p$" and insert --$v_j \leftarrow (1 - \rho(n_j))v_j + \rho(n_j)y_j p$--

Column 51, Line 13,
    Delete "various'" and insert --various--

Column 52, Line 11,
    Delete "a e Σ" and insert --σ ∈ Σ--

Column 52, Line 32,
    Delete "(a($x_n$), $z_{n-1}$" and insert --(a($x_n$), $z_{n-1}$)--

CERTIFICATE OF CORRECTION (continued)
U.S. Pat. No. 8,694,449 B2

Column 52, Line 48,
Delete "$c=|\Sigma\mu Q|$" and insert --$c = |\Sigma||Q|$--